(12) United States Patent
Sasaki et al.

(10) Patent No.: US 7,227,719 B2
(45) Date of Patent: Jun. 5, 2007

(54) THIN FILM MAGNETIC HEAD AND METHOD OF MANUFACTURING THE SAME

(75) Inventors: Yoshitaka Sasaki, Sunnyvale, CA (US); Takehiro Kamigama, Kwai Chung, N.T. (CN)

(73) Assignees: Headway Technologies, Inc., Milpitas, CA (US); SAE Magnetics (H.K.) Ltd., Hong Kong (HK)

( * ) Notice: Subject to any disclaimer, the term of this patent is extended or adjusted under 35 U.S.C. 154(b) by 739 days.

(21) Appl. No.: 10/350,014

(22) Filed: Jan. 24, 2003

(65) Prior Publication Data

US 2004/0145826 A1 Jul. 29, 2004

(51) Int. Cl.
*G11B 5/147* (2006.01)

(52) U.S. Cl. ...................................... 360/126

(58) Field of Classification Search ............... None
See application file for complete search history.

(56) References Cited

U.S. PATENT DOCUMENTS 6,612,017 B2 * 9/2003 Santini ..................... 29/603.12

* cited by examiner

*Primary Examiner*—Hoa T. Nguyen
*Assistant Examiner*—Mark Blouin
(74) *Attorney, Agent, or Firm*—Oliff & Berridge, PLC

(57) ABSTRACT

A first magnetic material film constituting a bottom pole is formed on a flat surface of a substrate, a second magnetic material film constituting a part of a bottom track pole and a thin film coil are formed on the flat surface of the first magnetic material film to have a flat coplanar surface, an insulating film is formed on the flat coplanar surface to cover the thin film coil and a part of the second magnetic material film and to extend up to a throat height zero reference position, a third magnetic material film is formed to cover a portion of the second magnetic material film which is not covered with the insulating film a constitutes a part of the bottom track pole and to have a flat coplanar surface, a non-magnetic material film constituting a write gap film is formed on the flat coplanar surface, a fourth magnetic material film constituting a top pole and a top track pole is formed on the non-magnetic material film, and the fourth magnetic material film, non-magnetic material film and third magnetic material film are selectively etched to form mutually aligned top track pole, write gap film and bottom track pole.

78 Claims, 55 Drawing Sheets

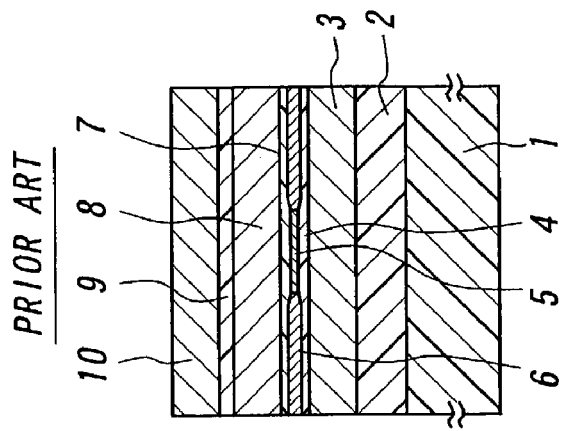
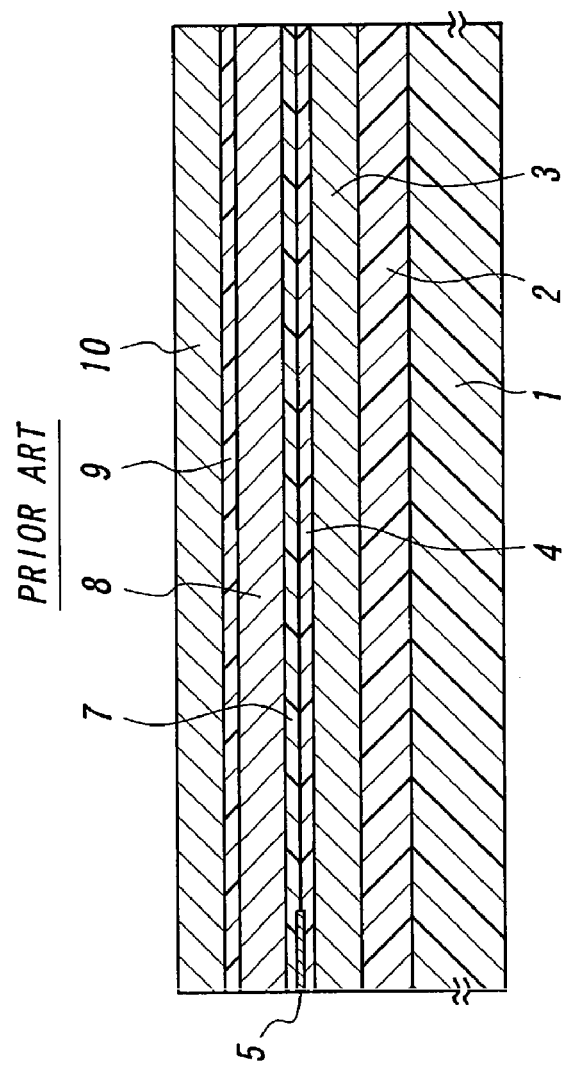

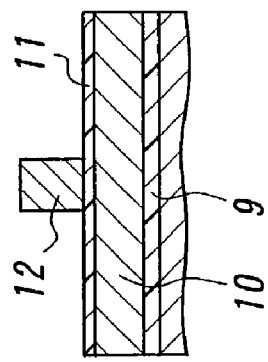
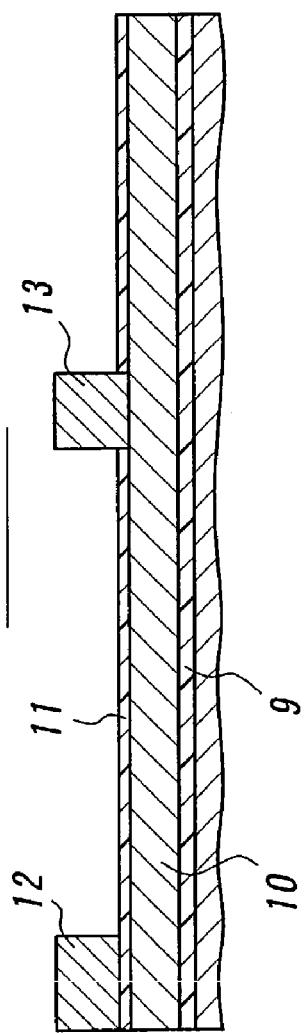

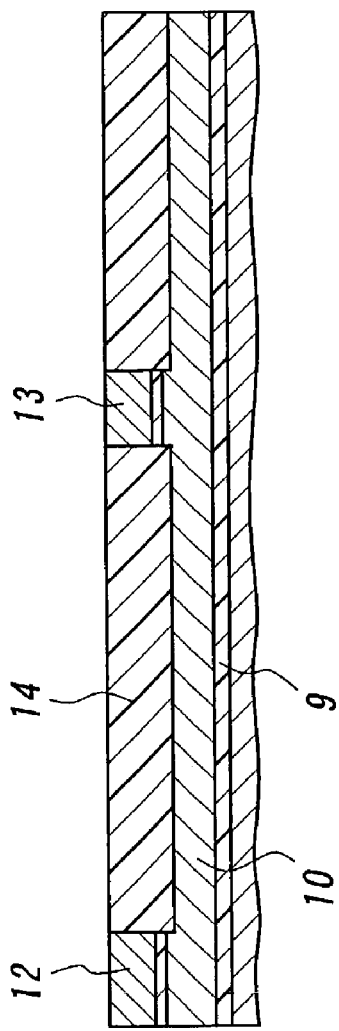
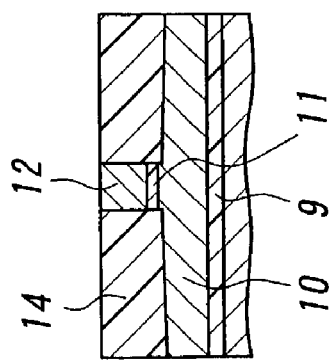
FIG. 3A PRIOR ART
FIG. 3B PRIOR ART

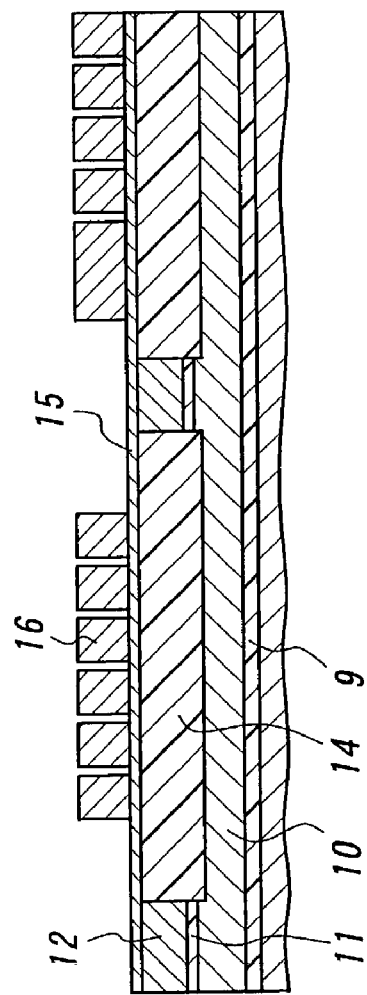
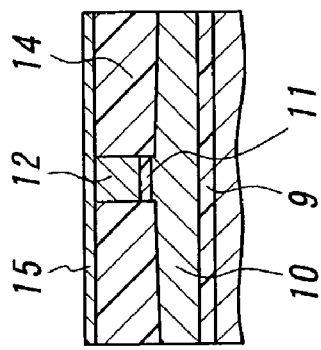
FIG. 4A PRIOR ART
FIG. 4B PRIOR ART

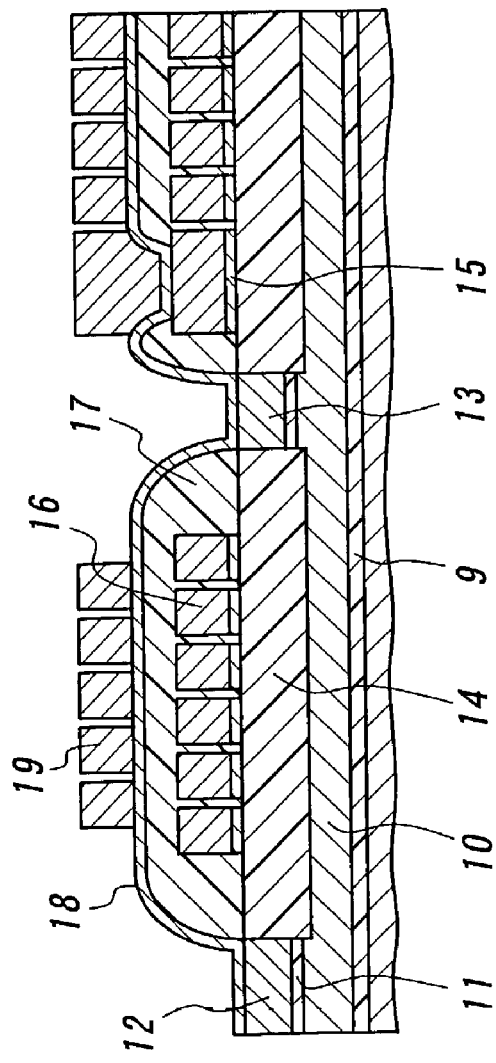
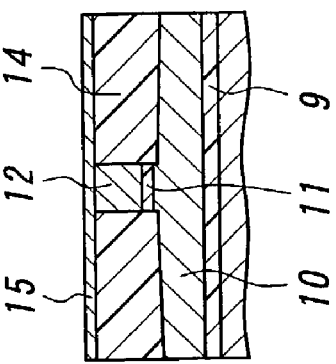
FIG. 7A PRIOR ART
FIG. 7B PRIOR ART

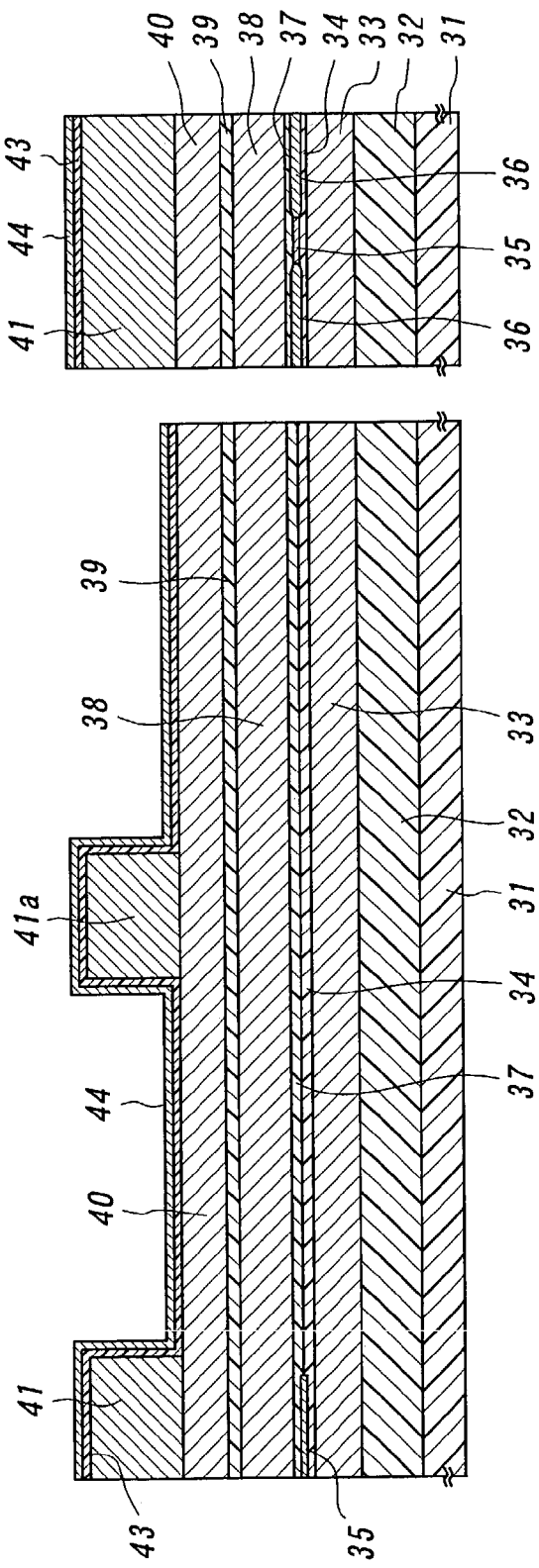

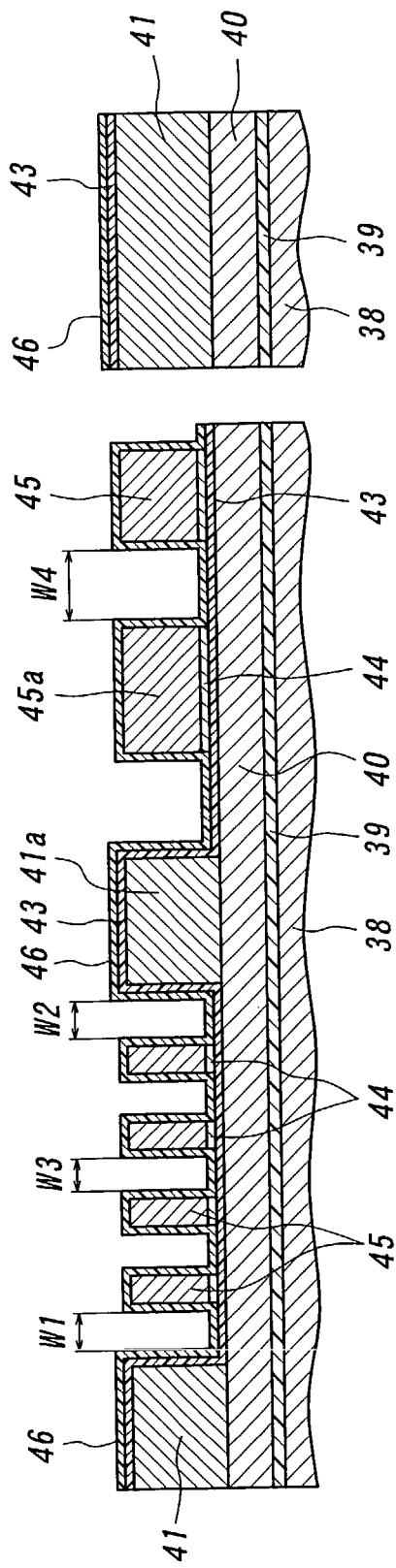

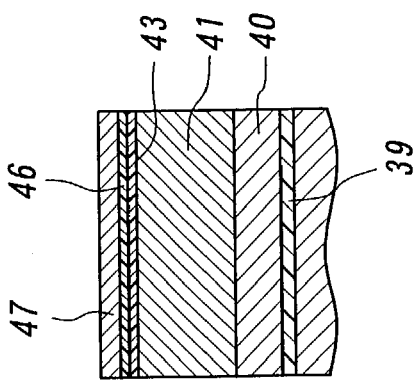
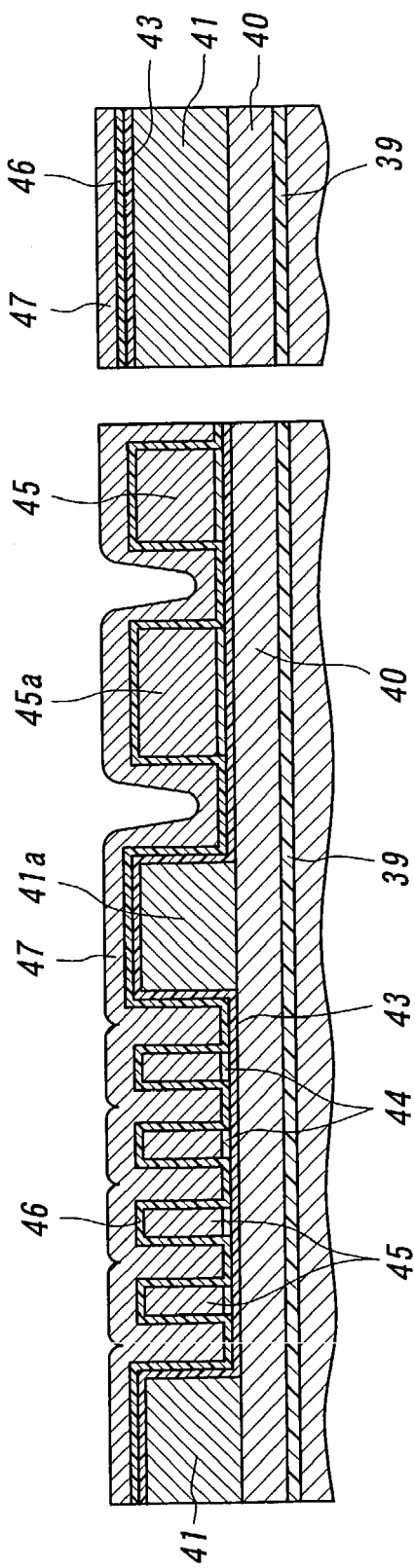

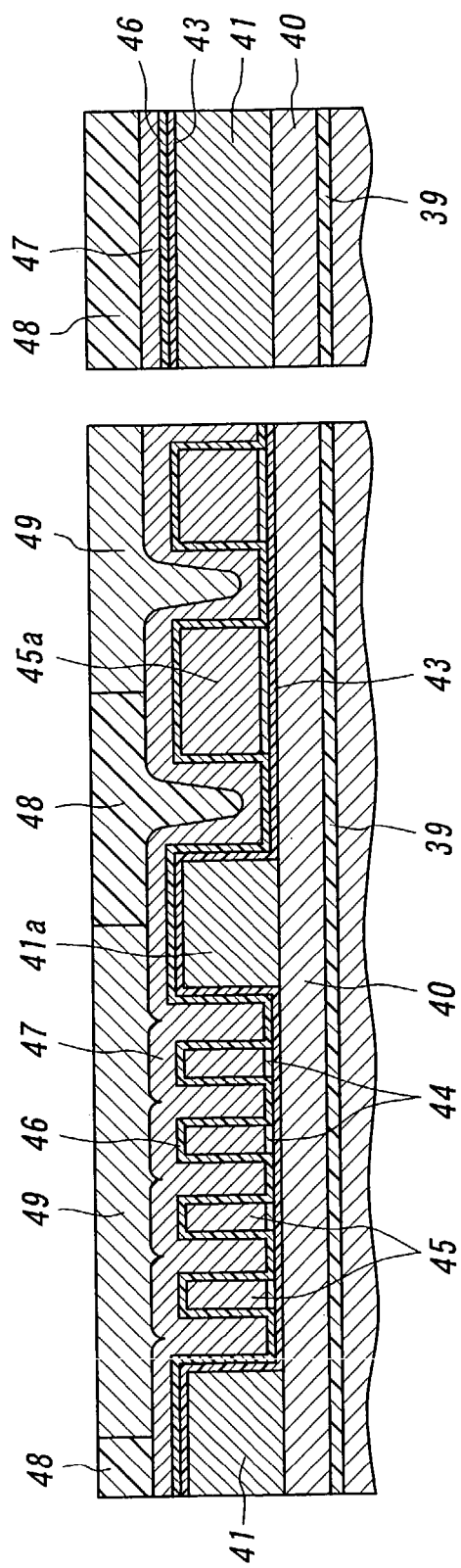

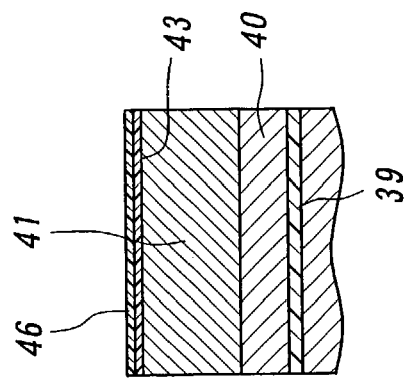
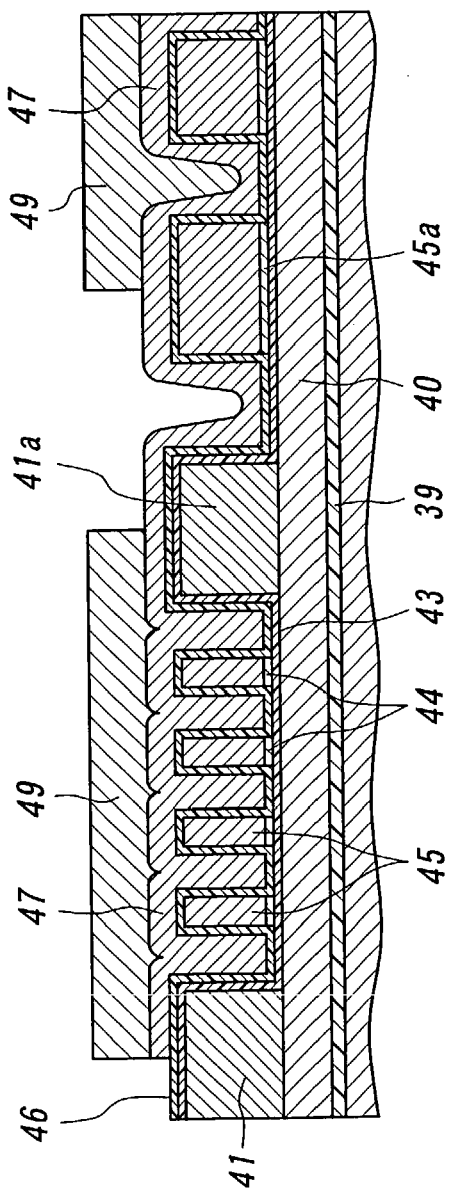

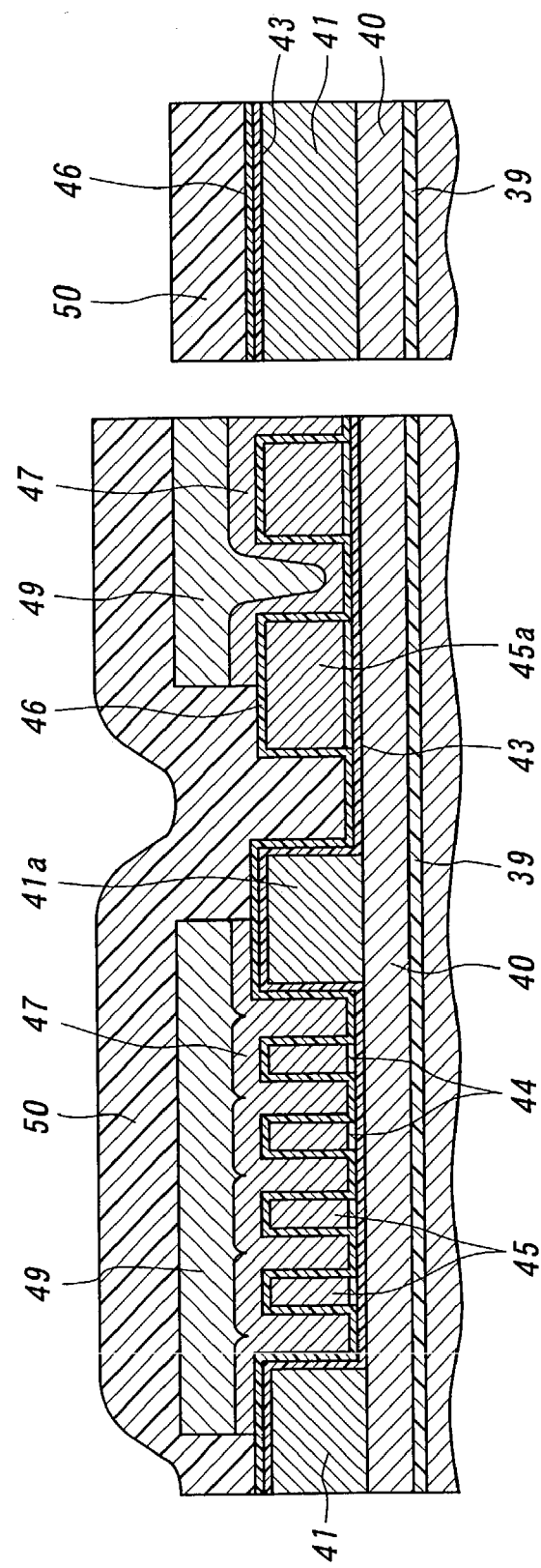

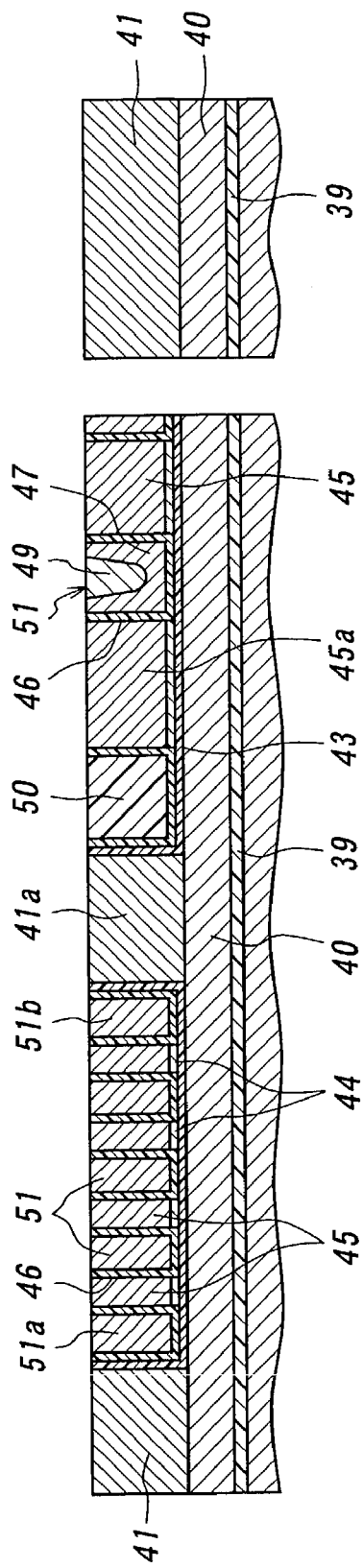

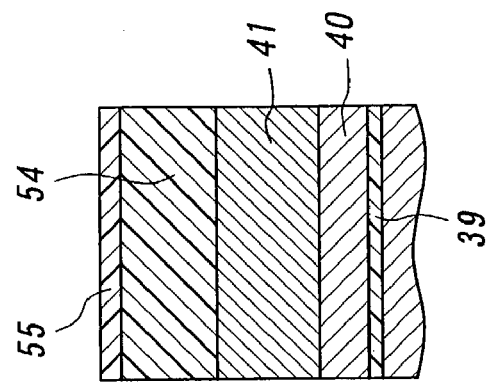
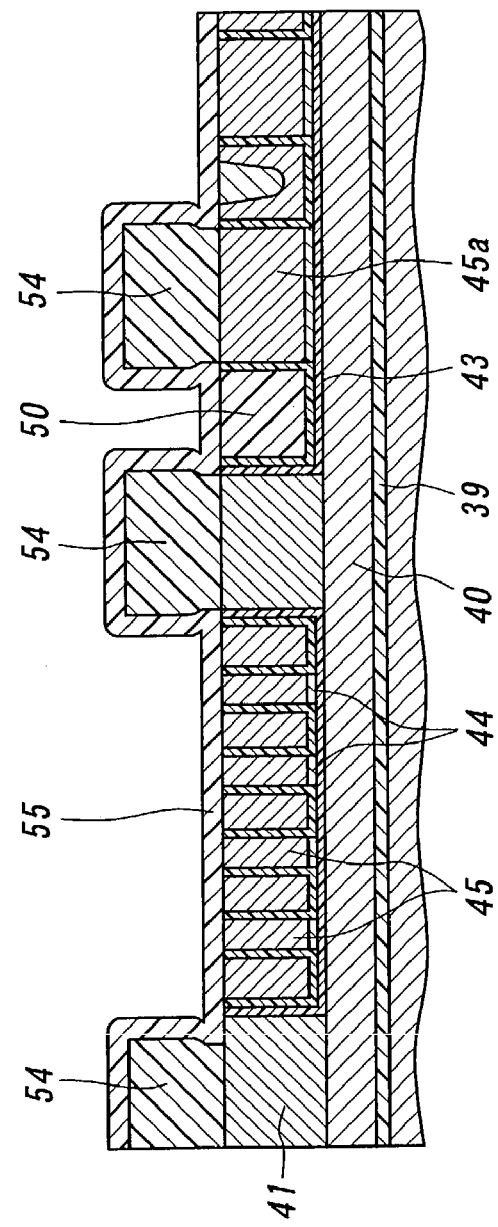
FIG. 18A
FIG. 18B

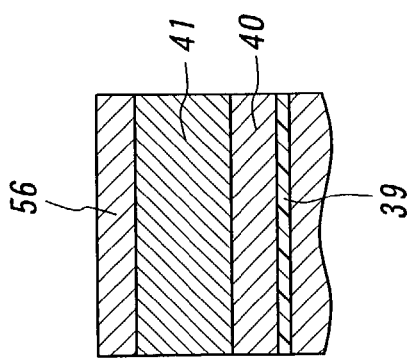
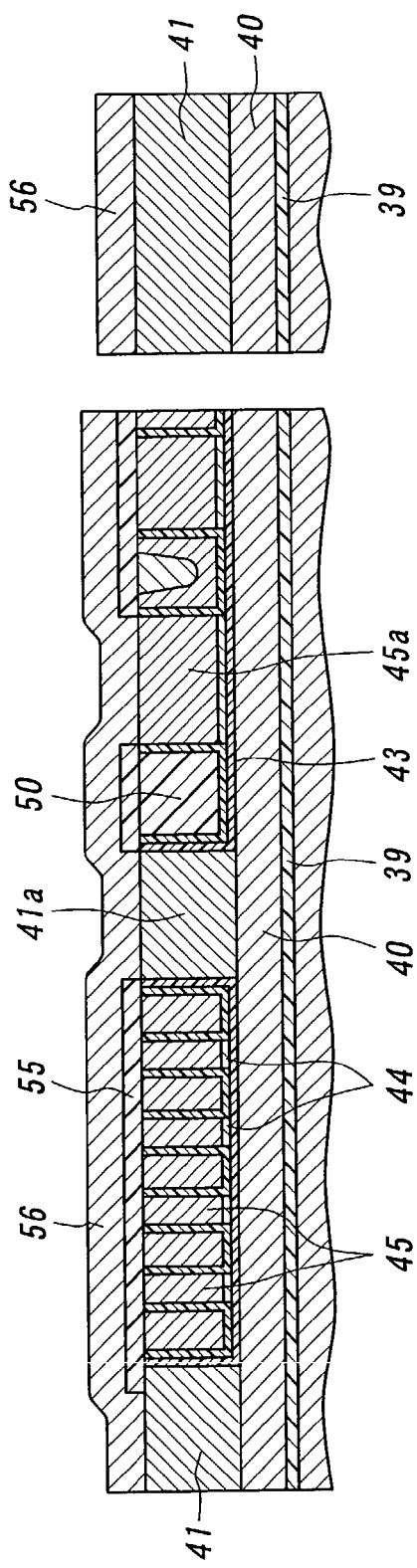

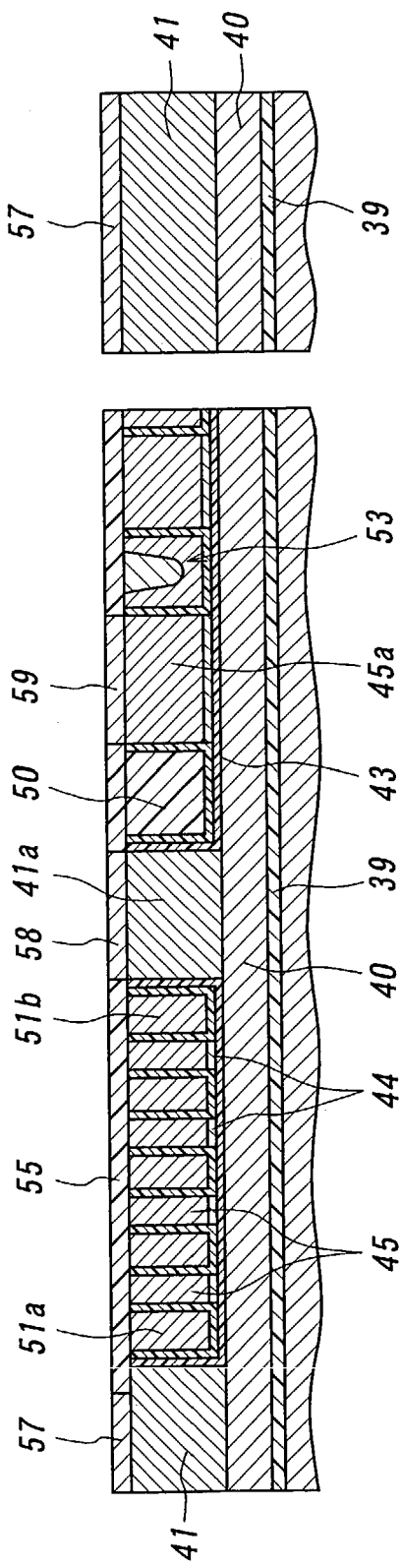

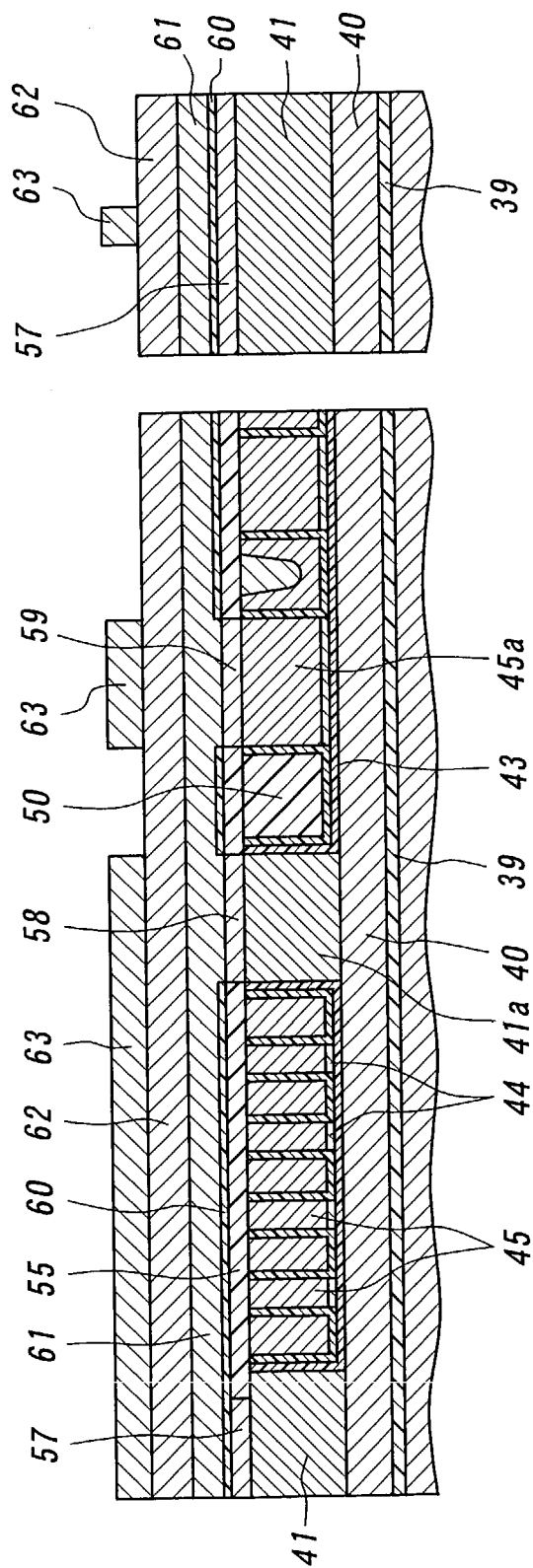

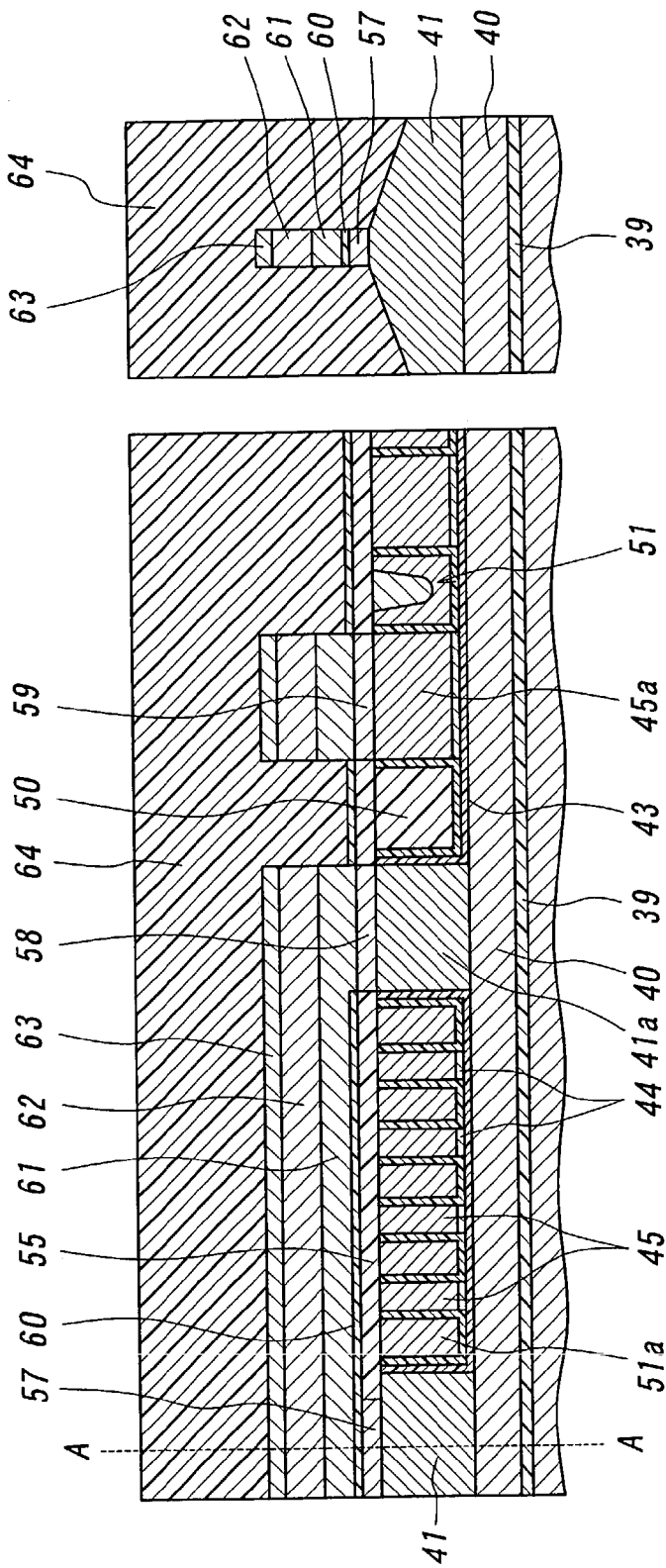

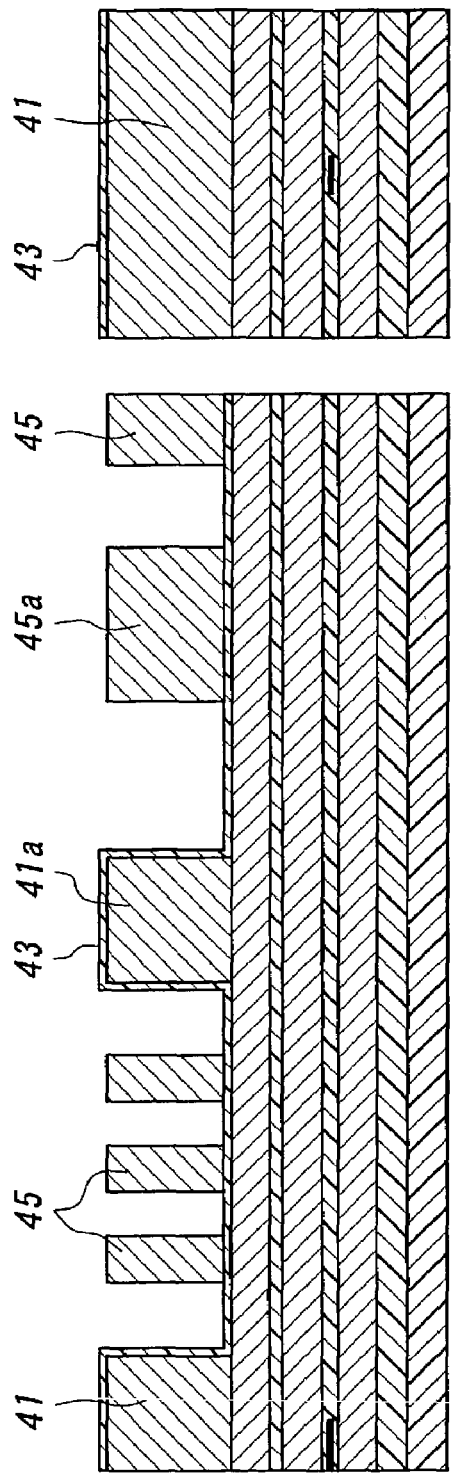

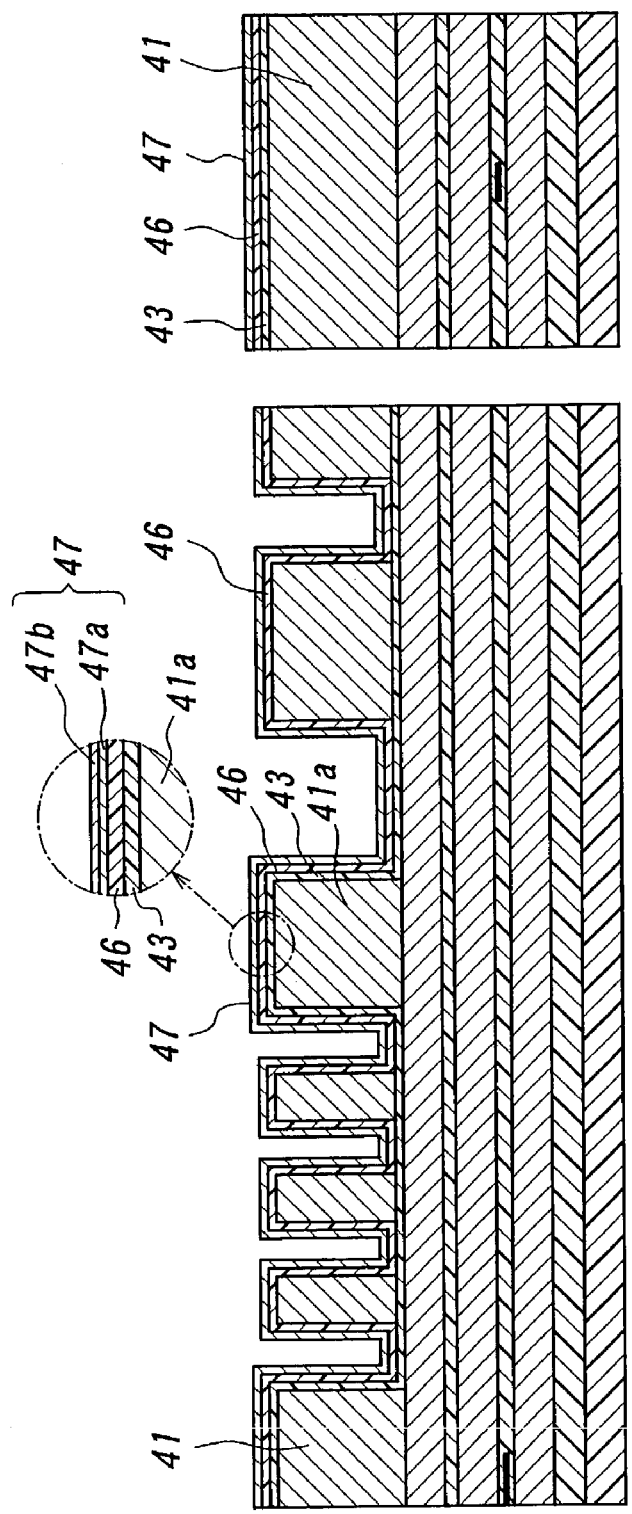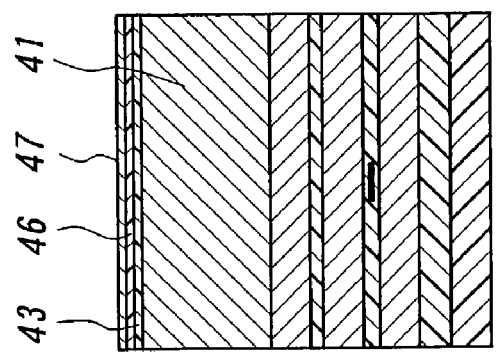

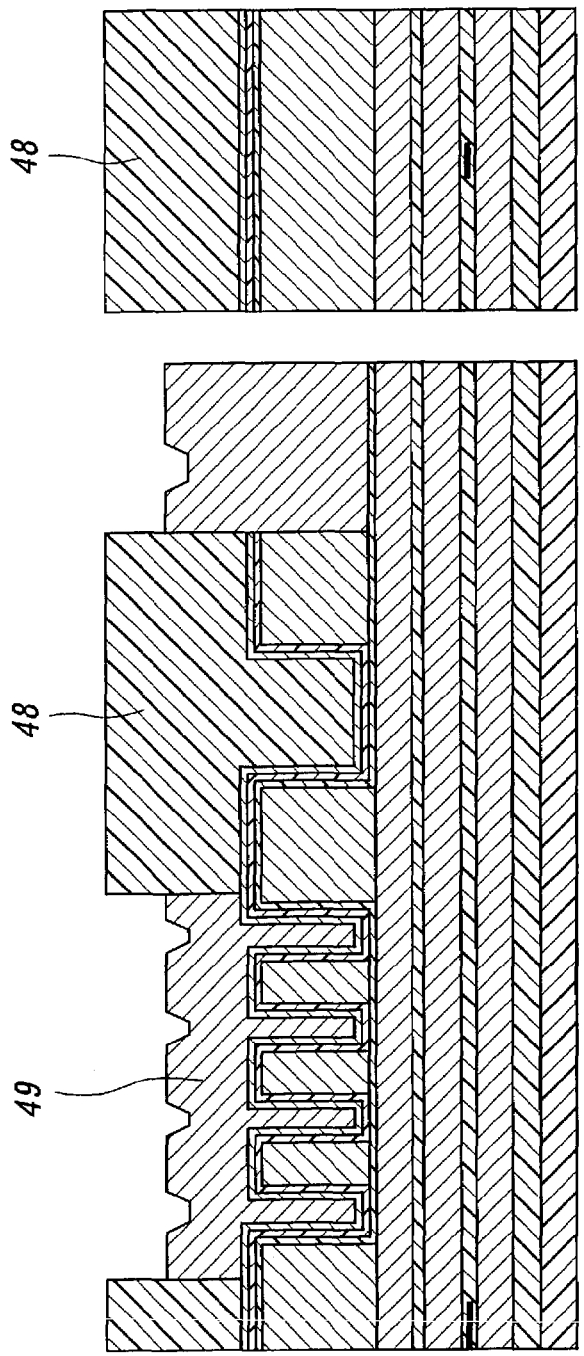

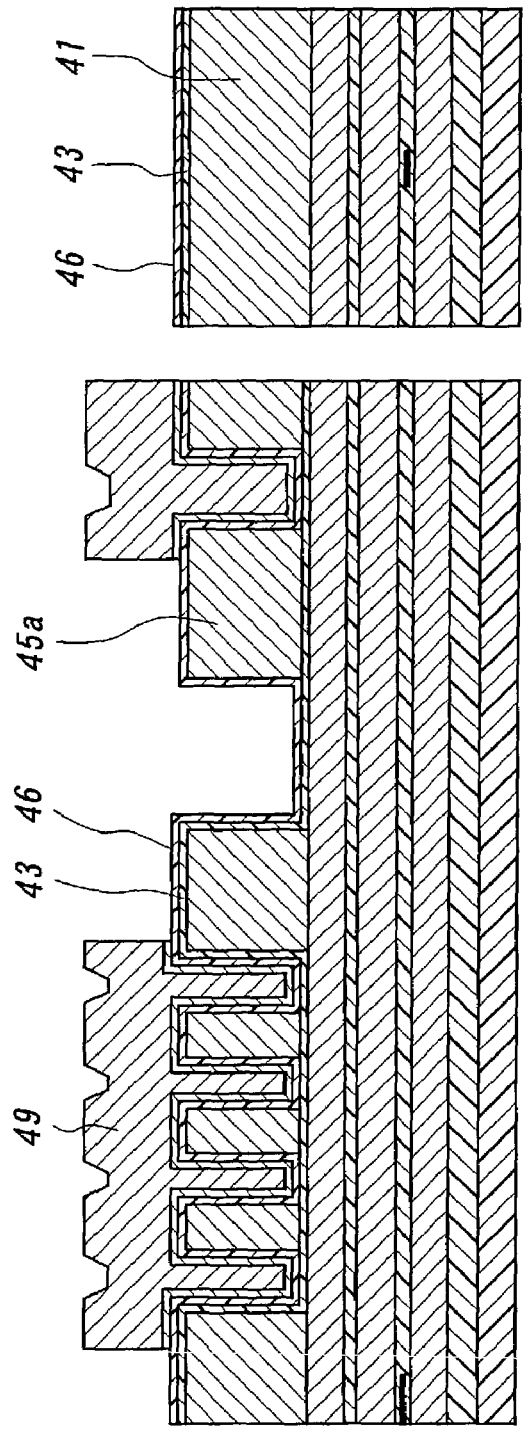

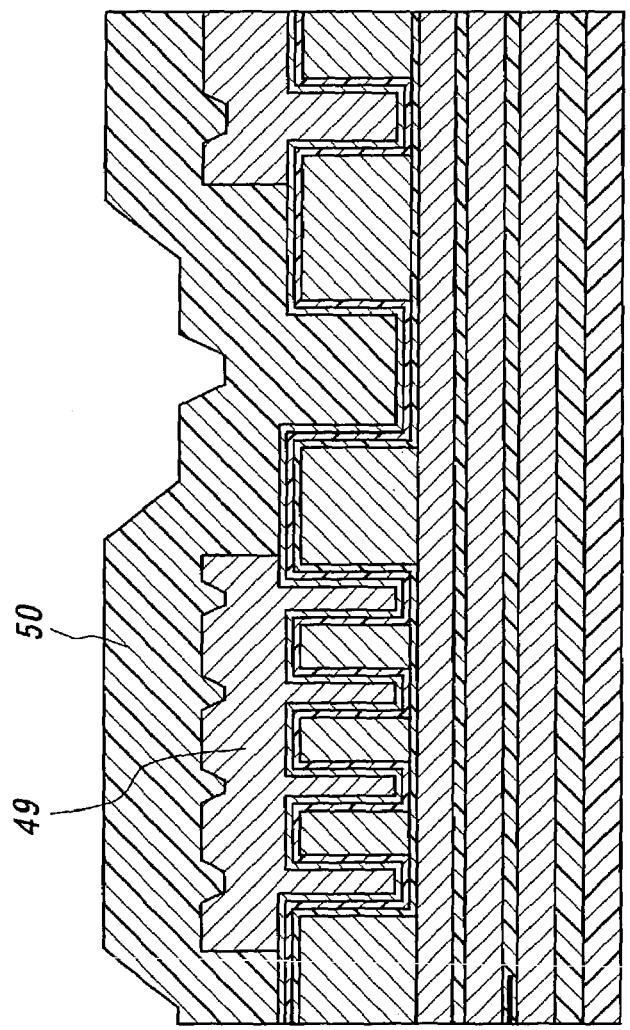

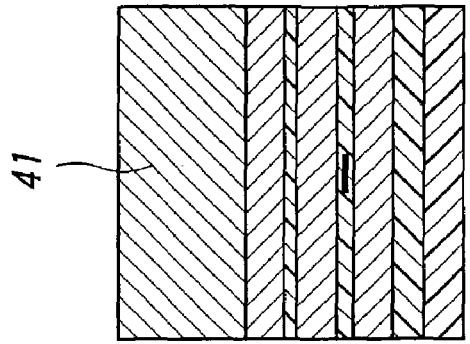
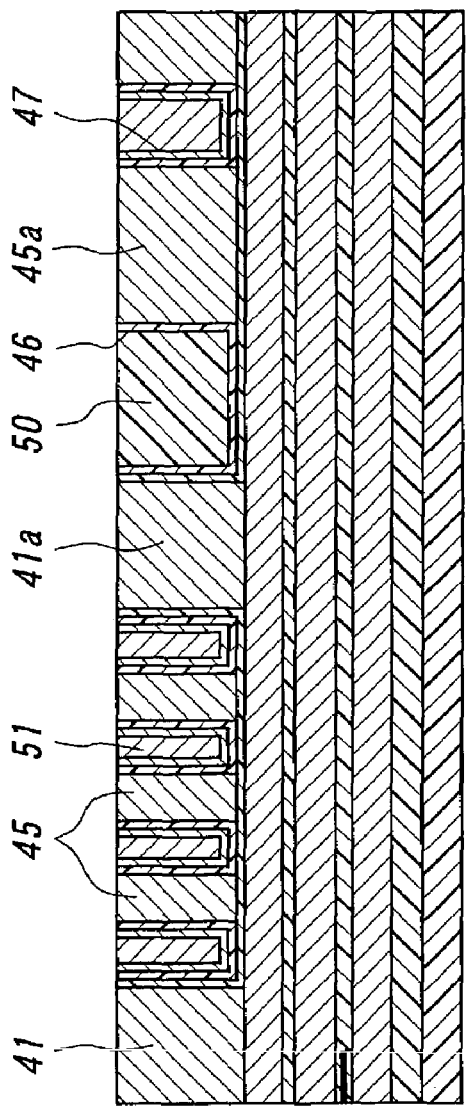
FIG. 30A
FIG. 30B

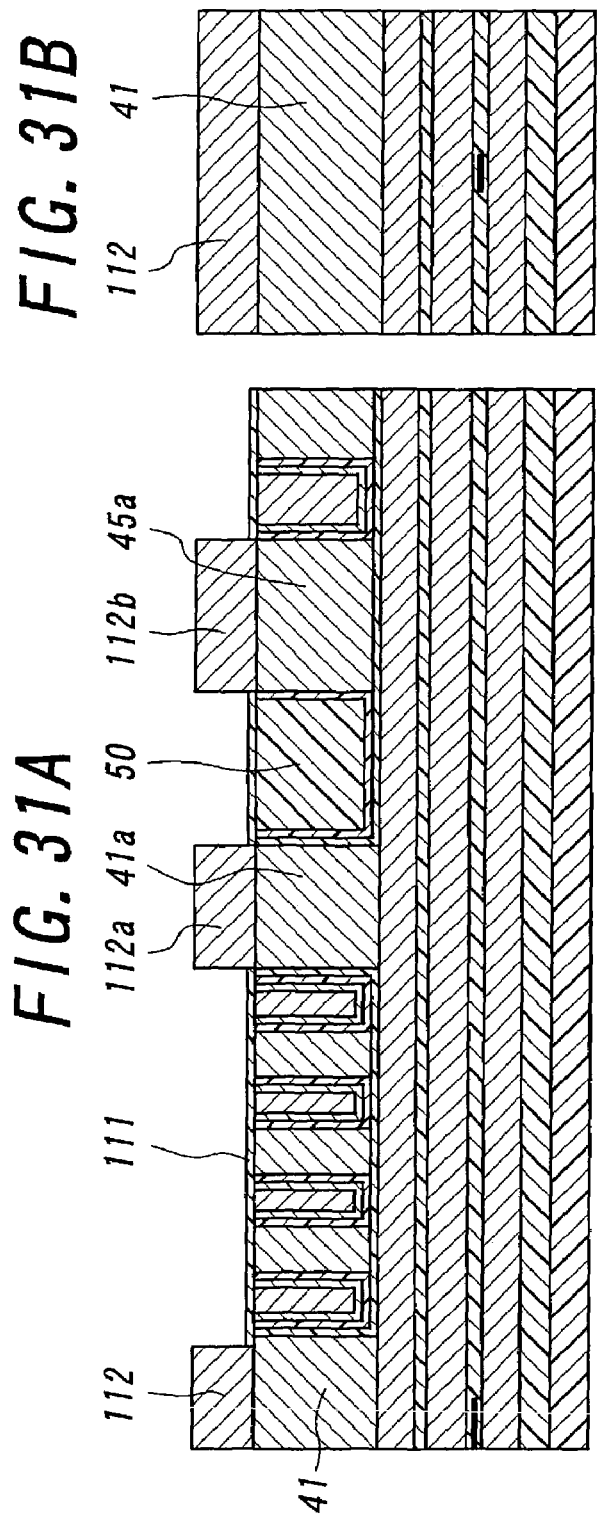

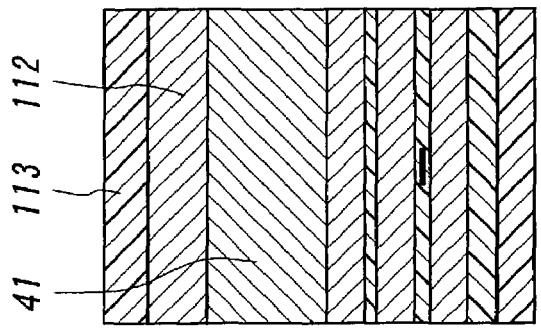
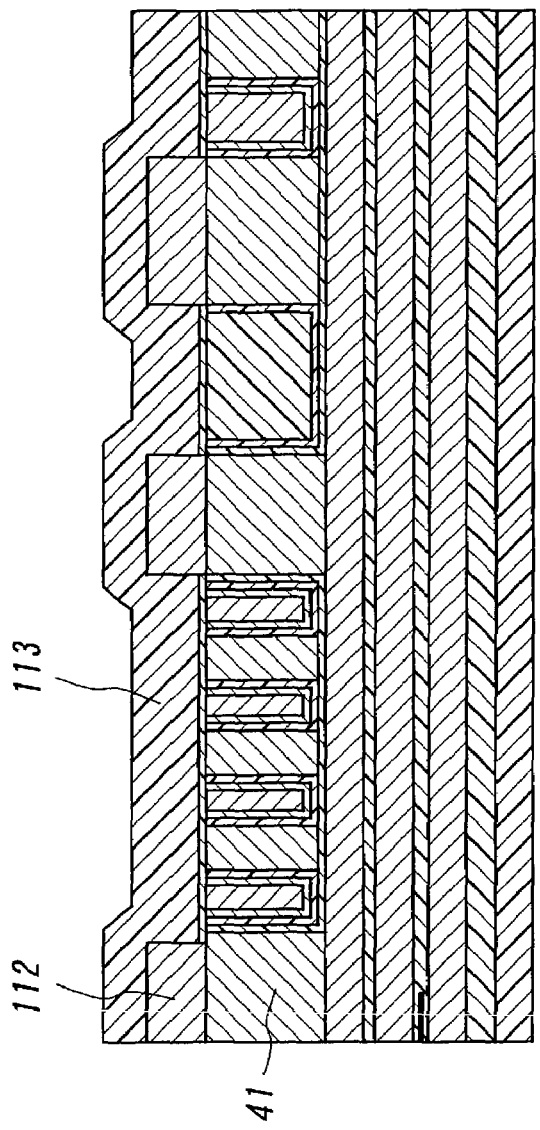

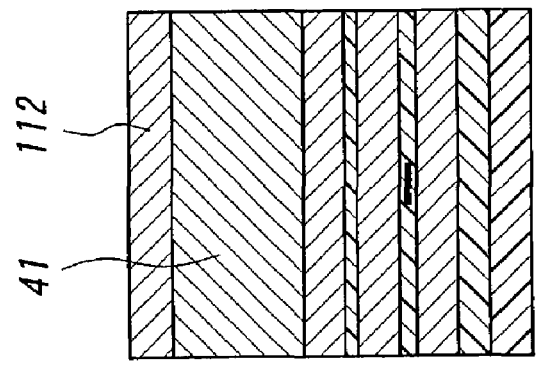
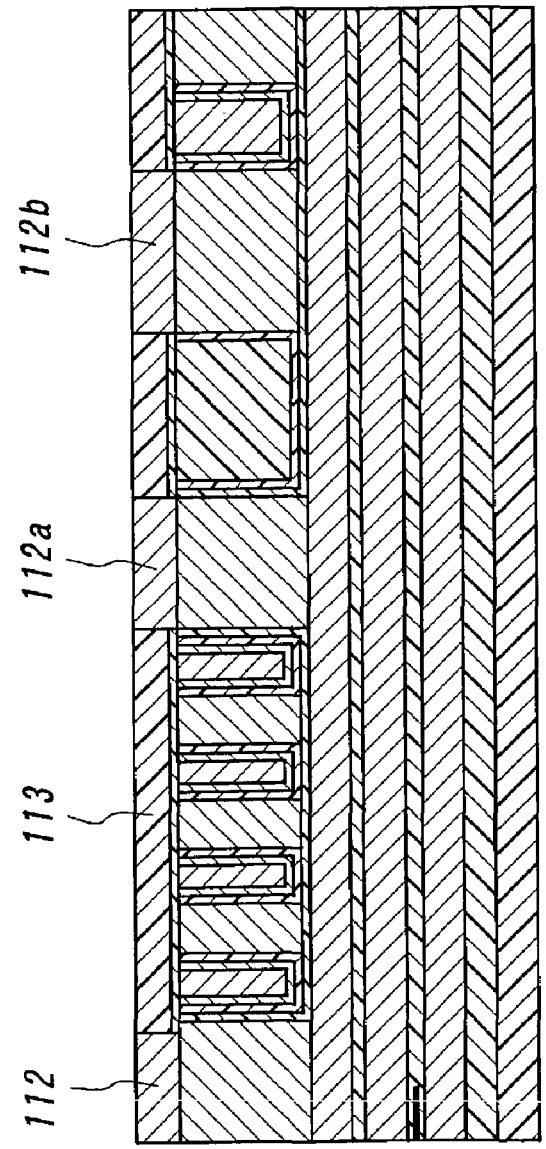
FIG. 33B
FIG. 33A

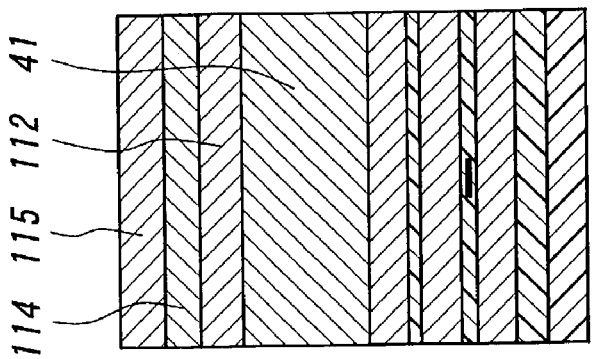
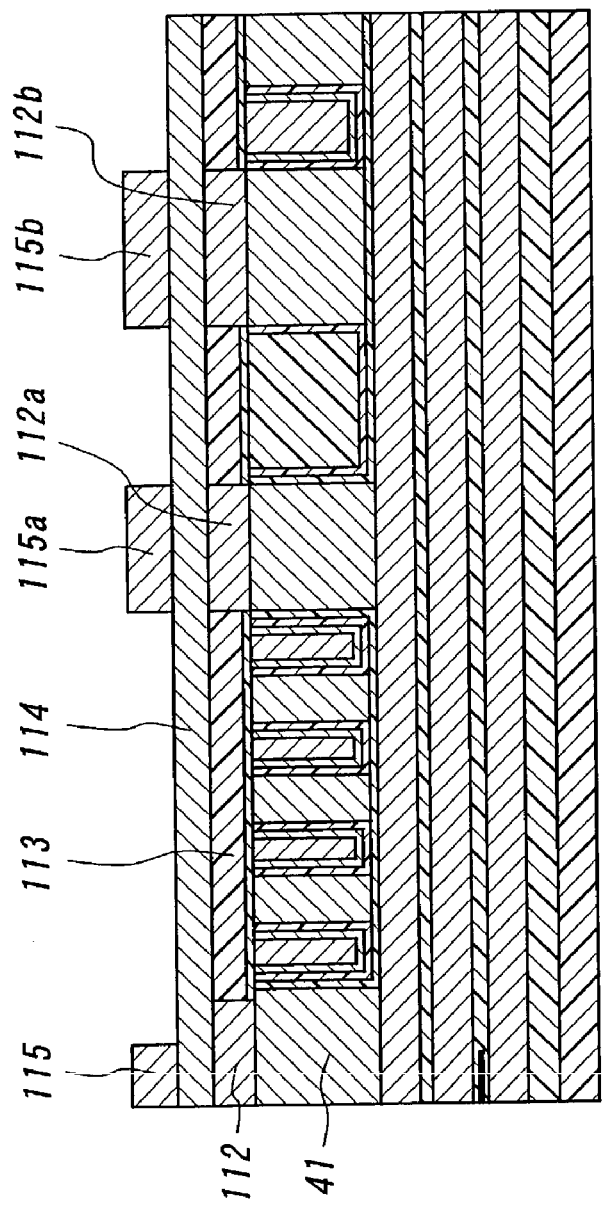

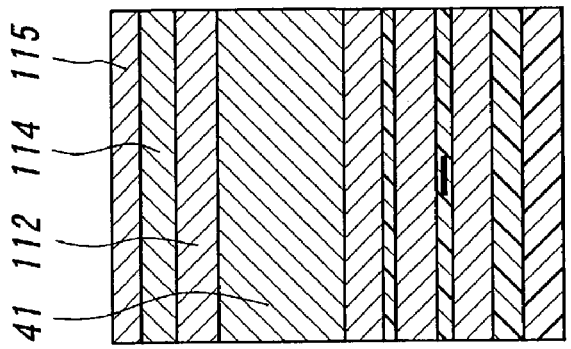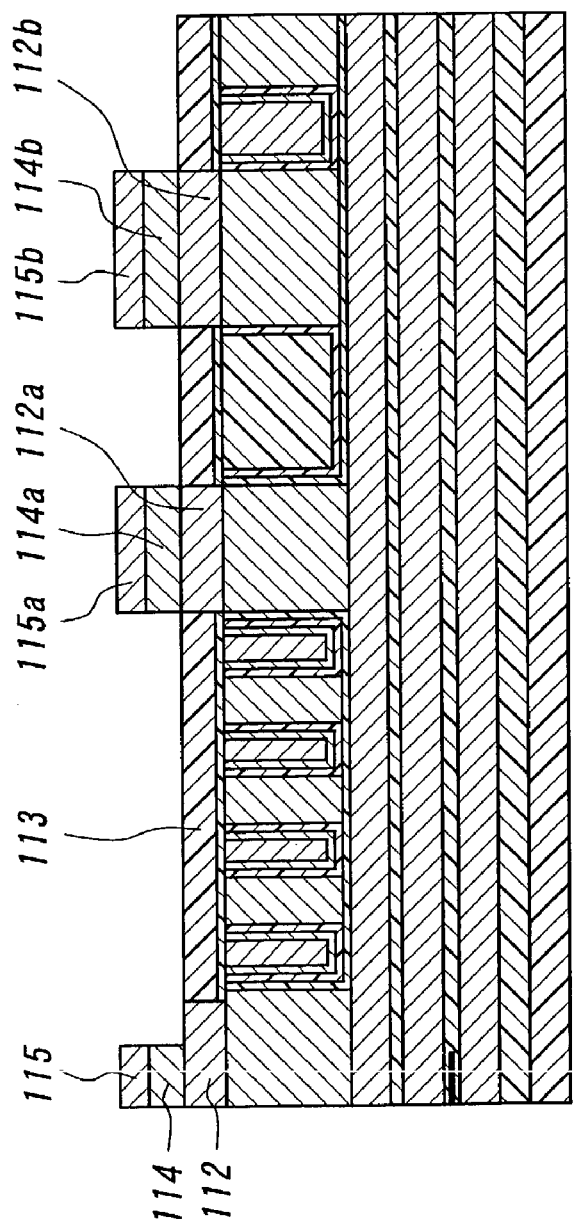

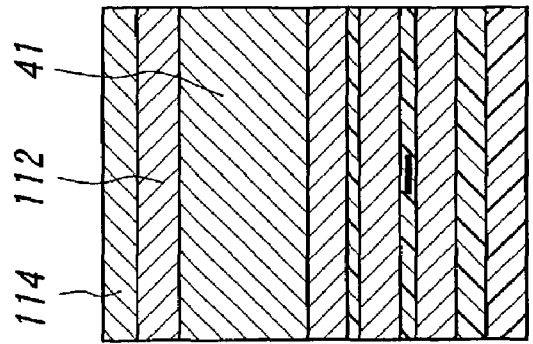
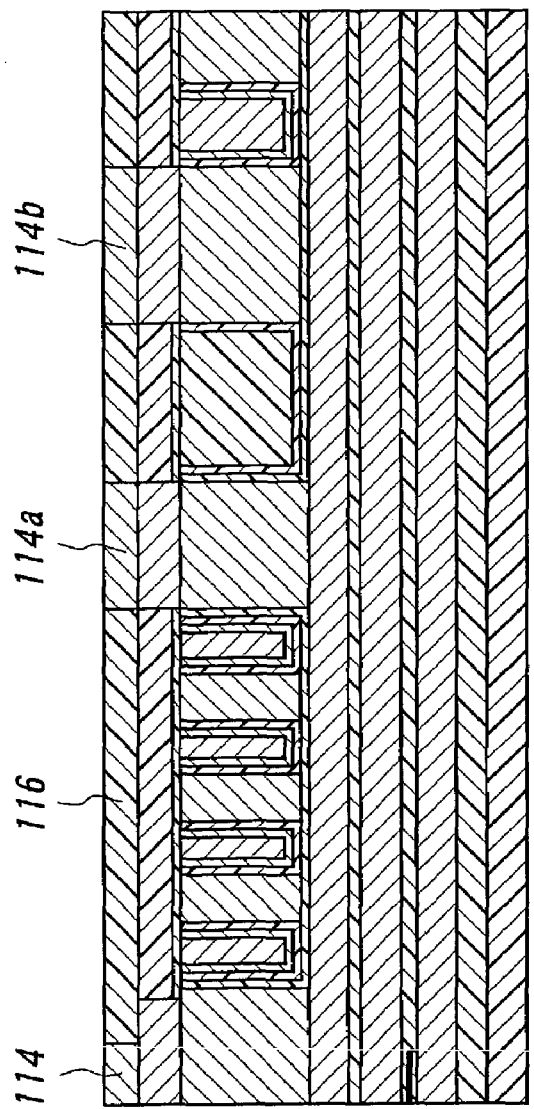
FIG. 36B
FIG. 36A

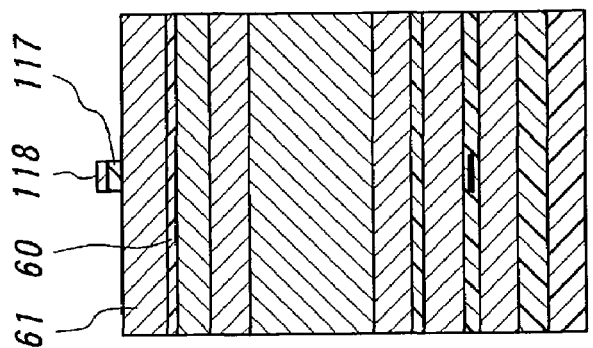
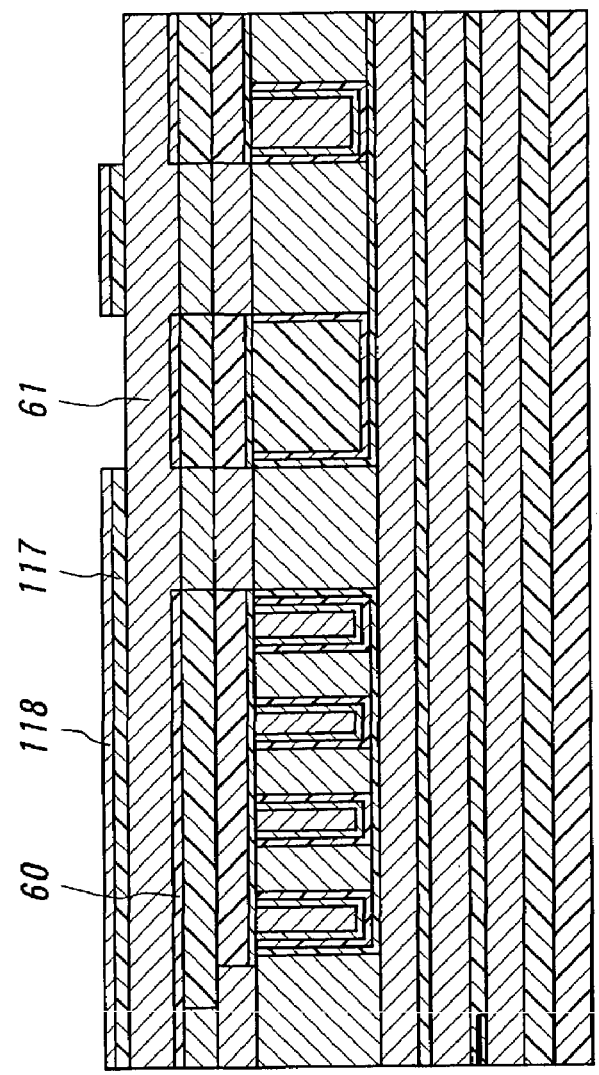

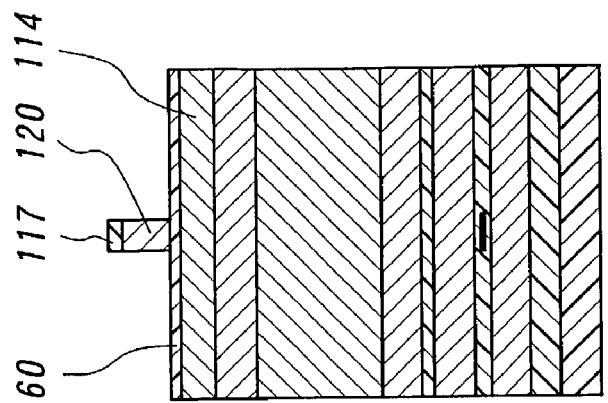
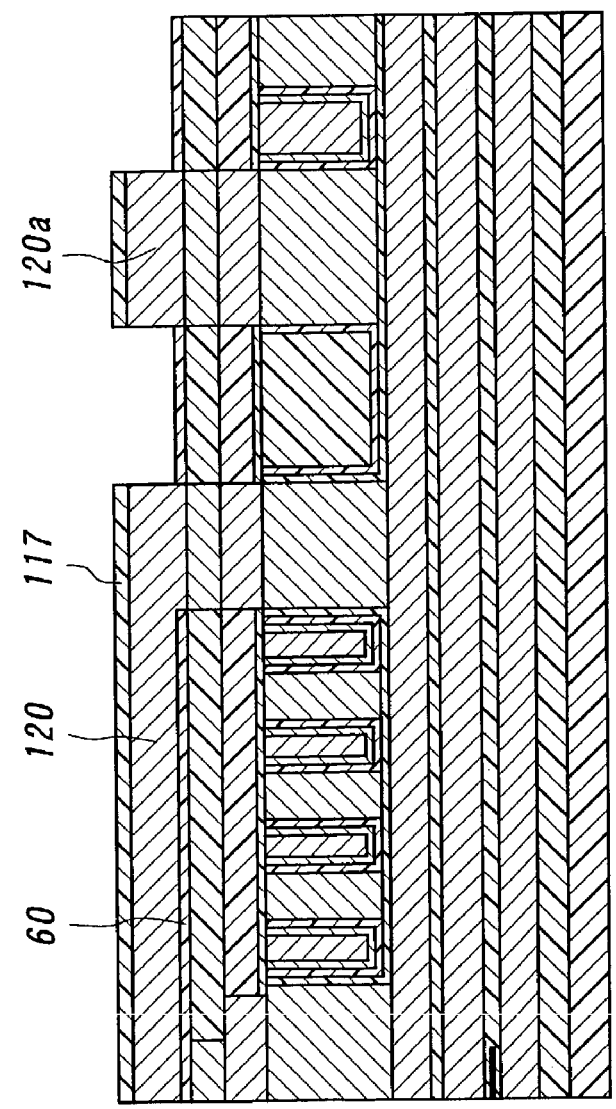

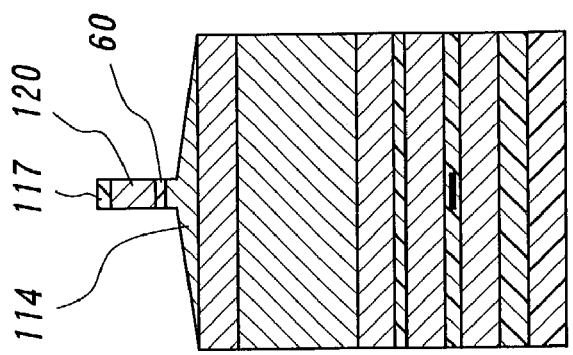
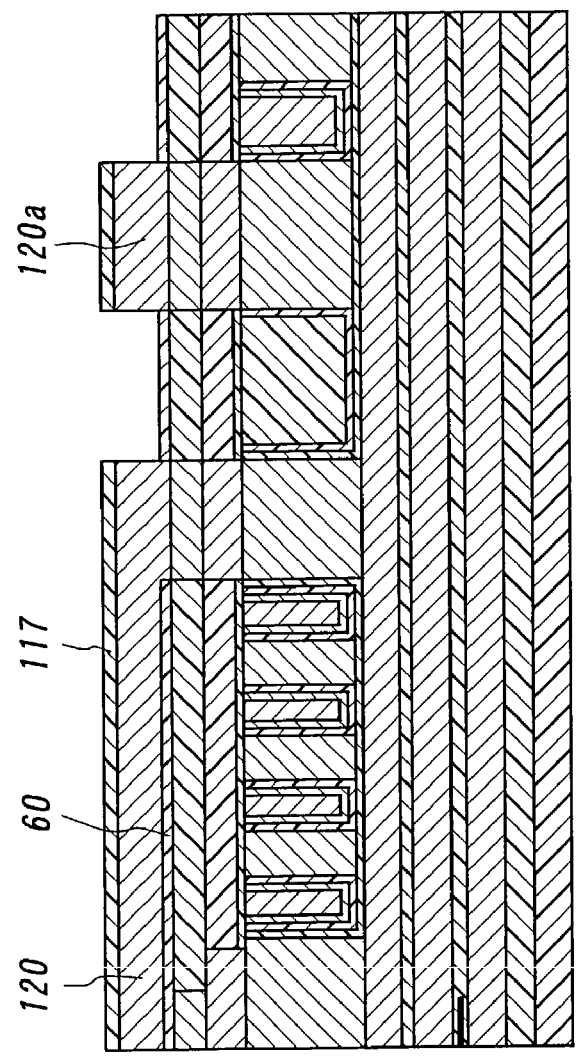

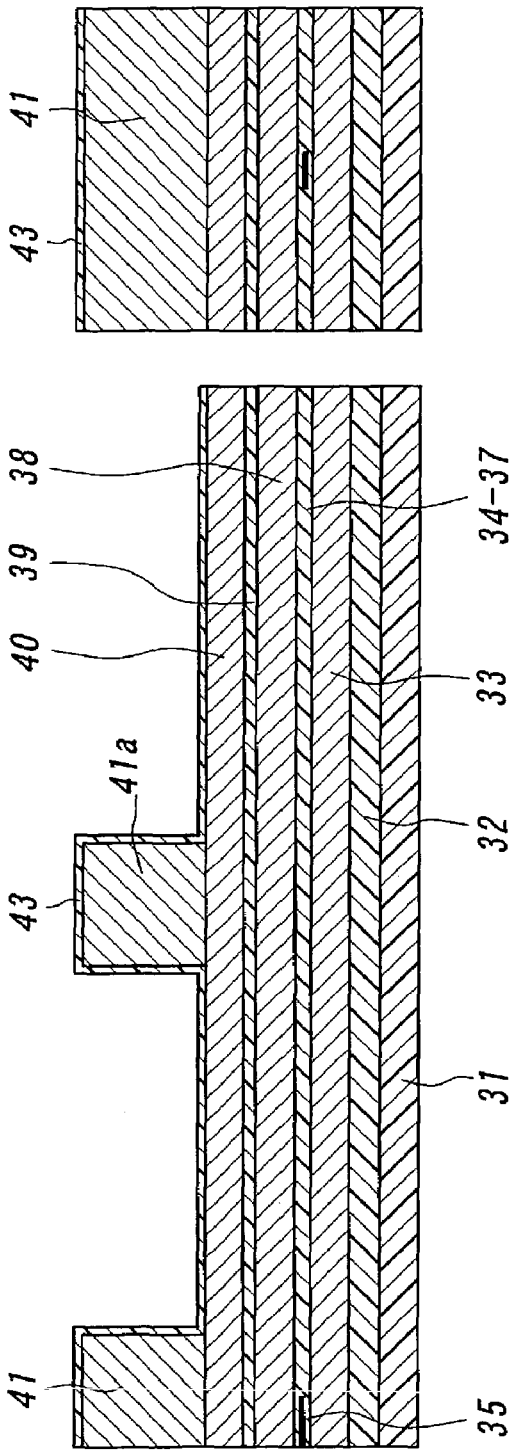

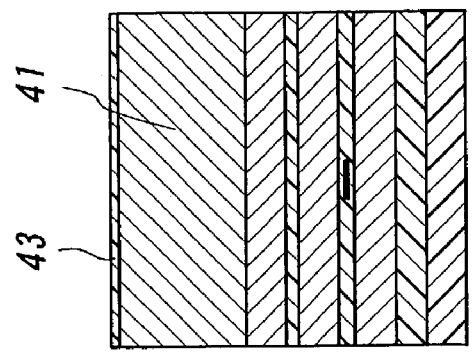
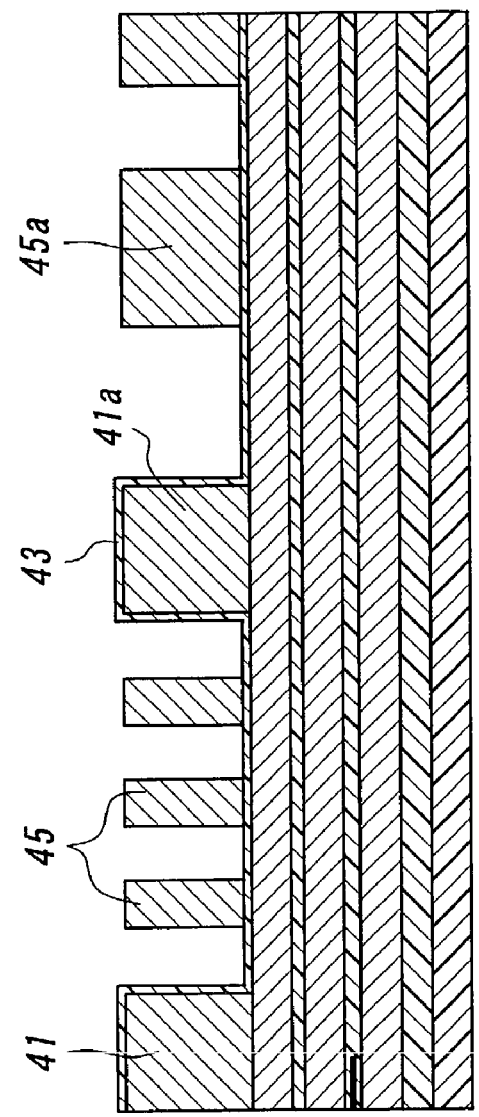
FIG. 43B
FIG. 43A

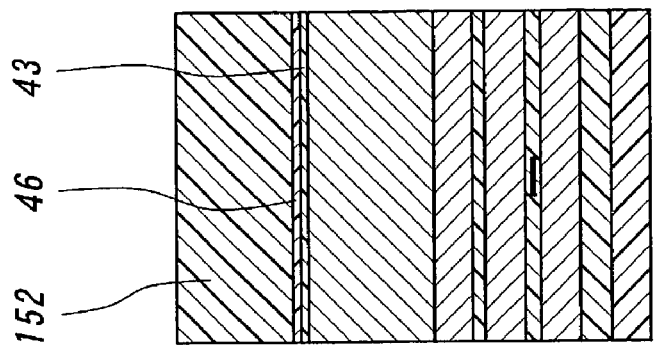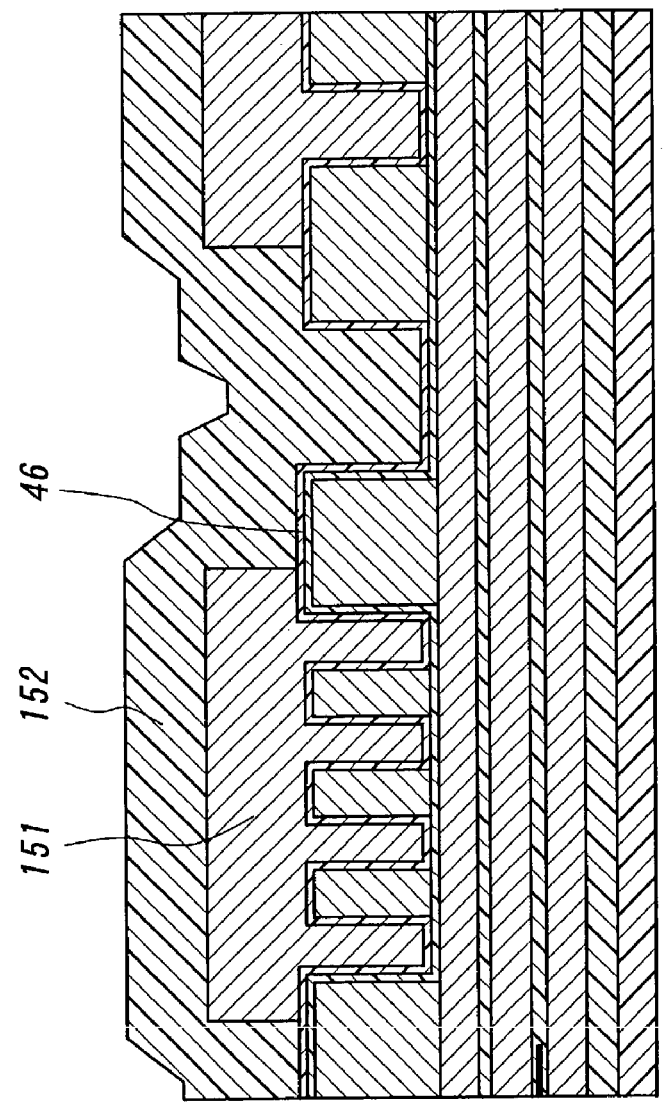

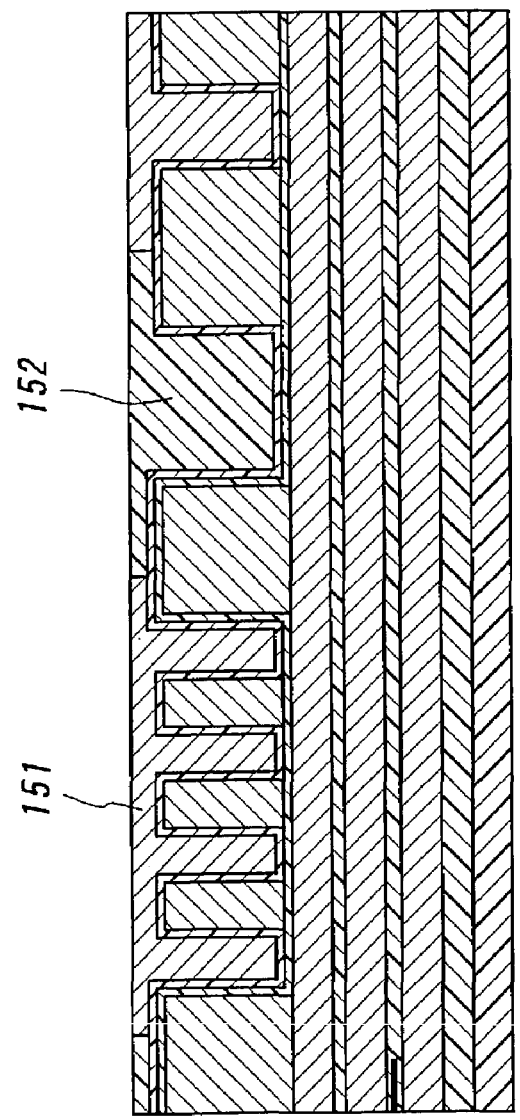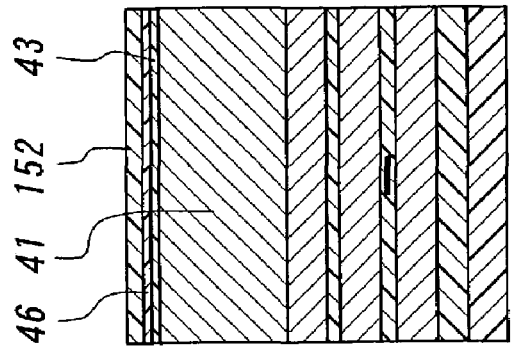

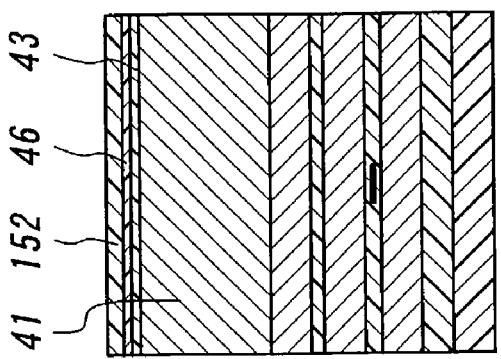
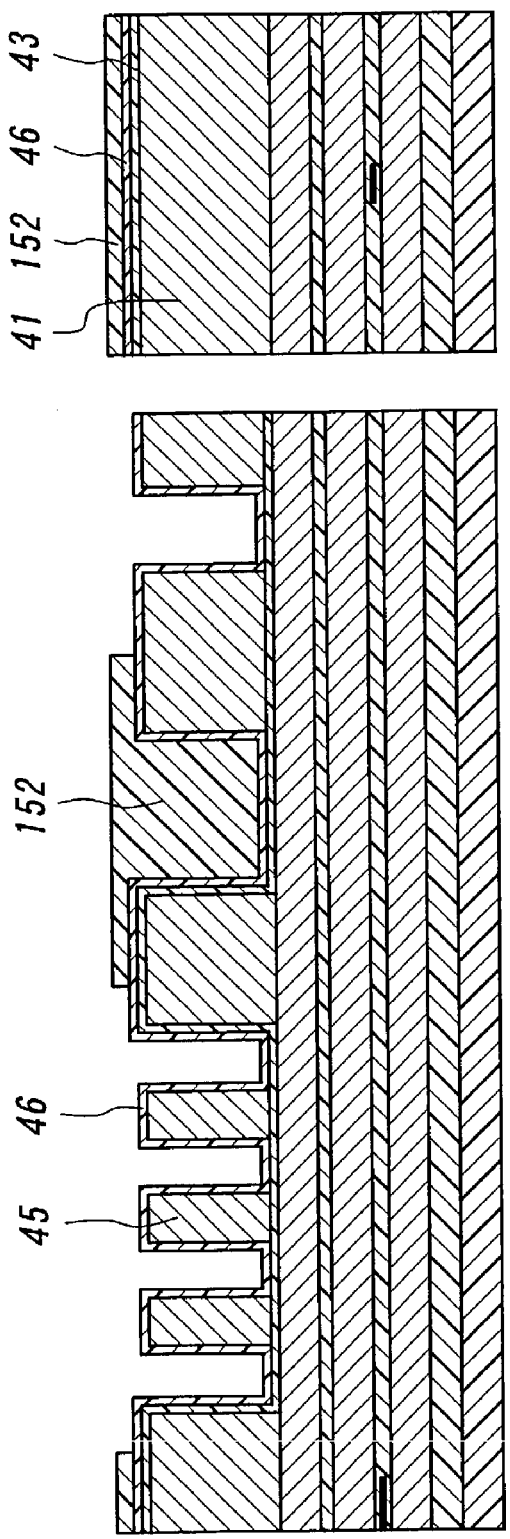

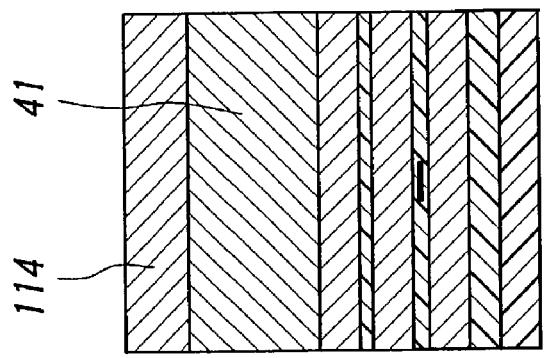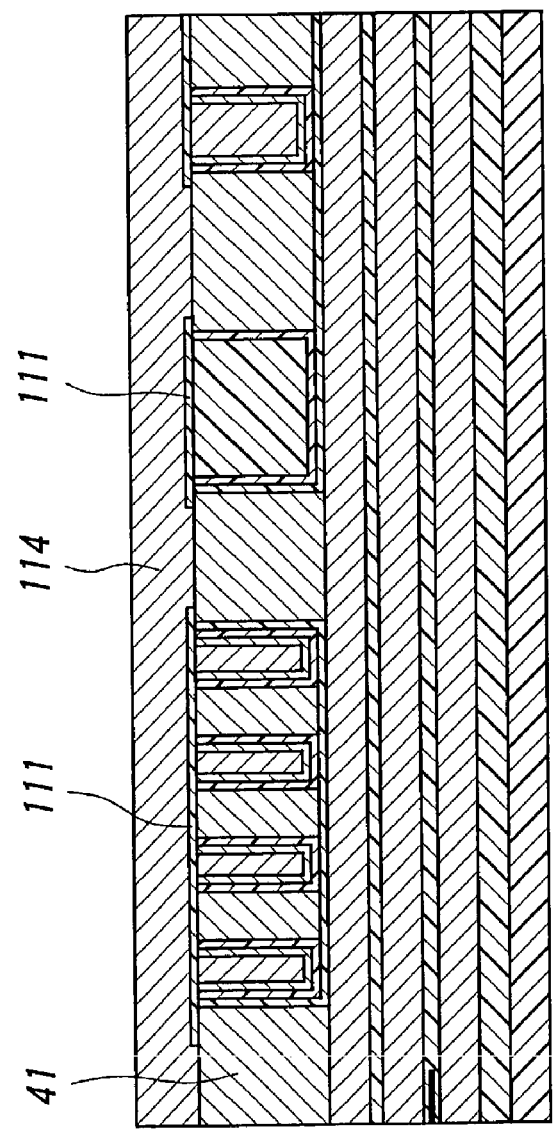

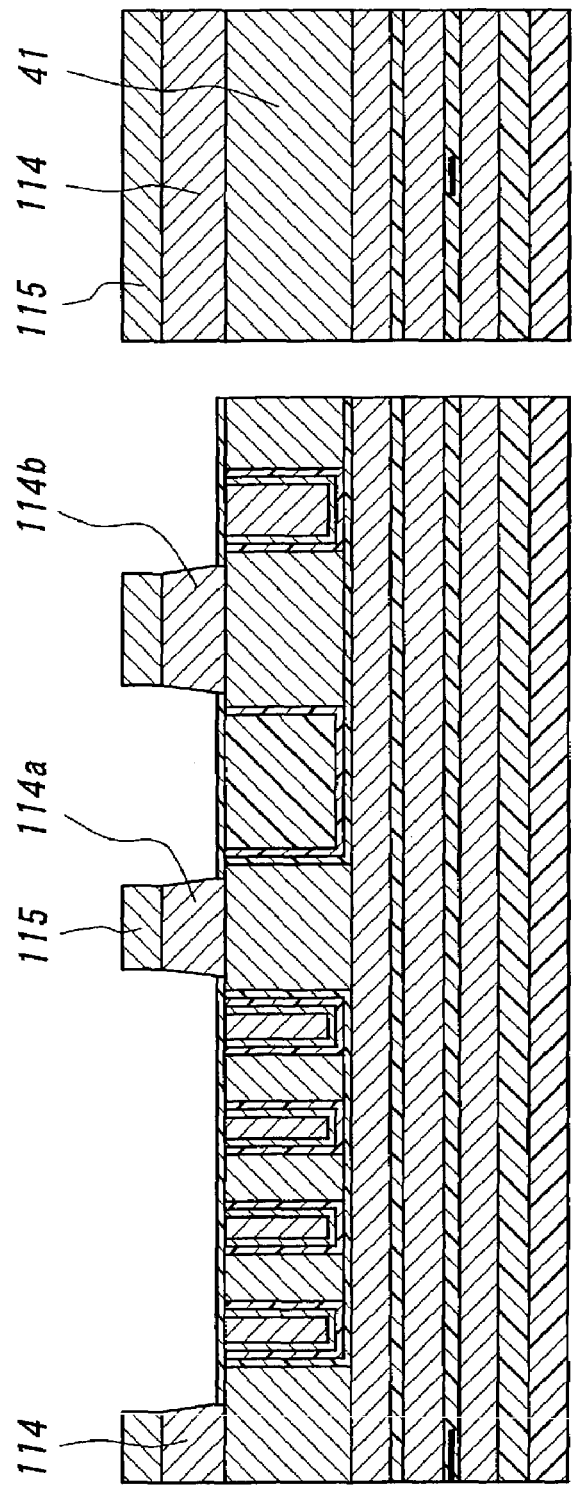

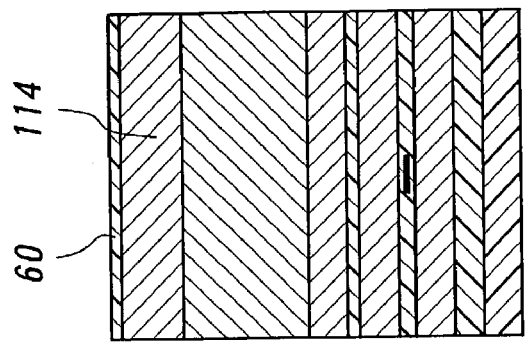
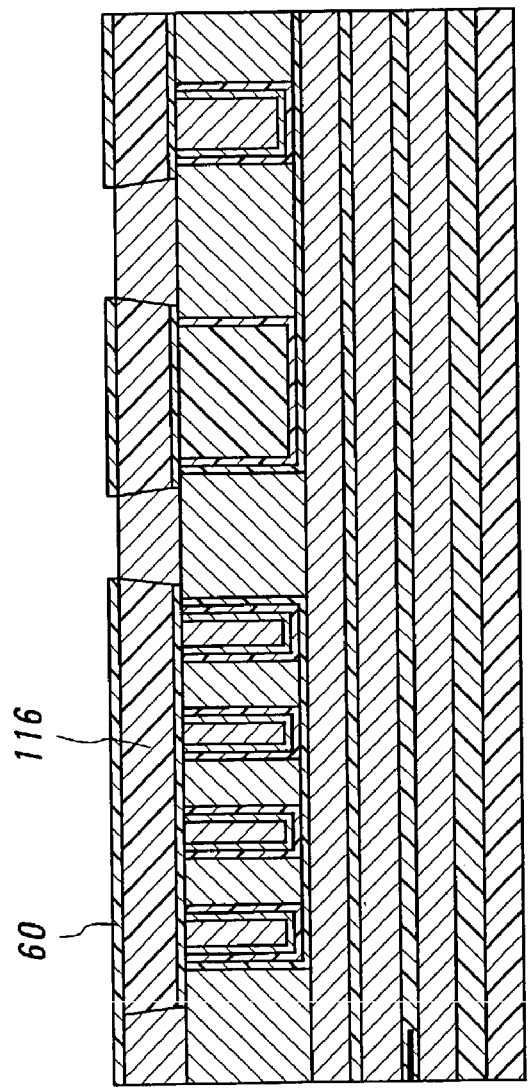

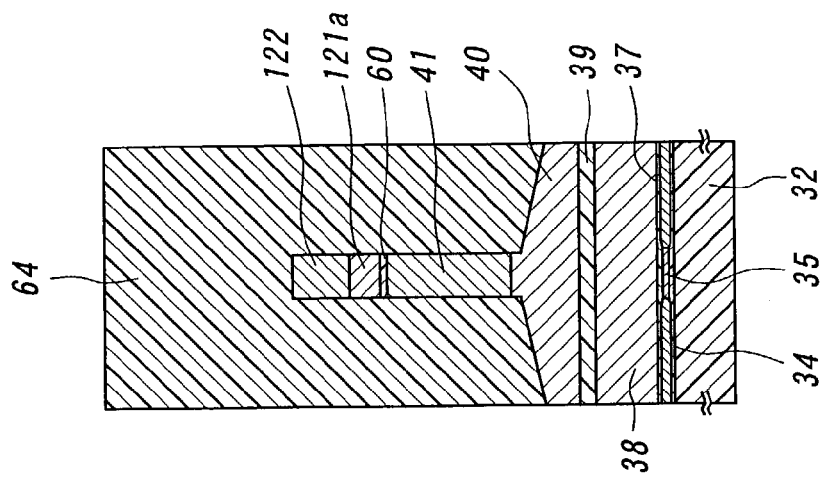
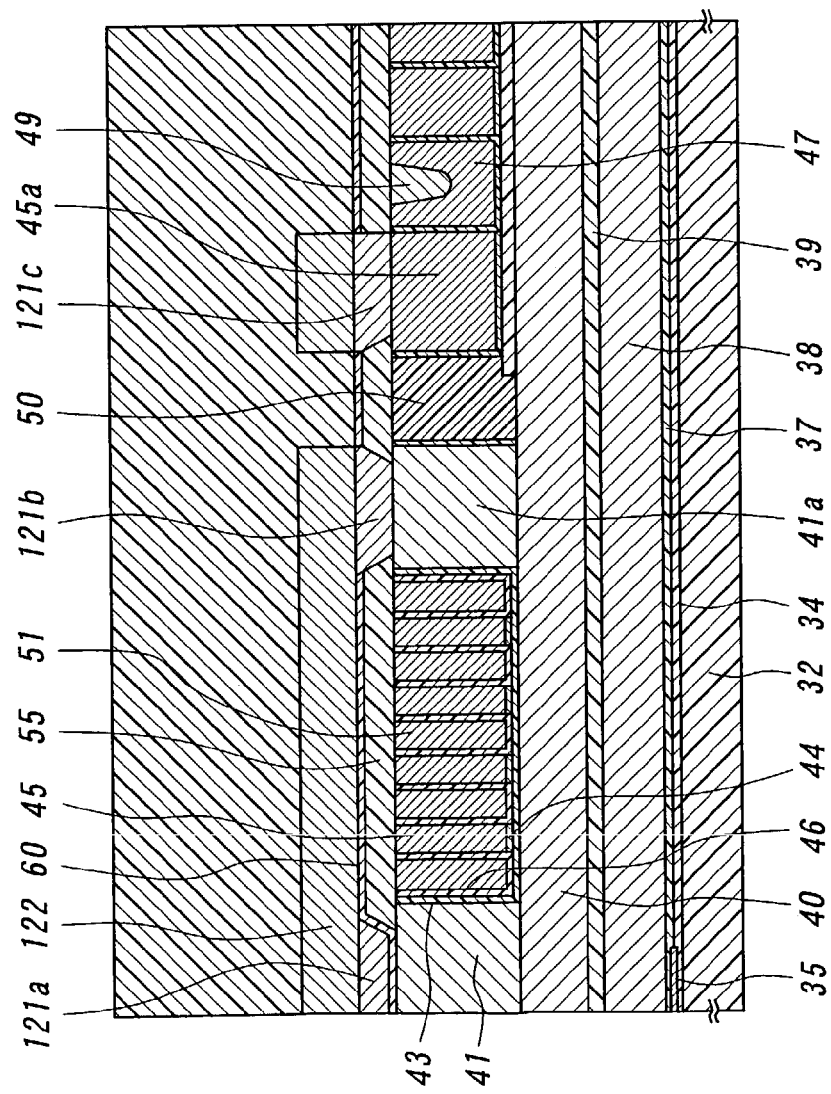

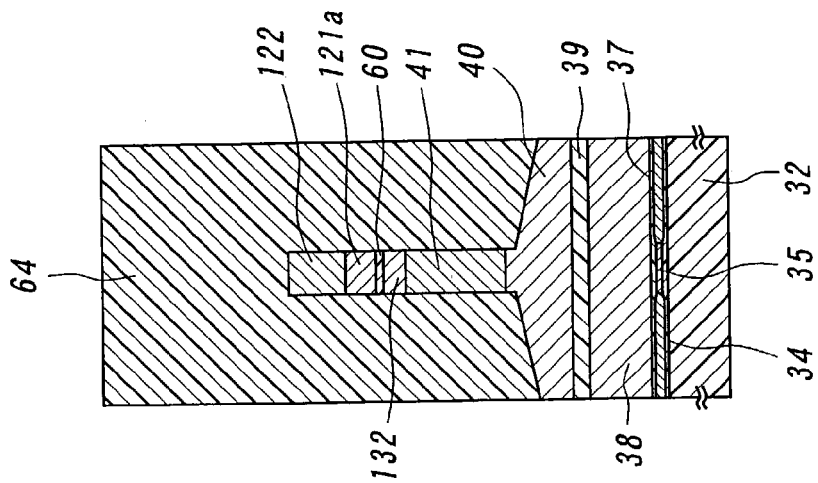
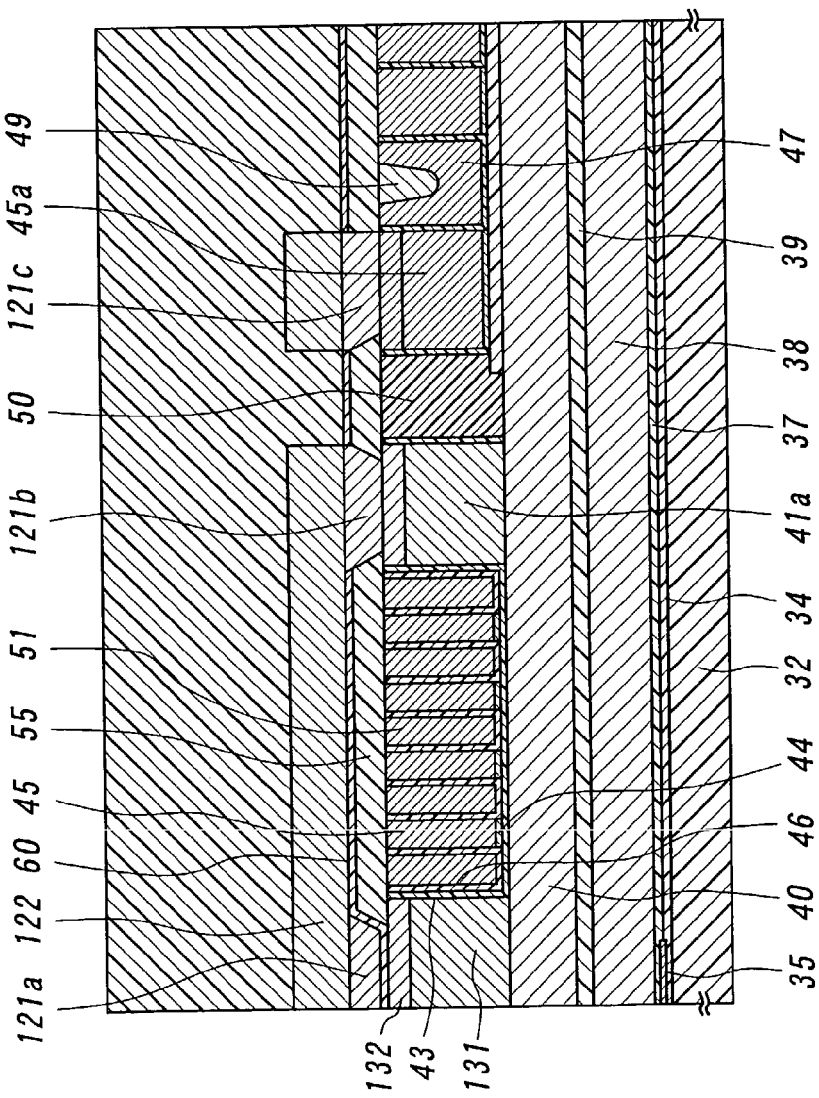

THIN FILM MAGNETIC HEAD AND METHOD OF MANUFACTURING THE SAME

BACKGROUND OF THE INVENTION

1. Field of the Invention

The present invention relates to a thin film magnetic head and a method of manufacturing the same, and more particularly relates to a combination type thin film magnetic head having an inductive type writing thin film magnetic head element having a thin film coil and a magnetoresistive type reading thin film magnetic head element stacked one on the other, and a method of manufacturing the same. More particularly, the present invention relates to a combination type thin film magnetic head and a method of manufacturing the same, in which a GMR element is used as a magnetoresistive type thin film magnetic head element and an inductive type thin film magnetic head element has a superior NTSL property by extremely shortening a magnetic path length by reducing a coil winding pitch of a thin film coil and has a narrow record track for attaining a high surface recording density on a magnetic record medium by providing a miniaturized track pole made of a magnetic material having a high saturation magnetic flux density.

2. Description of the Related Art

Recently a surface recording density of a hard disc device has been improved, and it has been required to develop a thin film magnetic head having an improved performance accordingly. A recent magnetoresistive type thin film magnetic head using a GMR (Giant Magneto-Resistive) element has a surface recording density up to 100-200 gigabits/platter. A combination type thin film magnetic head is constructed by stacking, one a substrate, an inductive type thin film magnetic head element intended for writing information on a magnetic record medium and a magnetoresistive type thin film magnetic head element intended for reading information out of the magnetic record medium. As a reading magnetoresistive element, a GMR element having a magnetoresistive change larger than a normal anisotropic MR element by more than 20 times has been used. In order to improve a performance of the GMR element, there have been various proposals.

In a normal anisotropic MR element, a single film of a magnetic material showing the magnetoresistive effect is utilized. Many GMR elements have a multi-layer structure having a stack of a plurality of films. The GMR element has a simple structure and has a larger resistance change under a weak magnetic field. A spin-valve GMR film will be suitable for a large scale manufacture. A performance of the reading head element is determined by not only the above mentioned selection of materials, but also by pattern widths such as an MR height and a track width. The track width is determined by a photolithography process and the MR height is determined by an amount of polishing for forming an air bearing surface (ABS).

At the same time, the performance of the recording magnetic head is also required to be improved in accordance with the improvement of the performance of the reproducing magnetic head. In order to increase a surface recording density, it is necessary to realize a high track density on a magnetic record medium. To this end, a pole portion of the recording thin film magnetic head element has to be narrowed in a sub-micron order, particularly not larger than 0.2 µm by utilizing the semiconductor manufacturing process. However, upon decreasing a track width by utilizing the semiconductor manufacturing process, there is a problem that a sufficiently large magnetic flux could not be obtained due to a miniaturized structure of the pole portion. In this manner, by replacing the MR film by the GMR film in the reproducing head element and by selecting a material having a high magnetoresistive sensitivity, it is possible simply to attain a desired high surface recording density.

In order to realize a sufficiently high surface recording density of about 100-200 gigabits/platter, it is necessary to use a record medium, i.e. a magnetic disk material having a high magnetic coercive force. If a magnetic material having a high coercive force is not used, once recorded data might be erased due to the thermal fluctuation. When a material magnetic having a high coercive force is used, recoding requires a large magnetic flux, and therefore an inductive type thin film magnetic head element must generate a large magnetic flux. Generally, in order to generate a large magnetic flux in the inductive type thin film magnetic head element, a track pole is made of a magnetic material having a high saturation magnetic flux density (Hi-Bs material having a saturation magnetic flux density not less than 1.8 T (tesla). NiFe (80:20) of 1.0 T and NiFe (45:55) of 1.5 T have been used as a magnetic material having a high saturation magnetic flux density. Recently, CoNiFe of 1.8~2.1 T has been used. In order to use a miniaturized track pole stably, a magnetic material having saturation magnetic flux density not less than 2.0 T is generally used. However, when a width of the track pole is reduced to sub-micron order, such magnetic materials could not generate a sufficiently large magnetic flux for recording stably. In this manner, it is required to use a magnetic material having a much higher saturation magnetic flux density. Heretofore, when a track pole is made of a magnetic material having a high saturation magnetic flux density, a plating method has been generally used. However, in order to manufacture a track pole having a narrow width, it is preferable to use a sputtering method. From this view point, it will be advantageous to form a track pole by sputtered films of FeN having a saturation magnetic flux density of 2.0 T or FeCo and CoFeN having a saturation magnetic flux density of about 2.4 T.

FIGS. 1-9 are cross sectional views showing successive steps of a method of manufacturing a conventional combination type thin film magnetic head having a GMR element. In these drawings, A represents a cross sectional view cut along a plane perpendicular to the air bearing surface and B denotes a cross sectional view of a pole portion cut along a plane parallel to the air bearing surface. The combination type thin film magnetic head includes an inductive type recording magnetic head element provided on a magnetoresistive type reading magnetic head element.

As shown in FIGS. 1A and 1B, an alumina ($Al_2O_3$) insulating film 2 having a thickness of about 2-3 µm is deposited on a substance 1 made of AlTiC. Next, a bottom shield film 3 made of a magnetic material for magnetically shielding a GMR reading head element from an external magnetic field is formed on the alumina insulating film. On the bottom shield film 3, a bottom shield gap film 4 made of alumina is formed with a thickness of 30-35 nm by sputtering. Then, a GMR film 5 having a given layer-structure is formed, and lead electrodes 6 for the GMR film are formed by a lift-off process. Next, a top shield gap film 7 made of alumina is formed with a thickness of 30-35 nm by sputtering, and a magnetic material film 8 serving as a top magnetic shield film is formed with a thickness of about 3 µm.

Next, an isolation film 9 made of alumina is formed with a thickness of about 0.3 µm for isolating the reading GMR head element from a writing induction type thin film magnetic head element to suppress noise in a reproduced output from the GMR head element. After that, a bottom pole 10 of the recording head element is formed with a thickness of 1.5-2.0 µm. The bottom pole 10 is formed by a plating film of CoNiFe. It should be noted that in the drawings a ratio of thickness of various portions does not exactly correspond to an actual ratio. For instance, the isolation film 9 is shown to have a smaller thickness.

Next, as depicted in FIGS. 2A and 2B, on the bottom pole 10, is formed a write gap film 11 made of a non-magnetic material to have a thickness of about 100 nm, and a top track pole 12 made of a permalloy which is a magnetic material having a high saturation magnetic flux density is formed in accordance with a given pattern. At the same time, a bridge portion 13 for magnetically coupling the bottom pole 10 with a top pole to be formed later at a back-gap is formed. The top track pole 12 and bridge portion 13 are formed by plating with a thickness of about 3-4 µm.

Then, in order to avoid a widening of an effective track width, i.e. in order to prevent a magnetic flux from extending at the bottom pole 10 during a writing operation, the write gap film 11 and the underlying bottom pole 10 around the top track pole 12 are etched by ion milling to form a so-called trim structure. After forming an alumina insulating film 14 having a thickness of about 3 µm over a whole surface, a surface is flattened by the chemical mechanical polishing (CMP) as shown in FIGS. 3A and 3B.

Next, as illustrated in FIGS. 4A and 4B, in order to form a thin film coil by the electrolytic plating of Cu, a thin seed layer 15 of Cu is formed by sputtering with a thickness of about 100 nm. After forming a resist film having a given opening pattern on the seed layer, a first layer thin film coil 16 is formed with a thickness of 1.5 µm in accordance with a given pattern by a plating process using a copper sulfate liquid. Then, after removing the resist film, the exposed seed layer 15 is removed by an ion milling process using an argon ion beam as depicted in FIGS. 5A and 5B. In this manner, the seed layer 15 is removed to separate adjacent coil windings to form a coiled conductor. During the ion milling, in order to prevent portions of the seed layer 15 projecting from side edges of the coil windings of the thin film coil 16 from being remained, the ion milling is performed at an angle of 5-10°. When the ion milling is carried out at an angle near a perpendicular angle, debris of the seed layer 15 splashed by impingement of the ion beam might be adhered again to the coil windings. Therefore, a distance between successive coil windings must be widened.

Then, as shown in FIGS. 6A and 6B, an insulating film 17 which supports the first layer thin film coil 16 in an electrically insolated manner is formed by photoresist. Next, as depicted in FIGS. 7A and 7B, a Cu seed layer 18 is formed and a second layer thin film coil 19 is formed in accordance with a given pattern with a thickness of 1.5 µm. Then, after removing the seed layer 18 by ion milling, an insulating film 20 of photoresist for supporting the second layer thin film coil 19 in an electrically insulating manner is formed. Next, as illustrated in FIGS. 8A and 8B, a top pole 21 made of permalloy is formed with a thickness of about 3 µm such that the top track pole 12 and bridge portion 13 are coupled with each other by the top pole 21, and a whole surface is covered with an overcoat film 22 made of alumina. It should be noted that during the formation of the second layer thin film coil 19, a connect portion 23 for connecting inner portions of the first and second layer thin film coils 16 and 19 is formed. Finally, an end surface to which the GMR film 5, write gap film 11, top track pole 12 and so on are exposed is polished to form an air bearing surface ABS to complete a slider. In a manufacturing process for forming an actual thin film magnetic head, after forming a number of the above mentioned structures on the wafer, the wafer is divided in a plurality of bars in each of which a number of thin film heads are aligned. Then, a side edge of the bar is polished to obtain the air bearing surface ABS.

FIG. 9 shows schematically a cross sectional view and a plan view illustrating the structure of the known combination type thin film magnetic head manufactured in the manner explained above. The bottom pole 10 has a large area, but the top track pole 12 and top pole 21 have a smaller area than the bottom pole. One of factors determining the performance of the writing head element is a throat height TH. The throat height TH is a distance from the air bearing surface ABS to an edge of the insulating film 14, and this distance is desired to be short. One of factors determining the performance of the reading head element is an MR height MRH. This MR height (MRH) is a distance from the air bearing surface ABS into which one edge of the GMR film 15 is exposed to the other edge of the GMR film. During the manufacturing process, a desired MR height MRH is obtained by controlling an amount of polishing the air bearing surface ABS.

Now problems in the known combination type thin film magnetic head mentioned above will be explained. After forming the insulating film 17, 20 such that the thin film coil 16, 19 is supported by the insulating film in an electrically insulating manner, the top pole 21 is formed. In this case, the top pole 21 has to be formed into a given pattern along the side wall of the insulating film 17, 20. To this end, a photoresist is formed with a thickness of 3-4 µm at a step of the insulating film having a height of about 7-10 µm.

Now it is assumed that at the side wall of the insulating film 16, 19, the photoresist should have a thickness of at least 3 µm, a thickness of the photoresist at the bottom of the step would become thick such as 8-10 µm. Since a width of record track of the writing head is mainly determined by a width of the top track pole 12, it is not necessary to miniaturize the top pole 21 compared with the top track pole 12, but if the track width of submicron order such as 0.2 µm is desired, the pole portion of the top pole 21 should be miniaturized in the order of submicrons.

Upon forming the top pole 21 into a desired pattern by plating, the photoresist has to be deposited on the top track pole 12 and insulating film 17, 20 having the step of more than 10 µm such that the photoresist has a uniform thickness. Then, the photoresist is subjected to the exposure of light to form the top pole 21 having the pole portion of submicron order. That is to say, a pattern of submicron order must be formed with the photoresist having a thickness of 8-10 µm. When the pole portion 21 is formed by plating, a seed layer made of permalloy serving as an electrode is previously formed. During the light exposure of the photolithography, light is reflected by the permalloy seed layer, and a desired pattern might be deformed. Therefore, it is quite difficult to form the pattern of submicron order precisely.

In order to improve the surface recording density, it is required to miniaturize the pole portion as explained above. Then, the miniaturized pole portion must be made of a magnetic material having a high saturation magnetic flux density. In general, FeN and FeCo have been known as magnetic materials having a high saturation magnetic flux density. However, these magnetic materials could not be easily formed by sputtering into a film having a given pattern. It has been known to shape the sputtered film into a given patter by the ion milling. However, etching rate is too slow and a track width of submicron order could not be controlled precisely. Moreover, by reducing a size of the pole portion, the bottom track pole must be also miniaturized, and therefore a volume of the bottom track pole would be decreased. Then, undesired saturation of magnetic flux is liable to occur.

NiFe of 1.5 T, CoNiFe of 1.9-2.1 T, FeCo of 2.1-2.3 T have been known as magnetic materials having a high saturation magnetic flux density, and these magnetic materials could be relatively easily formed into a given pattern by plating. For instance, Fe rich NiFe (more than 50%) has a saturation magnetic flux density of 1.5-1.6 T, and a composition could be controlled stably. However, in order to realize a surface recording density of 100-200 gigabits/platter, a track width has to be not larger than 0.2 µm. Then, there would be required to use a magnetic material having a higher saturation magnetic flux density. There has been proposed to form a magnetic film by plating using CoFe and CoNiFe having higher magnetic flux density than NiFe. However, these magnetic materials could provide the magnetic faculty of about 1.8-2.1 T. In order to realize the surface recording density of about 100-200 gigabits/platter, it is desired to use a magnetic material having a high saturation magnetic flux density such as 2.3 T.

A high frequency performance of the induction type thin film magnetic head is also determined by a magnetic path length which is defined as a length from the throat height zero position to the back-gap. A high frequency performance of the thin film magnetic head is improved by shortening the above mentioned magnetic path length. It would be possible to shorten the magnetic path length by reducing a pitch of successive coil windings of the thin film coil, but this solution has a limitation. Then, there has been proposed to construct the thin film coil to have two coil layers as explained above. Upon forming the two-layer thin film coil, after forming a first thin film coil layer, an insulating film of photoresist is formed with a thickness of about 2 µm. This insulating layer has a round outer surface, and thus upon forming a second thin film coil layer, a seed layer for electrolytic plating has to be formed on an inclined portion. Therefore, when the seed layer is etched by the ion milling, a portion of the seed layer hidden by the inclined portion could not be removed sufficiently and coil windings might be short-circuited. Therefore, the second thin film coil has to be formed on a flat surface of the insulating layer.

For instance, it is now assumed that a thickness of the first thin film coil layer is 2-3 µm, a thickness of the insulating film formed on the first thin film coil layer is 2 µm, and an apex angle of the inclined portion of the insulating film is 45-55°, an outer surface of the second thin film coil layer must be separated from the throat height zero reference position by a distance of 6-8 µm which is twice a distance from the throat height zero reference position to the outer surface of the first thin film coil layer. Then, a magnetic path length would be longer accordingly. When the thin film coil has space/line of 0.4-0.5 µm/0.3-0.4 µm and a total number of coil windings is eleven, six coil windings are provided in the first thin film coil layer and five coil windings are formed in the second thin film coil layer. Then, a length of the whole thin film coil becomes 11.5 µm. In this manner, in the known thin film magnetic head, a magnetic path length could not be shortened, and a high frequency property could not be improved.

In the known combination type thin film magnetic head explained above, there is a problem of miniaturizing the writing inductive type thin film magnetic head element. That is to say, by reducing the magnetic path length $L_M$, i.e. a length portions of the bottom pole 10 and top pole 21 surrounding the thin film coil 16, 19 as shown in FIG. 9, a flux rise time, non-linear transition shift NLTS and over write property of the inductive type thin film magnetic head element can be improved. In order to shorten the magnetic path length $L_M$, a coil width $L_C$ of a portion of the thin film coil 16, 19 surrounded by the bottom pole 10 and the top pole 21 has to be shortened. In the known thin film magnetic head, the coil width $L_C$ could not be shortened due to the following reason.

In order to shorten the coil width $L_C$ in the known inductive type thin film magnetic head element, a width of coil windings of the thin film coil must be shortened, and at the same time, a distance between successive coil windings must be shortened. However, in order to reduce an electric resistance of the thin film coil, a width of coil winding could be shortened only with a limitation. When the thin film coil is made of copper having a high conductivity, a width of coil winding could not be reduced less than 0.3-0.4 µm, because a height of the thin film coil is limited to 2-3 µm. If a width of coil winding is shortened not larger than the above mentioned value, a property of the GMR film 15 might be deteriorated due to heat generated by the thin film coil. Furthermore, the bottom pole 10 and top pole 21 are also heated to expand and a serious problem of pole protrusion might occur and the thin film magnetic head might be brought into contact with the record medium. Therefore, in order to reduce the coil width $L_C$ without shortening a width of coil winding, a distance between successive coil windings must be shortened and a height of the coil has to be increased.

In the known thin film magnetic head, a distance between coil windings of the thin film coil 16, 19 could not be shortened. Now a reason of this will be explained. As explained above, the coil windings of the thin film coil are formed by the electrolytic plating method using the copper sulfate liquid. In order to deposit a copper film uniformly within the opening formed in the resist film formed on the seed layer, the seed layer is first formed with a thickness of 100 nm, and then the copper film deposited by the electrolytic plating on the seed layer through the opening formed in the resist film to form the coil windings. After that, the seed layer is selectively removed to separate the coil windings. The seed layer is removed by the ion beam milling using, for instance an argon gas, while the coil windings are used as a mask.

In order to remove the seed layer between successive coil windings, it is preferable to perform the ion beam milling from a direction perpendicular to the wafer surface. However, this result in a re-deposition of debris of the seed material and successive coil windings might not be separated well, and thus a distance between successive coil windings could not be shortened. Such a problem could be solved by effecting the ion beam milling at an angle of 5-10°, a sufficient ion irradiation could not be attained at a shadow portion of the photoresist film and the seed layer might be remained partially. Therefore, a distance between successive coil windings could not be shortened in order to prevent an insufficient insulation between coil windings. In the known thin film magnetic head, a distance between successive coil windings is long such as 0.3-0.4 µm. If a distance between successive coil windings is shortened less than the above value, the above mentioned problem might occur.

When the thin film coil 16, 19 is formed by the electrolytic plating method as explained above, in order to keep a thickness of the thin film coil uniformly, a plating liquid such as a copper sulfate must be stirred during the plating. If a width of a wall defining the opening in the photoresist film is shorted in order to shorten a distance between successive coil windings, the thin wall might be broken due to the stirring of the plating liquid. Then, the thin film coil could not be formed accurately. Also from this point of view, a distance between successive coil windings of the thin film coil could not be shortened.

The NLTS property of the inductive type thin film magnetic head could be improved by increasing the number of coil windings of the thin film coil. In order to increase the number of coil windings without increasing the magnetic path length, the number of thin film coil layers has to be increased to four or five layers. However, then an apex angle might be increased and a narrow track width could not be attained. In order to keep an apex angle within a given range, it is preferable to limit the number of thin film coil layers to not larger than three, preferably two. Then, the number of coil windings could not be increased and the NLTS property could not be improved.

Furthermore, when two thin film coil layers are provided as explained above, the second layer thin film coil 19 could not be formed perpendicularly, because the insulating film 17 is not flat, but is inclined at a peripheral portion of the second layer thin film coil. For instance, when a thin film coil having a space not larger than 0.3 μm with a thickness not less than 2.5 μm, argon ions could not effectively go onto the seed layer 18 between successive coil windings at a portion in which the thin film coil is not formed perpendicularly. Moreover, since an angle of the ion milling differs between a central portion and a peripheral portion of the wafer, the seed layer 18 could not be removed sufficiently and might be remained partially. When a space between successive coil windings is short, even if argon particles enter into this narrow space, Cu particles carried out together with argon particles might be deposited on side wall of the coil windings. Such etching debris might short-circuit the coil windings.

In Japanese Patent Application Laid-open Publication Kokai Sho 55-41012, there is disclosed a thin film coil, in which first and second thin film halves are arranged alternately with interposing therebetween an insulating film. In FIG. 7 of the Publication, there is shown a thin film coil, in which first and second thin film coils of a first layer thin film coil are formed as coils of anti-clockwise direction, and first and second thin film coil halves of a second layer thin film coil are formed as coil of a clockwise direction, and inner contact pads are connected to each other and outer contact pads are connected to each other such that an electric current flows in a same direction. However, in this known thin film coil, after forming the first thin film coil half, an insulating film and a conductive film are formed on a whole surface by sputtering or vacuum deposition, and a mask is formed selectively on the conductive film. After that, a portion of the conductive film formed above the first thin film coil half is selectively etched such that a portion of the conductive film deposited in a space between successive coil windings of the first thin film coil half is remained to form the second thin film coil half. Therefore, the first and second thin film coil halves are not formed in a self-aligned manner and a distance between successive coil windings could not be shortened in the order of submicrons.

One of the inventors of the present application has proposed in U.S. Pat. Nos. 6,191,916 and 6,204,997 a method of manufacturing a thin film coil, in which after forming a first thin film coil half by the electrolytic plating process using a seed layer, a thin insulating film and a seed layer are formed on a whole surface, a photoresist film having openings at portions corresponding to spaces of successive coil windings of the first thin film coil half is formed, and a second thin film coil half is formed by the electrolytic plating process using the photoresist film as a mask. In this method of manufacturing the thin film coil, the first and second thin film coil halves can be formed accurately by the electrolytic plating.

However, since use is made of the photoresist film having a given patter of openings for forming the second thin film coil half, the first and second thin film coil halves could not be formed in a self-aligned manner. Therefore, it is difficult to shorten a space between successive coil windings in the order of quartermicrons.

SUMMERY OF THE INVENTION

The present invention has for its object to provide a thin film magnetic head, in which a surface recording density can be materially improved by miniaturizing a pole tip of an inductive type thin film magnetic head in the sub-micron order, preferably quarter-micron order, and to provide a method of manufacturing such a thin film magnetic head easily and precisely.

It is further object of the invention to provide a thin film magnetic head, in which a surface recording density can be materially improved by miniaturizing a pole tip of an inductive type thin film magnetic head in the sub-micron order, preferably quarter-micron order and at the same time, a high performance can be realized by preventing the side write and saturation of magnetic flux, and to provide a method of manufacturing such a thin film magnetic head easily and precisely.

It is still another object of the invention to provide a thin film magnetic head, in which a surface recording density can be materially improved by miniaturizing a pole tip of an inductive type thin film magnetic head in the sub-micron order, preferably quarter-micron order and a high performance can be realized by preventing the side write and saturation of magnetic flux, and at the same time, a high frequency performance can be improved by reducing a magnetic path length $L_M$ by reducing a coil width $L_C$ by decreasing a distance between successive coil windings of a thin film coil, and to provide a method of manufacturing such a thin film magnetic head easily and precisely.

According to a first aspect of the invention, a thin film magnetic head comprises;
  a substrate;
  a first magnetic material film made of a magnetic material and extending inwardly from an air bearing surface to have a flat surface, said first magnetic material film constitutes a bottom pole;
  a second magnetic material film formed on said flat surface of the first magnetic material film opposite to the substrate, said second magnetic material film extending inwardly from the air bearing surface beyond a throat height zero reference position and constituting a part of a bottom track pole;
  a thin film coil formed on said flat surface of the first magnetic material film such that a surface of the thin film coil opposite to the first magnetic material film forms a coplanar flat surface together with a surface of said second magnetic material film, said thin film coil including a plurality of coil windings which are insulated and isolated from said first magnetic material film and are mutually insulated and isolated;
  an insulating film formed on said coplanar flat surface of the thin film coil and second magnetic material film to extend up to the throat height zero reference position such that the thin film coil and a part of the second magnetic material film are covered with said insulating film;

a third magnetic material film formed on a remaining portion of said second magnetic material film which is not covered with said insulating film to constitute a part of the bottom track pole such that a surface of the third magnetic material film opposite to the second magnetic material film forms a coplanar flat surface together with a surface of said insulating film opposite to said thin film coil;

a write gap film made of a non-magnetic material and formed on said coplanar flat surface of said insulating film and third magnetic material film to have a flat surface; and a fourth magnetic material film formed on a surface of said write gap film opposite to the third magnetic material film and insulating film and constituting a top pole including a top track pole aligned with the bottom track pole formed by said second and third magnetic material films.

According to a second aspect of the invention, a thin film magnetic head comprises;

a substrate;

a first magnetic material film made of a magnetic material and extending inwardly from an air bearing surface to have a flat surface and constitutes a bottom pole;

a second magnetic material film formed on said flat surface of the first magnetic material film opposite to the substrate, said second magnetic material film extending inwardly from the air bearing surface beyond a throat height zero reference position and constituting a part of a bottom track pole;

a thin film coil formed on said flat surface of the first magnetic material film such that a surface of the thin film coil opposite to the first magnetic material film forms a coplanar flat surface together with a surface of said second magnetic material film, said thin film coil including a plurality of coil windings which are insulated and isolated from said first magnetic material film and are mutually insulated and isolated;

a first insulating film formed on said coplanar flat surface of the thin film coil and second magnetic material film to extend inwardly beyond the throat height zero reference position such that the thin film coil and a part of the second magnetic material film are covered with said insulating film;

a third magnetic material film formed on a remaining portion of said second magnetic material film which is not covered with said first insulating film to constitute a part of the bottom track pole such that a surface of the third magnetic material film opposite to the second magnetic material film forms a coplanar flat surface together with a surface of said first insulating film opposite to said thin film coil;

a second insulating film formed on said coplanar flat surface of the first insulating film and third magnetic material film to extend up to the throat height zero reference position such that the first insulating film and a part of the third magnetic material film are covered with said second insulating film;

a fourth magnetic material film formed on a remaining portion of said third magnetic material film which is not covered with said second insulating film to constitute a part of the bottom track pole such that a surface of the fourth magnetic material film opposite to the third magnetic material film forms a coplanar flat surface together with a surface of said second insulating film;

a write gap film made of a non-magnetic material and formed on said coplanar flat surface of said second insulating film and fourth magnetic material film to have a flat surface; and a fifth magnetic material film formed on a flat surface of said write gap film opposite to the fourth magnetic material film and second insulating film to constitute a top pole including a top track pole aligned with the bottom track pole formed by said second, third and fourth magnetic material films.

According to a third aspect of the invention, a thin film magnetic head comprises;

a substrate;

a first magnetic material film made of a magnetic material and extending inwardly from an air bearing surface to have a flat surface and constitutes a bottom pole;

a second magnetic material film formed on said flat surface of the first magnetic material film opposite to the substrate, said second magnetic material film extending inwardly from the air bearing surface beyond a throat height zero reference position and constituting a part of a bottom track pole;

a thin film coil formed on said flat surface of the first magnetic material film such that a surface of the thin film coil opposite to the first magnetic material film forms a coplanar flat surface together with a surface of said second magnetic material film, said thin film coil including a plurality of coil windings which are insulated and isolated from said first magnetic material film and are mutually insulated and isolated;

an insulating film formed on said coplanar flat surface of the thin film coil and second magnetic material film to extend up to the throat height zero reference position such that the thin film coil and a part of the second magnetic material film are covered with said insulating film;

a write gap film made of a non-magnetic material and formed on a part of said second magnetic material film which is not covered with said insulating film and extending over the surface of the insulating film beyond a step between said second magnetic material film and said insulating film;

a third magnetic material film formed on said write gap film such that said third magnetic material film is opposed to said second magnetic material film such that a surface of the third magnetic material film opposite to said write gap film forms a coplanar flat surface together with a surface of a part of said write gap film formed on said insulating film, said third magnetic material film constituting a part of the bottom track pole which is aligned with the bottom track pole formed by said second magnetic material film; and a fourth magnetic material film formed on said flat surface of said write gap film and third magnetic material film and including a portion which constitutes the top track pole aligned with the bottom track pole formed by said second magnetic material films.

In preferable embodiments of the thin film magnetic head according to the above mentioned first to third aspects of the invention, said thin film coil comprises:

a first thin film coil half having coil windings mutually separated by a given distance;

a second thin film coil half having coil windings which are formed between successive coil windings of the first thin film coil half in a self-aligned manner via an inter-layer insulating film, at least a part of each of the coil windings of the second thin film coil half having a two-layer structure consisting of a first conductive film formed by CVD and a second conductive film formed by electrolytic plating;

a first jumper wiring connecting electrically an innermost coil winding of one of the first and second thin film coil halves to an outermost coil winding of the other of the first and second thin film coil halves through an opening formed in an insulating film; and a second jumper wiring having one end connected to an innermost coil winding of the other of the first and second thin film coil halves through an opening formed in said insulating film.

In the thin film magnetic head in which the first and second thin film coil halves of the thin film coil are formed in a self-aligned manner, since successive coil windings are separated form each other by the inter-layer insulating film having a very small thickness, a coil pitch can be made very small such as 0.5 μm and a magnetic path length can be shortened. Therefore, the high frequency performance can be improved.

In the thin film magnetic head according to the first to third aspects of the invention, the magnetic material film constituting the top pole may be formed to have a two-layer or three-layer structure. In this case, a magnetic material film contacting with the write gap film is preferably made of a magnetic material having a higher saturation magnetic flux density than the remaining magnetic material film or films. Moreover, a non-magnetic material film such as alumina film may be interposed between two-layer or three-layer magnetic material films. In this case, it is preferable that the non-magnetic material film may have a thickness not larger than 10 nm, more preferably 3-5 nm. Furthermore, the second magnetic material film constituting a whole or a part of the bottom track pole may be formed to have a two-layer or three-layer structure. In this case, a magnetic material film most close to the write gap film may be preferably made of a magnetic material having a higher saturation magnetic flux density than the remaining magnetic material films.

In the thin film magnetic head according to the above mentioned first to third aspect of the invention, the bottom track pole formed by one or two or three flat magnetic material films is aligned with the top track pole also formed by one or two or three flat magnetic material films, and therefore a narrow track pole having a width not larger than 0.2 μm can be attained precisely and a surface recording density can be improved owing to a narrow track width. It should be noted that the throat height zero reference position is accurately determined by an edge of the flat insulating film opposing to the air bearing surface and this position is hardly shifted during the manufacturing process. Therefore, it is possible to realized a very short throat height of submicron order. Then, the thin film coil may be much closer to the air bearing surface, and an efficiency of the thin film magnetic head can be improved.

In the thin film magnetic head according to the first and third aspects of the present invention, the throat height zero reference position is determined by the edge of the insulating film which is formed, together with the third magnetic material film, on the flat surface of the second magnetic material film constituting the bottom track pole and thin film coil. In the thin film magnetic head according to the second aspect of the invention, the second magnetic material film constituting a part of the bottom track pole and the thin film coil form a flat surface, the third magnetic material film and first insulating film are formed on this flat surface to have a flat surface, the fourth magnetic material film and second insulating film are formed on the latter flat surface to have a flat surface, and the throat height zero reference position is determined by the edge of the second insulating film opposing to the air bearing surface. A position of the insulating film is not shifted during the manufacturing process, and therefore it is possible to attain a throat height having a accurately determined value. Furthermore, since the flat write gap film can be formed on the flat surface of the insulating film defining the throat height zero reference position and magnetic material film and magnetic material film constituting the top pole can be formed on the flat surface of the write gap film, the pole portion can be miniaturized precisely. Moreover, in the thin film magnetic head according to the second aspect of the invention, in addition to the above mentioned merits, lengths of the second to fourth magnetic material films constituting the bottom track pole measured from the air bearing surface become gradually shorter, and thus a saturation of a magnetic flux generated by an electric current flowing in the thin film coil upon writing does hardly occur and an efficiency of writing operation is improved. This structure is particularly important for a miniaturized thin film magnetic head having a throat height not larger than 0.5 μm, particularly of quarter-micron order.

As explained above, the magnetic material films opposing to each other via the write gap film are preferably made of a magnetic material having a high saturation magnetic flux density. Particularly, the magnetic material film constituting the top track pole may be preferably made of FeN, FeCo, CoNiFe, CoFeN, FeAlN or FeZrN. In this case, the magnetic material film constituting the bottom track pole may be preferably made of FeN, FeCo, CoNiFe, CoFeN, FeAlN, FeZrN or NiFe. A magnetic material film made of CoNiFe and NiFe may be formed as a plating film, and a magnetic material film made of FeN, FeAlN, FeZrN or CoFeN may be formed as a sputtering film. A magnetic material film made of FeCo may be formed by plating or sputtering. A plating film of FeCo has a saturation magnetic flux density of 2.3 T and a sputtered film of FeCo has a saturation flux density of 2.4 T.

In the thin film magnetic head according to the invention in which the thin film coil is by the first and second thin film coil halves manufactured in a self-aligned manner, it is preferable that the coil windings of the first thin film coil half are formed by electrolytic plating of copper and the coil windings of the second thin film coil half are constructed as a two-layer structure of the first conductive film formed by Cu-CVD and the second conductive film formed by copper plating. In this case, portions of the coil windings of the second thin film coil half formed between the track pole and the bridge portion have a narrow width, and therefore these portions are wholly made of the first conductive film formed by electrolytic plating of copper and portions of the coil windings of the second thin film coil half having a wide width are formed by the two-layer structure of the first conductive film formed by plating of copper and the second conductive film formed by Cu-CVD. Furthermore, the first insulating film provided between successive coil windings of the first and second thin film coil halves has a preferably a thickness of 0.03-0.15 μm. This first insulating film may be made of an inorganic material such as alumina, silicon oxide and silicon nitride, and more particularly the first insulating film may be preferably made of alumina-CVD.

As explained above, in the thin film magnetic head in which the thin film coil is formed by the first and second thin film coil halves, when spaces between successive coil windings of the first thin film coil half are set to a value slightly larger than a width of the coil windings, successive coil windings of the second thin film coil half can be formed in these spaces in a self-aligned manner. Therefore, distances between successive coil windings of the first and second thin film coil halves can be extremely shortened and a magnetic path length can be shortened. Then, high frequency characteristics such as the flux rise time property, NLTS property and over write property can be improved.

In the above mentioned thin film magnetic head, a space between successive coil windings of the first and second thin film coil halves may be preferably not larger than 0.2 μm, and more particularly may be preferably set to a value within a range of 0.03-0.15 μm. If a space between successive coil windings is smaller than 0.03 μm, the coil windings could not be isolated well. If a space between successive coil windings is larger than 0.2 μm, a magnetic path length of the thin film magnetic head could not be shortened effectively. As explained above, according to the present invention, by reducing a space between successive coil windings to not larger than 0.2 μm, particularly to a value within a range of 0.03-0.15 μm, a magnetic path length can be shortened less than a half of the conventional thin film magnetic head illustrated in FIG. 9 without decreasing a width of coil windings. According to the invention, a magnetic path length can be shorter than that of the inductive type thin film magnetic heads disclosed in the above mentioned U.S. Pat. Nos. 6,191,916 and 6,204,997. In this manner, the performance of the thin film magnetic head can be improved to a large extent.

According to a fourth aspect of the invention, a method of manufacturing a thin film magnetic head comprises the steps of:

forming a first magnetic material film constituting a bottom pole to have a flat surface and to be supported by a substrate;

forming, on said flat surface of the first magnetic material film, a second magnetic material film constituting a part of a bottom track pole and a thin film coil to have a coplanar flat surface;

forming, on said coplanar flat surface of the second magnetic material film and thin film coil, an insulating film which covers said thin film coil and a part of the second magnetic material film and extends up to a throat height zero reference position;

forming, on a whole surface, a magnetic material film having a thickness larger than that of said insulating film;

polishing said magnetic material film to form a third magnetic material film constituting a part of the bottom track pole, said third magnetic material film covering a portion of said flat surface of the second magnetic material film which is not covered with said insulating film and forming a coplanar flat surface together with said insulating film;

forming, on said coplanar flat surface of said third magnetic material film and insulating film, a non-magnetic material film constituting a write gap film to have a flat surface;

forming, on said flat surface of said non-magnetic material film, a fourth magnetic material film constituting a top track pole and a top pole to have a flat surface; and etching selectively said fourth magnetic material film, non-magnetic material film and third magnetic material film to form the mutually aligned top track pole, write gap film and bottom track pole.

According to a fifth aspect of the invention, a method of manufacturing a thin film magnetic head comprises the steps of:

forming a first magnetic material film constituting a bottom pole to have a flat surface and to be supported by a substrate;

forming, on said flat surface of the first magnetic material film, a second magnetic material film constituting a part of a bottom track pole and a thin film coil to have a coplanar flat surface;

forming, on said coplanar flat surface of the second magnetic material film and thin film coil, a third magnetic material film which covers a part of the second magnetic material film and extends up to a throat height zero reference position, said third magnetic material film constituting a part of the bottom track pole;

forming, on a whole surface, an insulating material film having a thickness larger than that of said third magnetic material film;

polishing said insulating material film to form an insulating film covering said thin film coil and a portion of said flat surface of the second magnetic material film which is not covered with said third magnetic material film to have a coplanar flat surface;

forming, on said coplanar flat surface of said third magnetic material film and insulating film, a non-magnetic material film constituting a write gap film to have a flat surface;

forming, on said flat surface of said non-magnetic material film, a fourth magnetic material film constituting a top track pole and a top pole to have a flat surface; and etching selectively said fourth magnetic material film, non-magnetic material film and third magnetic material film to form the mutually aligned top track pole, write gap film and bottom track pole.

According to a sixth aspect of the invention, a method of manufacturing a thin film magnetic head comprises the steps of:

forming a first magnetic material film constituting a bottom pole to have a flat surface and to be supported by a substrate;

forming, on said flat surface of the first magnetic material film, a second magnetic material film constituting a part of a bottom track pole and a thin film coil to have a coplanar flat surface;

forming, on said coplanar flat surface of the second magnetic material film and thin film coil, a third magnetic material film which covers a part of the second magnetic material film and extends up to a throat height zero reference position, said third magnetic material film constituting a part of the bottom track pole;

forming, on a whole surface, an insulating material film having a thickness larger than that of said third magnetic material film;

polishing said insulating material film to form a first insulating film covering said thin film coil and a portion of said flat surface of the second magnetic material film which is not covered with said third magnetic material film to have a coplanar flat surface;

forming, on said coplanar flat surface of the third magnetic material film and first insulating film, a fourth magnetic material film which covers a part of the third magnetic material film and extends up to the throat height zero reference position, said fourth magnetic material film constituting a part of the bottom track pole;

forming, on a whole surface, an insulating material film having a thickness larger than that of said fourth magnetic material film;

polishing said insulating material film to form a second insulating film covering said first insulating film and a portion of said flat surface of the third magnetic material film which is not covered with said fourth magnetic material film to have a coplanar flat surface;

forming, on said coplanar flat surface of said fourth magnetic material film and second insulating film, a non-magnetic material film constituting a write gap film to have a flat surface;

forming, on said flat surface of said non-magnetic material film, a fifth magnetic material film constituting a top track pole and a top pole to have a flat surface; and etching selectively said fifth magnetic material film, non-magnetic material film and fourth magnetic material film to form the mutually aligned top track pole, write gap film and bottom track pole.

According to a seventh aspect of the invention, a method of manufacturing a thin film magnetic head comprises the steps of:

forming a first magnetic material film constituting a bottom pole to have a flat surface and to be supported by a substrate;

forming, on said flat surface of the first magnetic material film, a second magnetic material film constituting a part of a bottom track pole and a thin film coil to have a coplanar flat surface;

forming, on said coplanar flat surface of the second magnetic material film and thin film coil, a first insulating film which covers the thin film coil and a part of the flat surface of the second magnetic material film and extends up to a throat height zero reference position;

forming, on a whole surface, a magnetic material film having a thickness larger than that of said first insulating film;

polishing said magnetic material film to form a third magnetic material film covering a portion of said flat surface of the second magnetic material film which is not covered with said first insulating film and extending inwardly up to the throat height zero reference position to have a coplanar flat surface together with the first insulating film;

forming, on said coplanar flat surface of said third magnetic material film and first insulating film, a second insulating film covering said first insulating film and a part of said flat surface of the third magnetic material film and extending up to the throat height zero reference position;

forming on a whole surface a magnetic material film having a thickness larger than that of the second insulating film;

polishing said magnetic material film to form a fourth magnetic material film covering a portion of said flat surface of the third magnetic material film which is not covered with the second insulating film to have a coplanar flat surface together with the second insulating film;

forming, on said coplanar flat surface of said fourth magnetic material film and second insulating film, a non-magnetic material film constituting a write gap film to have a flat surface;

forming, on said flat surface of the non-magnetic material film, a fifth magnetic material film constituting a top track pole and a top pole; and etching selectively said fifth magnetic material film, non-magnetic material film and fourth magnetic material film to form the mutually aligned top track pole, write gap film and bottom track pole.

According to an eighth aspect of the invention, a method of manufacturing a thin film magnetic head comprises the steps of:

forming a first magnetic material film constituting a bottom pole to have a flat surface and to be supported by a substrate;

forming, on said flat surface of the first magnetic material film, a second magnetic material film constituting a bottom track pole;

forming, on said first magnetic material film, a thin film coil to be isolated from the first magnetic material film and to have a coplanar flat surface together with the second magnetic material film;

forming, on said coplanar flat surface of the second magnetic material film and thin film coil, an insulating film covering a part of the flat surface of the second magnetic material film and extending up to a throat height zero reference position;

forming a non-magnetic material film constituting a write gap film to cover a portion of the second magnetic material film which is not covered with said insulating film and to extend beyond a step between a first portion of the second magnetic material film and said insulating film;

forming, on a whole surface, a magnetic material film having a thickness larger than a sum of a thickness of said second magnetic material film and a thickness of said insulating film;

polishing said magnetic material film to form a third magnetic material film to have a coplanar flat surface together with the insulating film, said third magnetic material film constituting a top track pole which is opposed, via said non-magnetic material film, to a portion of the second magnetic material film which is not covered with said insulating film;

forming, on said coplanar flat surface of said third magnetic material film and non-magnetic material film, a fourth magnetic material film constituting a top track pole and a top pole to have a flat surface; and etching selectively said fourth magnetic material film, third magnetic material film, non-magnetic material film and second magnetic material film to form the mutually aligned top track pole, write gap film and bottom track pole.

In a preferable embodiment of the method of manufacturing a thin film magnetic head according to the fourth to eighth aspects of the invention, said step of forming the thin film coil comprises the steps of:

forming a plurality of coil windings of the first thin film coil half isolated from the first magnetic material film;

forming an inter-layer insulating film on a whole surface including the first thin film coil half;

forming a first conductive film by CVD and/or sputtering on a surface including recesses formed between successive coil windings of the first thin film coil half;

forming selectively a second conductive film by an electrolytic plating process using said first conductive film as an electrode, while a mask is formed on a portion at which a second thin film coil half is not to be formed;

removing selectively said first conductive film by an etching process using said second conductive film as a mask;

forming, on a whole surface, an insulating film having a thickness larger than that of the second magnetic material film; and polishing said insulating film and first and second conductive films to expose the surface of the coil windings of the first thin film coil half, to form coil windings of the second thin film coil half embedded, via said inter-layer insulating film, in the recesses formed between successive coil windings of the first thin film coil half and to form a flat coplanar surface together with the second magnetic material film, thin film coil and insulating film surrounding the second magnetic material film and thin film coil.

In a preferable embodiment of the method of manufacturing a thin film magnetic head according to the fourth to eighth aspects of the invention, said step of forming the thin film coil comprises the steps of:

forming a plurality of coil windings of the first thin film coil half isolated from the first magnetic material film;

forming an inter-layer insulating film on a whole surface including the first thin film coil half;

forming an insulating film having a thickness larger than that of the second magnetic material film after forming a mask selectively on a portion at which a second thin film coil half is to be formed;

polishing said insulating film by CMP to expose said mask;

removing the exposed mask by etching to form recesses between successive coil windings of the first thin film coil half such that said inter-layer insulating film is exposed;

forming a first conductive film by CVD and/or sputtering on a surface including the recesses formed between successive coil windings of the first thin film coil half;

forming selectively a second conductive film by an electrolytic plating process using said first conductive film as an electrode such that said recesses are filled with the second conductive film; and polishing said second conductive film to expose the surface of the coil windings of the first thin film coil half, to form coil windings of the second thin film coil half embedded, via said inter-layer insulating film, in the recesses formed between successive coil windings of the first thin film coil half and to form a flat coplanar surface together with the second magnetic material film, thin film coil and insulating film surrounding the second magnetic material film and thin film coil.

Upon forming the thin film coil, a width of the coil windings of a portion of the thin film coil situating between the back portion and the pole portion adjacent to the air bearing surface is smaller than that of the coil windings of the remaining portion of the thin film coil. When the first conductive film is formed by CVD and/or sputtering, in an area in which the coil windings have a smaller width, the recesses are fully filled with the conductive material grown on side walls of the recesses, and therefore the coil windings are formed only by the first conductive film. In an area in which the coil windings have a larger width, the recesses are not filled only with the first conductive film, and the coil windings are formed by the first and second conductive films.

When the first conductive film is formed by CVD and/or sputtering to have a smaller thickness, even in the area in which the coil windings have a smaller width, the recesses could be not fully filled with the first conductive film, and thus the coil windings are formed by the first and second conductive films like in the area in which the coil windings have a larger width.

In the above mentioned process for forming the thin film coil, it is preferable to form a relatively large recess between a contact portion of the innermost coil winding of the thin film coil and a bridge portion constituting the back gap and this recess is filled with the insulating material of the insulating film forming the thin film coil. In this case, the bridge portion and the contact portion are effectively isolated and separated from each other with the insulating film and can be protected against short-circuiting.

In a preferable embodiment of the method according to the fourth, fifth and eighth aspects of the invention, said second magnetic material film is formed to have a first portion constituting the bottom track pole and a second portion constituting a part of a jumper wiring which is brought into contact with the contact portion of the thin film coil;

said third magnetic material film is formed to have a first portion covering a portion of said first portion of the second magnetic material film which is not covered with the insulating film and constituting the bottom track pole, a second portion which is brought into contact with said second portion of the second magnetic material film via an opening formed in the insulating film to constitute a remaining portion of the bridge portion, and a third portion constituting a part of the jumper wiring which is brought into contact with the contact portion of the thin film coil via an opening formed in the insulating film;

said fourth magnetic material film is formed to be brought into contact both with said second portion of the third magnetic material film constituting the bridge portion and with the third portion of the third magnetic material film constituting the jumper wiring; and said fourth magnetic material film, non-magnetic material film and third magnetic material film are selectively etched to form the mutually aligned top track pole, write gap film and bottom track pole as well as the jumper wiring connected to the thin film coil.

In a preferable embodiment of the method according to the sixth and seventh aspects of the invention, said second magnetic material film is formed to have a first portion constituting the bottom track pole and a second portion constituting a part of a jumper wiring which is brought into contact with the contact portion of the thin film coil;

said third magnetic material film is formed to have a first portion covering a portion of said first portion of the second magnetic material film which is not covered with the first insulating film and constituting the bottom track pole, a second portion which is brought into contact with said second portion of the second magnetic material film via an opening formed in the first insulating film to constitute a part of the bridge portion, and a third portion constituting a part of the jumper wiring which is brought into contact with the contact portion of the thin film coil via an opening formed in the first insulating film;

said fourth magnetic material film is formed to have a first portion covering a portion of said first portion of the third magnetic material film which is not covered with the second insulating film and constituting the bottom track pole, a second portion which is brought into contact with said second portion of the third magnetic material film via an opening formed in the second insulating film to constitute a part of the bridge portion, and a third portion constituting a part of the jumper wiring which is brought into contact with the third portion of the third magnetic material film via an opening formed in the second insulating film;

said fifth magnetic material film is formed to be brought into contact both with said second portion of the fourth magnetic material film constituting the bridge portion and with the third portion of the fourth magnetic material film constituting a part of the jumper wiring; and said fifth magnetic material film, non-magnetic material film and fourth magnetic material film are selectively etched to form the mutually aligned top track pole, write gap film and bottom track pole as well as the jumper wiring connected to the thin film coil.

In the method of manufacturing a thin film magnetic head according to the invention, the etching process for selectively etching the non-magnetic material film, one or two magnetic material films deposited on the non-magnetic material film, and one or two or three magnetic material films formed under the non-magnetic material film to constitute the top track pole, write gap film and bottom track pole or the etching process for forming the top track pole, write gap film and bottom track pole may be performed by RIE (Reactive Ion Etching). During this etching process, it is preferable to etch the surface of the second magnetic material film beyond the write gap film to form the trim structure.

In a preferable embodiment of the method of manufacturing a thin film magnetic head according to the invention, since the first conductive film is formed by CVD having an excellent step-coverage, the very narrow recesses formed between successive coil windings of the first thin film coil half can be filled with the conductive material without forming void. Moreover, an area in which the first thin film coil half is formed is covered with the first conductive film formed by CVD and a surface portion of the first conductive film on which the second thin film coil half is to be formed is covered with the second conductive film formed by plating, and after that the first conductive film is selectively removed by etching while the second conductive film is uses as a mask. Therefore, it is no more necessary to form a separate etching mask and the throughput is improved and the manufacturing cost can be decreased. The first conductive film may be simply etched by, for instance ion milling.

Furthermore, after forming the first and second conductive films constituting the coil windings of the second thin film coil half, the process for partially removing these films may be performed by CMP using an alkaline slurry or a neutral slurry or by a dry etching such as ion beam milling and sputter etching. Alternatively, the second conductive film and second insulating film may be first etched roughly by CMP and then may be precisely etched by a dry etching.

Moreover, a coil winding which situates most closer to the air bearing surface is preferably formed by the outermost coil winding of the second thin film coil half and a coil winding which situates most closer to the bridge portion constituting the back gap may be formed by the innermost coil winding of the second thin film coil half. In this case, a width of the outermost and innermost coil windings of the second thin film coil half is preferably larger than that of the remaining coil windings. This is due to a fact that even if a position of the first thin film coil half is deviated, a width of these outermost and innermost coil windings might not be small and a resistance value might not increase excessively.

In the method of manufacturing a thin film magnetic head according to the invention, it is possible to form very precisely the top track pole and bottom track pole having a miniaturized size such as sub-micron order. The top track pole and top pole may be preferably made of FeN, FeCo, CoNiFe, FeAlN, FeZrN or CoFeN, and the bottom track pole may be preferably made of FeN, FeCo, CoNiFe, FeAlN, FeZrN, NiFe or CoFeN. In this case, CoNiFe, FeCo and NiFe may be formed as a plating film, and FeN, FeCo, FeAlN, FeZrN and CoFeN may be formed as a sputtering film. RIE for forming the bottom track pole and top track pole may be preferably performed at a high etching temperature above 50° C., particularly 200-300° C. under an atmosphere of $Cl_2$ or a mixed gas of $Cl_2$ and boron series gas such as $BCl_2$ or a mixed gas of $Cl_2$ and an inert gas such as Ar and $N_2$.

In the method of manufacturing a thin film magnetic head according to the invention, said insulating film for isolating the first and second thin film coil halves may be made of an inorganic insulating material, and more particularly may be formed by an alumina-CVD film. The alumina-CVD film may be preferably formed by a reduced pressure $Al_2O_3$-CVD film formed by an atomic layer process, in which $AlCl_3$ and $H_2O$, $N_2$, $N_2O$ or $H_2O_2$ are alternately projected intermittently under a reduced pressure of 1-2 Torr at a temperature of 100-300° C., preferably 150-200° C. In this manner, it is possible to obtain the insulating film which has an improved step-coverage and is free from key hole and void. Therefore, the insulating film has an excellent electrically insulating property although the insulating film has a smaller thickness.

BRIEF DESCRIPTION OF THE DRAWINGS

FIGS. 1A, 1B-8A, 8B are cross sectional views showing successive steps of a known method of manufacturing a known thin film magnetic head;

FIGS. 10A, 10B-16A, 16B are cross sectional views illustrating successive steps of the method of manufacturing a first embodiment of the thin film magnetic head according to the invention;

FIGS. 18A, 18B-23A, 23B are cross sectional views depicting succeeding steps;

FIGS. 24A, 24B-41A, 41B are cross sectional views showing successive steps of the method of manufacturing a second embodiment of the thin film magnetic head according to the invention;

FIGS. 42A, 42B-53A, 53B are cross sectional views showing successive steps of the method of manufacturing a third embodiment of the thin film magnetic head according to the invention;

FIGS. 54A and 54B are cross sectional views depicting the structure of a fourth embodiment of the thin film magnetic head according to the invention; and FIGS. 55A and 55B are cross sectional views illustrating the structure of a fifth embodiment of the thin film magnetic head according to the invention.

DESCRIPTION OF THE PREFERRED EMBODIMENTS

Figure 5A:
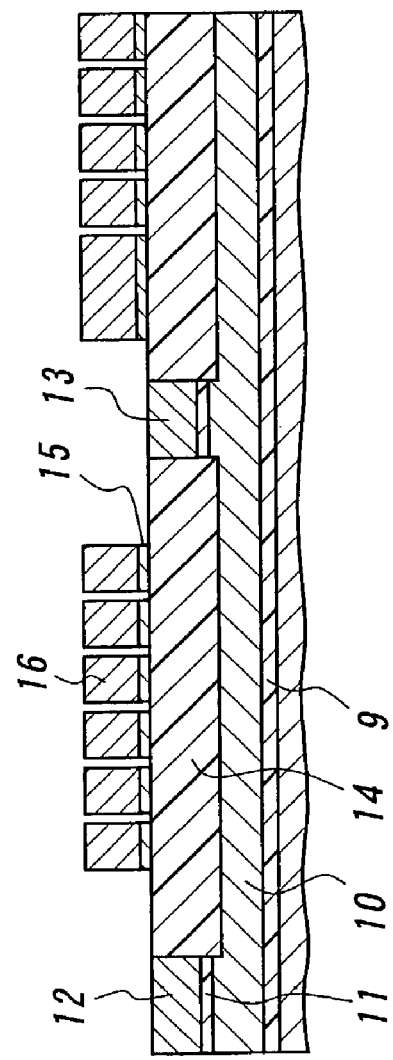
Figure 5B:
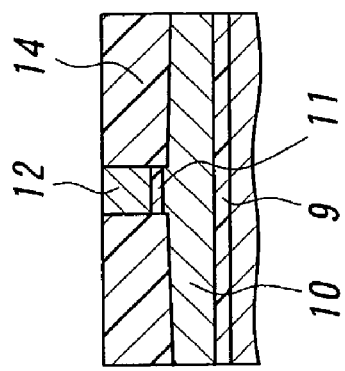
Figure 6A:
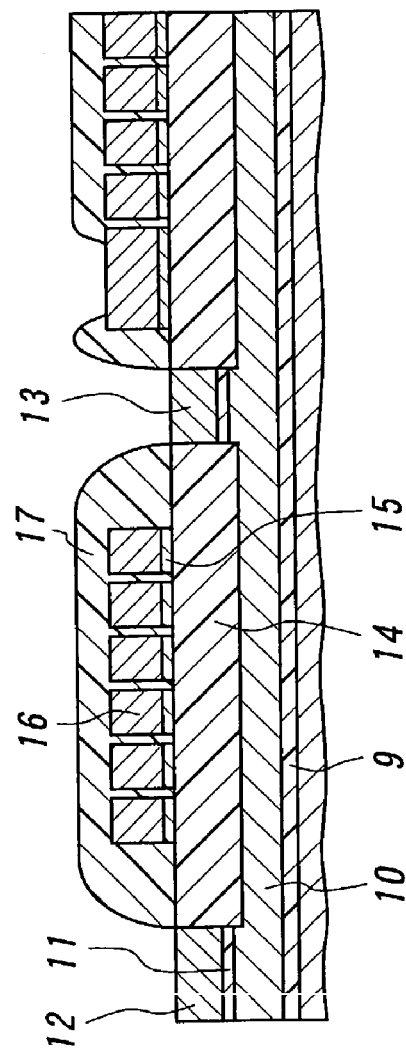
Figure 6B:
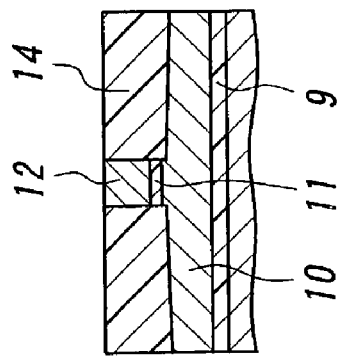
Figure 8B:
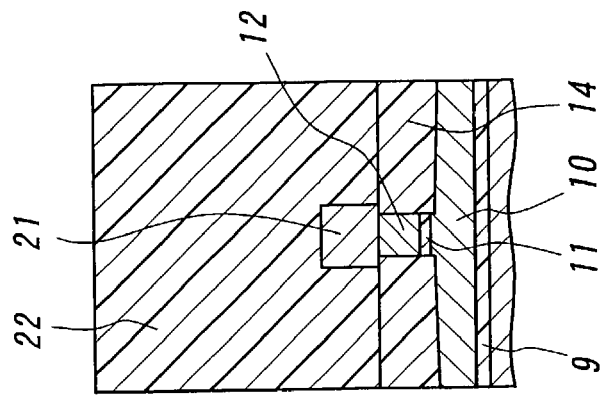
Figure 8A:
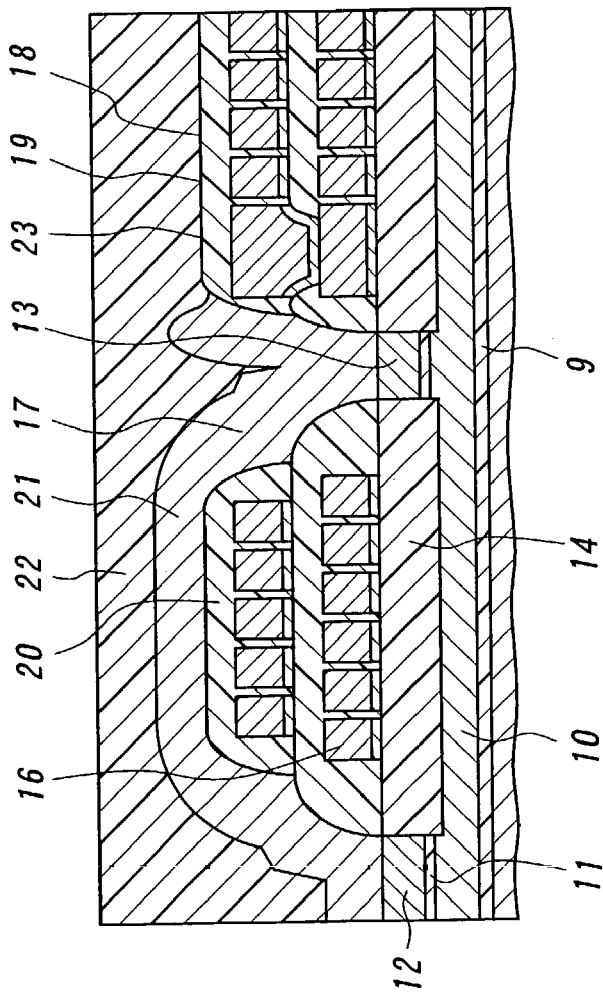
Figure 9:
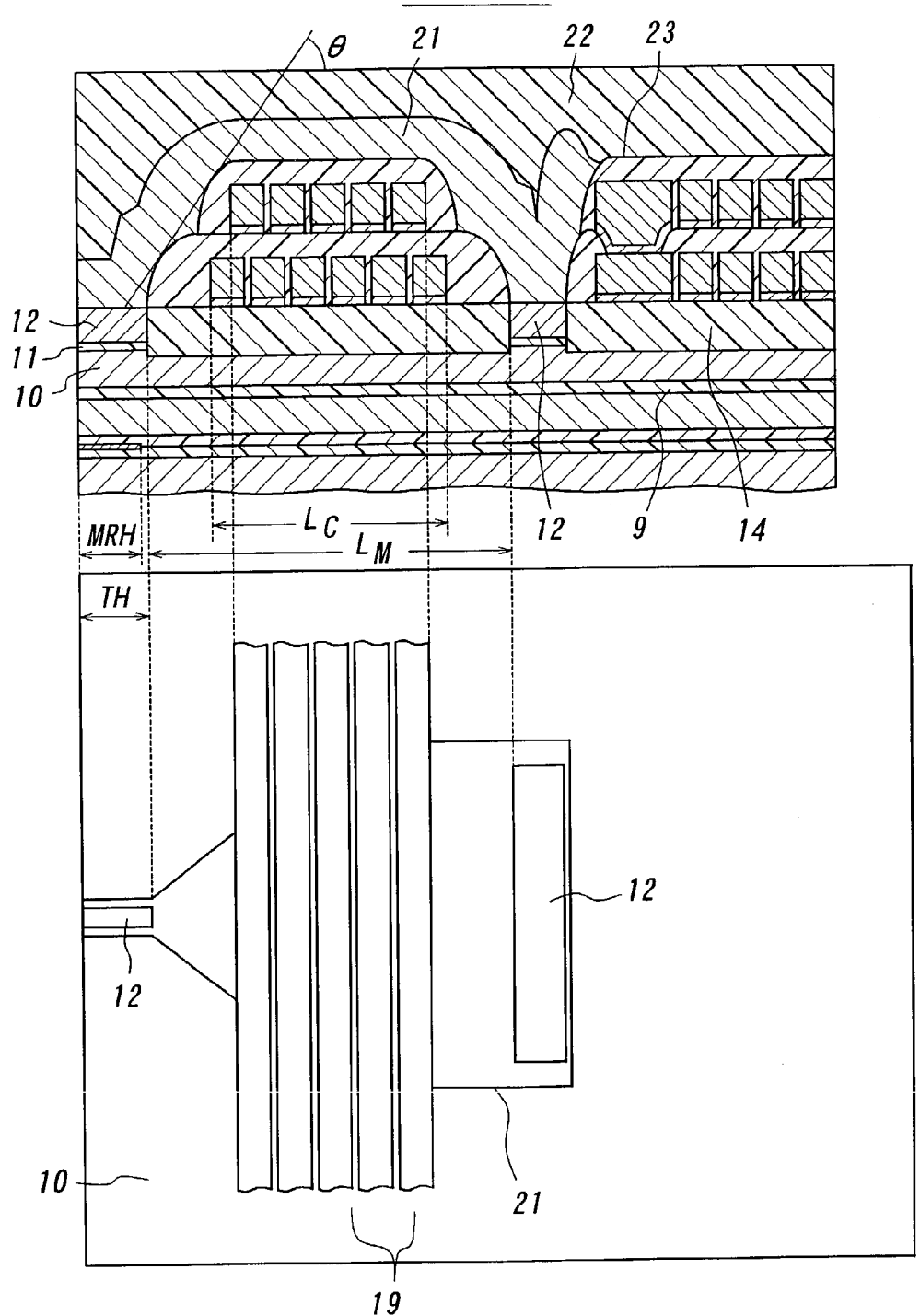
FIG. 9 shows cross sectional and plan views illustrating the known thin film magnetic head.

FIGS. 10A, 10B-23A, 23B are cross sectional and plan views showing successive steps of the method of manufacturing a first embodiment of the combination type thin film magnetic head according to the invention. In these drawings, A denotes a cross sectional view cut along a line perpendicular to the air bearing surface, and B represents a cross sectional view of a pole portion cut along a line parallel to the air bearing surface. It should be noted that the structure of a reading GMR head element formed by a magnetoresistive type thin film magnetic head and the method of manufacturing the same are substantially identical with those of the known head. As illustrated in FIGS. 10A and 10B, an insulating film 32 made of alumina and having a thickness of about 3 μm is deposited on one surface of a substrate 31 made of AlTiC. Furthermore, a bottom magnetic shield film 33 made of a permalloy for the magnetoresistive type thin film magnetic head is formed on the insulating film with a thickness of about 2-3 μm into a desired pattern by means of a plating method using a photoresist mask.

Subsequently, after forming an alumina film on a whole surface of the wafer with a thickness of 3-4 μm, a surface the alumina film is flattened by CMP to expose the bottom magnetic shield film. Next, after forming a bottom shield gap film 34 made of alumina with a thickness of 30-35 nm by sputtering, a GMR film 35 having a given layer-structure and lead electrodes 36 for the GMR film are formed by a lift-off process. Then, a top shield gap film 37 is formed with a thickness of 30-35 nm by sputtering of alumina, and a top magnetic shield film 38 for the GMR head element is formed with a thickness of about 1-1.5 μm.

Next, an isolation film 39 made of alumina is formed with a thickness of about 0.15-0.3 μm for isolating the reading GMR head element from a writing inductive type thin film magnetic head element to suppress noise in a reproduced output signal from the GMR head element. After that, a magnetic material film 40 for constituting a bottom pole of the recording head element is formed with a thickness of 2.0-2.5 μm. The magnetic material film 40 may be formed by a plating film of NiFe (80%:20%), NiFe (45%:55%), FeCo (67%:33%) or CoNiFe (64%:18%;18%) or may be formed by a sputtering film of FeAlN, FeN, FeCo, CoFeN or FeZrN. In the present embodiment, the magnetic material film is formed by a plating film of CoNiFe.

Next, a band-shaped magnetic material film 41 made of CoNiFe is formed on the magnetic material film 40 with a thickness of 3.0 μm by an electrolytic plating process using a photoresist mask. As will be explained later, the band-shaped magnetic material film 41 constitutes a bottom track pole. During the formation of the magnetic material film 41, a first bridge portion 41a constituting a back gap is formed. Next, an insulating film 43 made of alumina is formed on a whole surface with a thickness of 0.2 μm, and a seed film 44 made of copper is formed on the insulating film with a thickness of 50 nm as illustrated in FIGS. 10A and 10B.

After forming a resist mask having a given pattern on the Cu-seed film 44, a first thin film coil half 45 is formed by an electrolytic plating process with a thickness of 2.5-3.0 μm which is slightly larger than a final thickness of the thin film coil, e.g. 2.0 μm. After removing the resist mask, exposed portions of the seed film 44 are removed by ion milling, and then an alumina insulating film 46 is formed on a whole surface with a thickness of 0.1 μm as illustrated in FIGS. 11A and 11B. The thus formed Cu film of the coil windings of the first thin film coil half is called Cu-P by abbreviating Cu-Plating.

In this case, a width of an end portion 45a of the innermost coil winding which will constitute a contact portion for wiring is made larger than a width of remaining coil windings. Furthermore, in the present embodiment, within an area of the thin film coil surrounded by the bottom pole and the top pole, innermost and outermost coil windings are formed by a second thin film coil half, and a width of these coil windings is larger than that of the remaining coil windings. That is to say, a distance W1 between the outermost coil winding of the first thin film coil half 45 and an end face of the magnetic material film 41 constituting the track pole and a distance W2 between the innermost coil winding of the first thin film coil half 45 and the bridge portion 41a constituting the back gap are larger than a space W3 between successive coil windings. In the present embodiment, a width of the coil windings of the first thin film coil half 45 is set to 0.3 μm and W1=W2=0.4 μm and W3=0.3 μm, and a width of the innermost and outermost coil windings is larger than that of the remaining coil windings by not less than 0.1 μm. According to the invention, this difference in the above mentioned widths W1, W2 and W3 may be set to 0.1-0.3 μm. Moreover, in order to make a width of portions of the coil windings of the thin film coil except for portions surrounded by the bottom pole and the top pole larger, a width W4 of a space on a side of the bridge portion opposite to the air bearing surface is much larger than the widths W1, W2 and W3. It should be noted that the drawings do not show an accurate ratio of these widths, but represent only magnitude relation.

Now a reason for setting the condition of W1, W2>W3 will be explained hereinbelow. As mentioned above, the first thin film coil half 45 is formed using the resist mask. A position of the resist mask relative to the wafer might deviate. For instance, if the resist mask shifts toward the air bearing surface, a distance W1 between the outermost coil winding of the first thin film coil half 45 and the end face of the magnetic material film 41 is shortened, and if the resist mask shifts in a direction away from the air bearing surface, a distance W2 between the innermost coil winding of the first thin film coil half 45 and the bridge portion 41a constituting the back gap is shortened. If the distance W1 or W2 is shortened by a misalignment, a width of outermost or innermost coil winding of the second thin film coil half is decreased and a resistance becomes higher than a give value. Particularly, the outermost coil winding has a longer length than the remaining coil windings, and thus if its width W1 is shortened, a resistance value becomes extremely high and an undesired heat generation might occur. If such a heat generation occurs at a site near the air bearing surface, the pole chip might protrude outwardly (pole protrusion) and might be contacted with a record medium surface. When W1, W2>W3 is satisfied, although a position of the resist mask for forming the first thin film coil half 45 is deviated, a width of the outermost and innermost coil windings of the second thin film coil half is never smaller than a given width, and the above mentioned problem of pole protrusion can be effectively avoided.

Furthermore, upon forming the first thin film coil half 45, since the distances between the outermost and innermost coil windings of the first thin film coil half and the magnetic material film 41 and bridge portion 41a are long, undesired light reflection from the magnetic material film and bridge portion during a light exposure of a photolithography can be suppressed, and therefore the photolithography can be performed easily and accurately.

Next, an alumina insulating film 46 is formed on a whole surface with a thickness of 0.1 μm as depicted in FIGS. 11A and 11B. According to the invention, the alumina insulating film 46 is preferably formed by CVD. That is to say, the alumina insulating film is preferably formed by an atomic layer process, in which a CVD chamber having the wafer installed therein is kept at a temperature of 100-300° C. under a reduced pressure state of 1-2 Torr, and $Al(CH_3)_3$ or $AlCl_3$ and $H_2O$, $N_2$, $N_2O$ or $H_2O_2$ are alternately projected intermittently to deposit an alumina by a chemical reaction. In the present embodiment, the reduced pressure alumina-CVD film 46 is formed by projecting a steam ($H_2O_2$) and $Al(CH_3)_3$ alternately at a rate of once a second to the chamber kept at 180-250° C. under a reduced pressure of 1.5 Torr. Such an alumina-CVD film 46 has an excellent electrically insulating property as well as a superior step-coverage.

Then, as shown in FIGS. 12A and 12B, a Cu-CVD film 47 is formed on a whole surface with a thickness of 1.5-2.5 μm. After forming a photoresist mask 48 having a given pattern on the Cu-CVD film 47 as depicted in FIGS. 13A and 13B in an area except for the thin film coil forming area, an electrolytic plating film of copper (Cu-P film) 49 is formed with a thickness of 2-3 μm. Then, the photoresist mask 48 is removed and an exposed portion of the Cu-CVD film 47 is removed as shown in FIGS. 14A and 14B by means of RIE or ion milling while the Cu-P film 49 is utilized as an etching mask. Then, as illustrated in FIGS. 15A and 15B, an alumina insulating film 50 is formed on a whole surface with a thickness of 3-4 μm.

After that, the alumina insulating film 50 is flattened by CMP such that the first thin film coil half 45, magnetic material film 41, bridge portion 41a and alumina insulating film 50 are exposed to form a flat coplanar surface. During this CMP process, a second thin film coil half 51 is formed in a self-aligned manner between successive coil windings of the first thin film coil half 45 with interposing the alumina-CVD film 46 therebetween. In the present embodiment, since W1, W2>W3, a width of an outermost coil winding 51a and an innermost coil winding 51b of the second thin film coil half 51 is larger than a width of the remaining coil windings. Furthermore, although not shown in FIGS. 17A and 17B, an end portion of the innermost coil winding 51b of the second thin film coil half 51 constituting a wiring contact has a wider width. In the present embodiment, the second thin film coil half 51 has a two-layer structure of the Cu-CVD film 47 and Cu-P film 49, but portions of the coil windings between the magnetic material film 41 and the bridge portion 41a have a narrow width and are formed only by the Cu-CVD film 47. CMP is controlled such that a height of the thin film coil is set to about 2 μm. After CMP, a wide portion of the alumina insulating film 50 is remained between the bridge portion 41a constituting the back gap and the end portions of the first and second thin film coil halves 45 and 51 (only the end portion 45a of the first thin film coil half is shown in the drawing). This wide portion of the alumina insulating film 50 can effectively isolate the bridge portion 41a from the end portions of the innermost coil windings of the first and second thin film coil halves 45 and 51 and these portions can be effectively prevented from short-circuit.

Figure 17A:
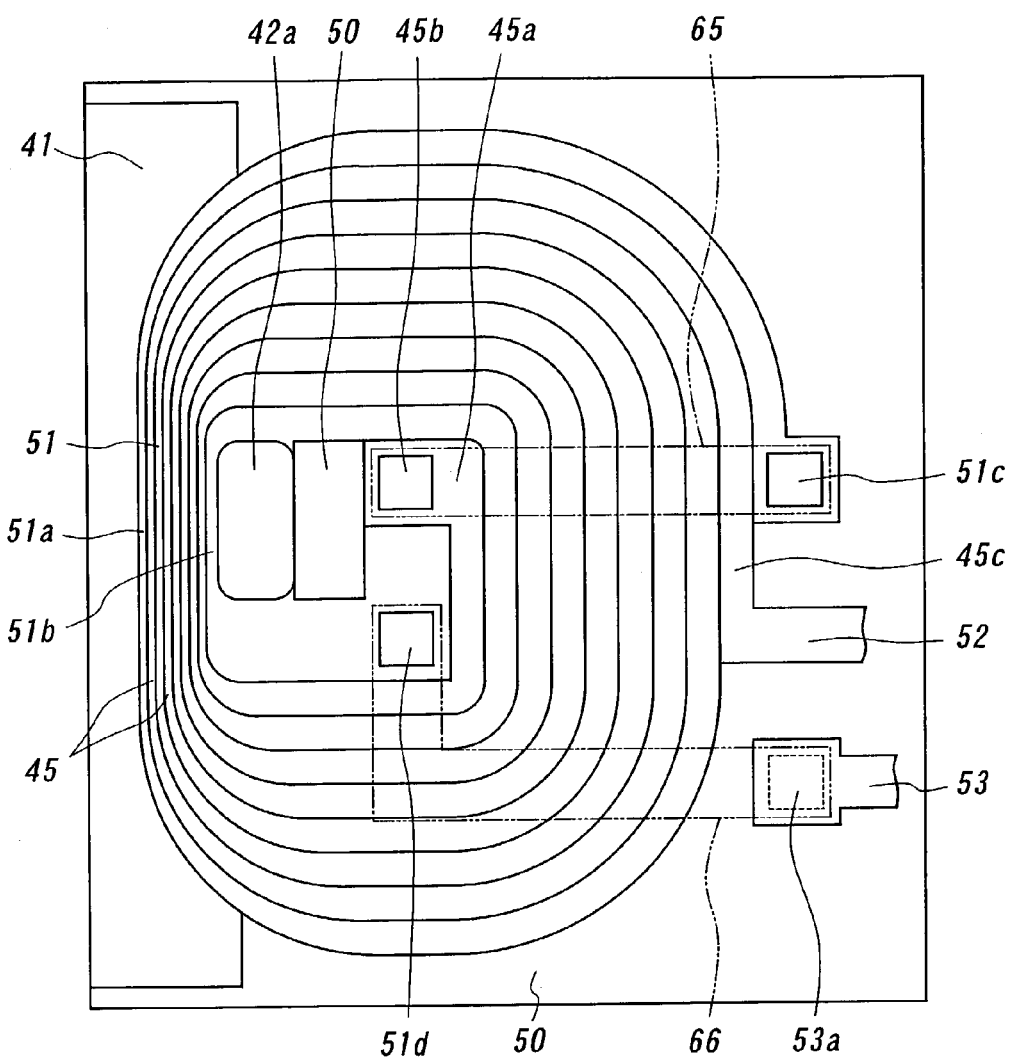
FIGS. 17A and 17B are plan view and cross sectional view, respectively showing the arrangement of first and second thin film coil halves and first and second jumper wirings connecting the coils.
Figure 17B:
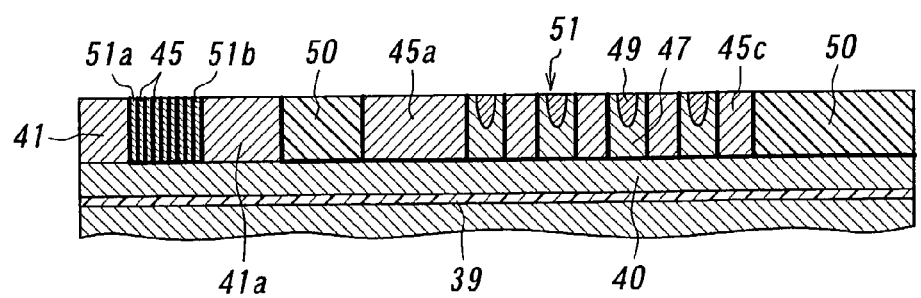

FIGS. 17A and 17B are plan and cross sectional views, respectively showing the structure of the thin film coil formed in the above explained manner. For the sake of clarity, the inter-layer film serving to isolate the coil windings of the first and second thin film coil halves 45 and 51 are depicted as a thick line. A first jumper wiring 65 electrically connecting the end portion 45a of the outermost coil winding of the first thin film coil half 45 to the end portion of the outermost coil winding of the second thin film coil half 51 and a second jumper wiring 66 connecting the end portion of the innermost coil winding of the second thin film coil half 51 to an external circuit will be formed later with a magnetic material film. An alumina insulating film 52 is remained between the bridge portions 43a, 43b constituting the back gap and the innermost coil winding of the first thin film coil half 46. That is to say, as illustrated in FIG. 17A, the first jumper wiring 65 having one end connected to the end portion of the innermost coil winding 51B of the second thin film coil half 51 and the other end connected to a contact portion 51c formed at the end portion of the outermost coil winding 51a of the second thin film coil half 51 and the second jumper wiring 66 having one end connected to a contact portion 51d formed at the end portion of the innermost coil winding 51b of the second thin film coil half 51 are made of a magnetic material. These jumper wirings 65 and 66 are formed on an alumina insulating film 55 as will be explained later. An end portion 45c of the outermost coil winding of the first thin film coil half 45 is guided to a first contact pad by means of a third wiring 52 which is integrally formed with the outermost coil winding. Furthermore, the other end of the second jumper wiring 66 is brought into contact with a contact portion 53a of a fourth wiring 53 via an opening formed in the alumina insulating film 55, said fourth wiring being formed simultaneously with the first thin film coil half.

Next, as depicted in FIGS. 18A and 18B, after forming a photoresist mask 54 having a given pattern selectively on an area except for an area which the thin film coil is to be formed, the alumina insulating film 55 is uniformly formed with a thickness of 0.5-1.0 μm. Then, openings are formed in the alumina insulating film 55 by the lift-off of the photoresist mask 54. Furthermore, a magnetic material film 56 made of FeCo having the saturation magnetic flux density of 2.4 T is formed with a thickness of 0.8 μm on a whole surface as shown in FIGS. 19A and 19B. The magnetic material film 56 may be made of FeN or CoFeN.

The surface of the magnetic material film 56 made of FeCo, FeN or CoFeN is flattened by CMP to expose the alumina insulating film 55 as illustrated in FIGS. 20A and 20B, During this polishing process, a bottom track pole 57 coupled with the magnetic material film 41, a second bridge portion 58 coupled with the first bridge portion 41a and a conductive film 59 coupled with the end portion 45a of the innermost coil winding of the first thin film coil half 45 and constituting the contact portion 45b are formed to have a coplanar flat surface together with the alumina insulating film 55. Then, as shown in FIGS. 21A and 21B, a write gap film 60 made of alumina is formed on the flat coplanar surface with a thickness of 0.1 μm, and then portions of the write gap film 60 situating at the back gap and the end contact portion of the innermost coil winding 45a of the first thin film coil half 45 are selectively removed. A magnetic material film 61 made of FeCo is formed with a thickness of 0.2-0.5 μm, and then a magnetic material film 62 made of FeN is formed on the film 62 with a thickness of 0.5-0.8 μm. Furthermore, a mask 63 made of FeAlN is formed to have a given patter with a thickness of 1-2 μm by an electrolytic plating process using a photomask. The above mentioned magnetic material film 62 may be made of FeCo or CoFeN.

Figure 22B:
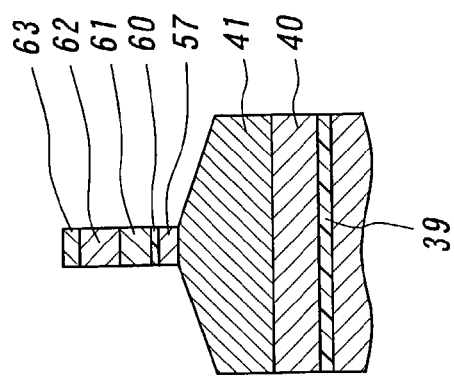
Figure 22A:
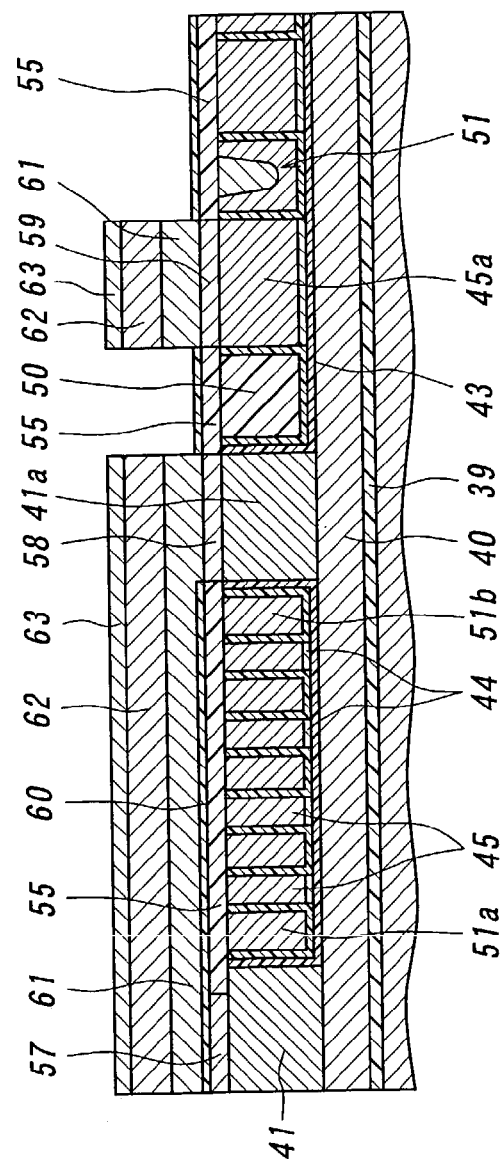

Next, using the mask 63 made of FeAlN, RIE is performed under a chlorine series gas such as BCl$_2$ and Cl$_2$ or a mixture gas of Cl$_2$ or BCl$_2$ and an inert gas such as Ar or N and O$_2$ at a high temperature of 50-300° C., particularly 200-250° C. to remove the magnetic material film 62 made of FeN and the magnetic material film 61 made of FeCo successively. Then, RIE is performed under Cl$_2$ or BCl$_2$ atmosphere at a high temperature of 50-300° C., particularly 200-250° C. to remove the write gap film 60 made of alumina, and further the surface of the magnetic material film 57 constituting the bottom track pole is partially removed to form the trim structure as depicted in FIGS. 22A and 22B. By forming the trim structure by RIE, it is possible to etch accurately and promptly the bottom track pole near the pattern edge. This is due to a fact an etching rate of ion milling 300 Å/min, whereas an etching rate of RIE is 2000 Å/min. During this RIE process, contact portions for contact pads are formed simultaneously. That is to say, the first jumper wiring 65 connected to the end portion 45a of the innermost coil winding of the first thin film coil half 45 by means of the conductive film 59 is formed by the magnetic material films 61 and 62. In the present embodiment, the mask 63 made of FeAlN is remained after the etching, but a thickness of the mask may be reduced such that the mask is entirely removed by the etching.

As stated above, the magnetic material films 61, 62, 57, 41 and write gap film 60 made of alumina are etched by RIE at a high temperature of 50-300° C., particularly 250° C. Then, etched debris is hardly deposited. By using, as an etching gas, a chlorine series gas such as BCl$_2$ and Cl$_2$ or a mixture gas of Cl$_2$ or BCl$_2$ and an inert gas such as Ar or N and O$_2$, it has been confirmed that an etching profile having almost 90 can be advantageously obtained. Particularly, when a mixture gas containing O$_2$ or N$_2$, an almost upright etching can be performed and undesired undercut of the etching mask can be effectively prevented. An etching gas containing BCl$_2$ has a high etching rate for alumina, and therefore the write gap film 60 made of alumina can be preferably etched using the etching gas containing BCl$_2$.

Finally, as shown in FIGS. 23A and 23B, an overcoat film 64 made of alumina is formed on a whole surface with a thickness of 20-30 μm. In an actual manufacturing process, after forming the overcoat film 64, the wafer is divided into a number of bars and a side wall of a bar is polished to form the air bearing surface. Then, the bar is divided into respective thin film magnetic heads. In FIGS. 23A and 23B, a polishing surface defining the air bearing surface is denoted by a broken line A-A.

According to the present invention, the top track pole 57 is formed to have a flat pattern by CMP, and thus any deviation of pattern due to undesired reflection of light during the photolithography. Therefore, it is possible to realize a very narrow track width not larger than 0.5 μm, particularly of quarter-micron order of 0.25-0.15 μm in an accurate, easy and prompt manner.

Figure 24B:
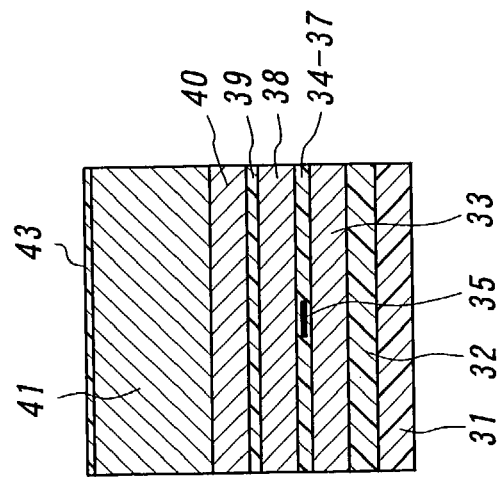
Figure 24A:
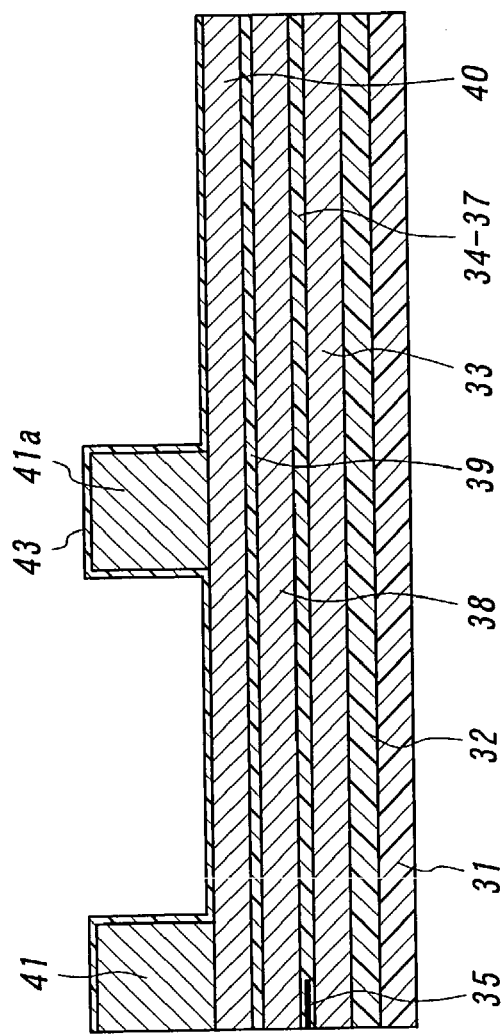

FIGS. 24A, 24B-41A, 41B are cross sectional and plan views showing successive steps of the method of manufacturing a second embodiment of the combination type thin film magnetic head according to the invention. In the present embodiment, portions similar to those of the first embodiment are denoted by the same reference numerals used in the first embodiment. The structure of the GMR head element constituting the reading magnetoresistive type thin film magnetic head and the method of manufacturing the same are substantially identical with those of the first embodiment. That is to say, as illustrated in FIGS. 24A and 24B, an insulating film 32 made of alumina and a bottom shield film 33 for the magnetoresistive type thin film magnetic head are formed on a surface of a substrate 31 made of AlTiC. After forming a bottom shield gap film is formed by sputtering, a GMR film 35 and lead electrodes 36 for the GMR film are formed. Then, a top shield gap film is formed and a top shield film 38 is formed on the top shield gap film. After forming an isolation film 39 for isolating the reading GMR head element from a writing inductive type thin film magnetic head element, a magnetic material film 40 for constituting a bottom pole of the recording head element is formed with a thickness of 0.5-1.0 μm. The magnetic material film 40 may be formed by a plating film of CoNiFe having a saturation magnetic flux density of 1.9-2.1 T, but may be formed by a plating film of FeCo having a saturation magnetic flux density of 2.3 T.

Next, a magnetic material film 41 constituting a first bottom track pole is formed on the magnetic material film 40 to have a given pattern using a photoresist mask. In the present embodiment, the magnetic material film 41 is formed by a plating film of CoNiFe having a thickness of 3.0-4.0 μm, but it may be formed by a plating film of FeCo. During the formation of the magnetic material film 41, a first bridge portion 41a constituting a back gap is formed. Then, an insulating film 43 made of alumina is formed on a whole surface with a thickness of 0.1-0.2 μm. Also in the present embodiment, a seed film made of copper is formed on this insulating film. However, for the sake of clarity, the seed film is not shown in FIGS. 24A and 24B.

Next, a resist mask having a given pattern is formed on the Cu-seed film, and then a first thin film coil half 45 made of Cu-P film is formed with a thickness of 3.0-3.5 μm which is slightly larger than a final thickness of the thin film coil. After removing the resist mask, exposed portions of the seed film 44 are removed by ion milling as depicted in FIGS. 25A and 25B. Like as the previous embodiment, a width of an end portion 45a of the innermost coil winding which will constitute a contact portion for wiring is made larger than a width of remaining coil windings. Furthermore, in an area of the thin film coil surrounded by the bottom pole and the top pole, innermost and outermost coil windings are formed by a second thin film coil half to be formed later, and a width of these coil windings is larger than that of the remaining coil windings.

Next, an alumina insulating film 46 is formed by the above mentioned atomic-layer method on a whole surface with a thickness of 0.03-0.015 μm as depicted in FIGS. 26A and 26B. Then, a Cu sputter film 47a having a thickness of 500 Å and a Cu-CVD film 47b having a thickness of 500 Å are successively deposited on the alumina insulating film 46 to form a seed layer. In order to clarify the drawing, these Cu films 47a and 47b are shown as a single film. Furthermore, as illustrated in FIGS. 28A and 28B, after forming a photoresist mask 48 having a given pattern in an area except for the thin film coil forming area, a Cu-P film 49 is formed with a thickness of 3-5 μm. After that, the photoresist mask 48 is removed and an exposed portion of the Cu seed film 47a, 47b is selectively removed as shown in FIGS. 28A and 28B by means of a dry etching such as ion milling or wet etching, while the Cu-P film 49 is utilized as an etching mask. In case of the wet etching, use may be made of an etching liquid such as diluted sulfuric acid, diluted hydrochloric acid and diluted nitric acid which have been generally used for the Cu-etching. When the wet etching using such an etching liquid is performed, the Cu seed layer can be removed without remaining Cu on side walls of the bridge portion 41a and the end portion 45a of the innermost coil winding of the first thin film coil half to avoid shot-circuit of coil windings of the thin film coil.

Next, as illustrated in FIGS. 29A and 29B, an alumina insulating film 50 is formed by sputtering on a whole surface with a thickness of 3-5 µm. Then, the alumina insulating film 50 is flattened by CMP using a neutral slurry or alkali slurry such that the first thin film coil half 45, magnetic material film 41, bridge portion 41a and alumina insulating film 50 are exposed to form a flat coplanar surface as shown in FIGS. 30A and 30B. During this CMP process, a second thin film coil half 51 is formed in a self-aligned manner between successive coil windings of the first thin film coil half 45 with interposing the alumina-CVD film 46 therebetween.

Also in the present embodiment, the innermost and outermost coil winding of the thin film coil are formed by the second thin film coil half 51 and a width of the outermost coil winding 51a and innermost coil winding 51b is larger than a width of the remaining coil windings. Furthermore, an end portion of the innermost coil winding 51b of the second thin film coil half 51 constituting a wiring contact has a wider width. The bridge portion 41a constituting the back gap, the end portion 45a of the innermost coil winding of the first thin film coil half 45 and the end portion of the innermost coil winding of the second thin film coil half 51 not shown in the drawing can be effectively isolated from each other by means of the alumina insulating film 50 having a large width. This is advantageous when jumpers connecting the first and second thin film coil halves 45 and 51 are formed at the end portions of these coil windings.

Next, as shown in FIGS. 31A and 31B, an alumina insulating film 111 is formed on the surface flattened by CMP with a thickness of 0.2-0.3 µm, and then openings are selectively formed by photolithography process in the alumina insulating film at portions corresponding to the pole portion, back gap portion and wiring portions for the thin film coil. After that, a magnetic material film 112 constituting the second bottom track pole is formed by plating of CoFe with a thickness of 1.5-2.5 µm. During this plating process, a second bridge portion 112a contacted with the first bridge portion 41a constituting the back gap and a conductive film 112b contacted with the end portion 45a of the innermost coil winding of the first thin film coil half 45 are simultaneously formed. Upon forming the magnetic material film 112, a position of and end face opposite to the air bearing surface is slightly closer to the air bearing surface than the end face of the magnetic material film 41 constituting the first bottom track pole.

Next, as shown in FIGS. 32A and 32B, an alumina insulating film 113 is formed by sputtering on a whole surface with a thickness of 2-3 µm. Then, as illustrated in FIGS. 33A and 33B, CMP is performed such that the a thickness of the magnetic material film 112 is reduced to 1.0-1.5 µm to form a second bottom track pole. Next, a magnetic material film 114 made of FeCo is formed by sputtering on a whole surface with a thickness of 0.5-1.0 µm, and a magnetic material film 115 made of NiFe is formed by plating to have a given pattern. The magnetic material film 114 may be formed by sputtering of CoFeN and the magnetic material film 115 may be formed by plating of FeCo or CoFeN. During the formation of the magnetic material film 115, a third bridge portion 115a and a third conductive film 115b are formed. In the present embodiment, an end face of the magnetic material film 115 opposite to the air bearing surface defines the throat height zero reference position, and since the magnetic material film is formed by plating, a position of said end face can be determined precisely.

Next, while using the magnetic material film 115, third bridge portion 115a and second conductive film 115b as mask, the magnetic material film 114 is selectively etched to form simultaneously a third bottom track pole 111, second bridge portion 114a and second conductive film 114b as shown in FIGS. 35A and 35B. This etching may be performed by a dry etching such as RIE or ion beam etching. Then, after forming an alumina insulating film 116 on a whole surface with a thickness of 2-3 µm, the magnetic material film 115 serving as the etching mask is removed by CMP to expose the magnetic material film 114, second bridge portion 114a and second conductive film 114b as shown in FIGS. 36A and 36B. An end face of the third bottom track pole 114 opposite to the air bearing surface is closer to the air bearing surface than the corresponding end face of the magnetic material film 112 constituting the second bottom track pole. In this manner, the third bottom track pole 114 is formed by the dry etching process while the magnetic material film 115 formed by plating is used as the mask and the alumina insulating film 116 is flattened by CMP. Then, the throat height zero reference position defined by the end face of the third bottom track pole 114 opposite to the air bearing surface can be determined in an extremely accurate manner, and a very short throat height not larger than 0.3-0.5 µm can be formed very precisely. Furthermore, the present embodiment has a unique characteristic that the bottom track pole consisting of the first bottom track pole formed by the magnetic material film 41, the second bottom track pole formed by the magnetic material film 112 and the third bottom track pole 114 has a step-shaped cross sectional configuration.

Figure 37A:
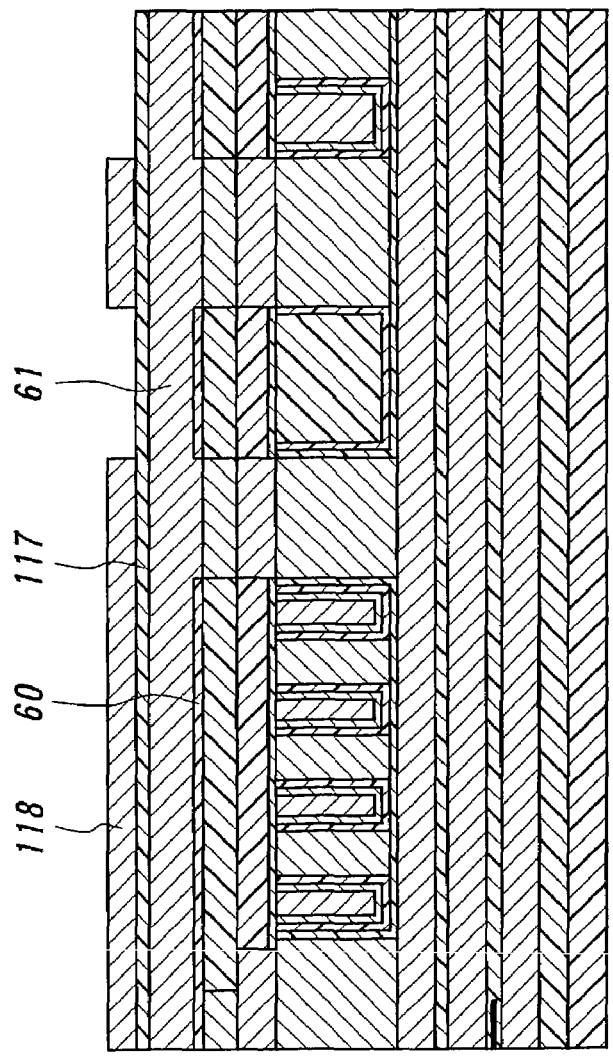
Figure 37B:
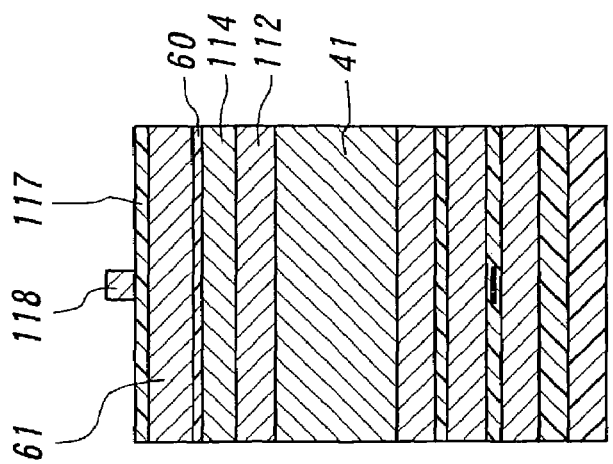

Next, as depicted in FIGS. 37A and 37B, a write gap film 60 made of alumina is formed on the surface flattened by CMP with a thickness of 0.06-0.08 µm, and portions of the write gap film 60 situating on the back gap portion and the contact portion at the end of the innermost coil winding 45a of the first thin film coil half 45 are selectively removed. Then, a magnetic material film 61 constituting the top pole is formed by sputtering of FeCo with a thickness of 1.0-1.2 µm, and an alumina insulating film 117 is formed on the magnetic material film with a thickness of 0.5-1.0 µm. Furthermore, a metal mask 118 serving as an etching mask is formed into a given pattern by plating with a thickness of 0.5-0.8 µm. In the present embodiment, the magnetic material film 116 constituting the top pole is formed by the sputtered film of FeCo, but this film may be formed by a sputtered film of CoFeN.

Next, as illustrated in FIGS. 38A and 38B, the alumina insulating film 117 is selectively removed by RIE using a chlorine series gas such as a mixture gas of $Cl_2$ or $BCl_2$ and $O_2$ or $CO_2$ at a high temperature of 200-250° C. to form a top pole 120. An end portion of the top pole 120 opposing to the air bearing surface constitutes a top track pole which is opposed to the bottom track pole via the write gap film 60, and the other end portion opposite to the air bearing surface is brought into contact with the third bridge portion 114a. During the formation of the top pole 120, a third conductive film 120a connected electrically to the second conductive film 114b is formed.

Figure 41B:
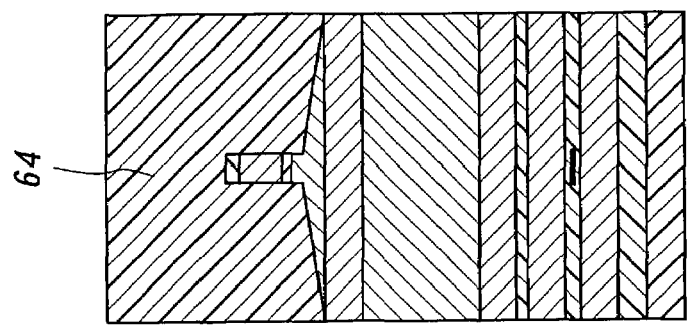
Figure 41A:
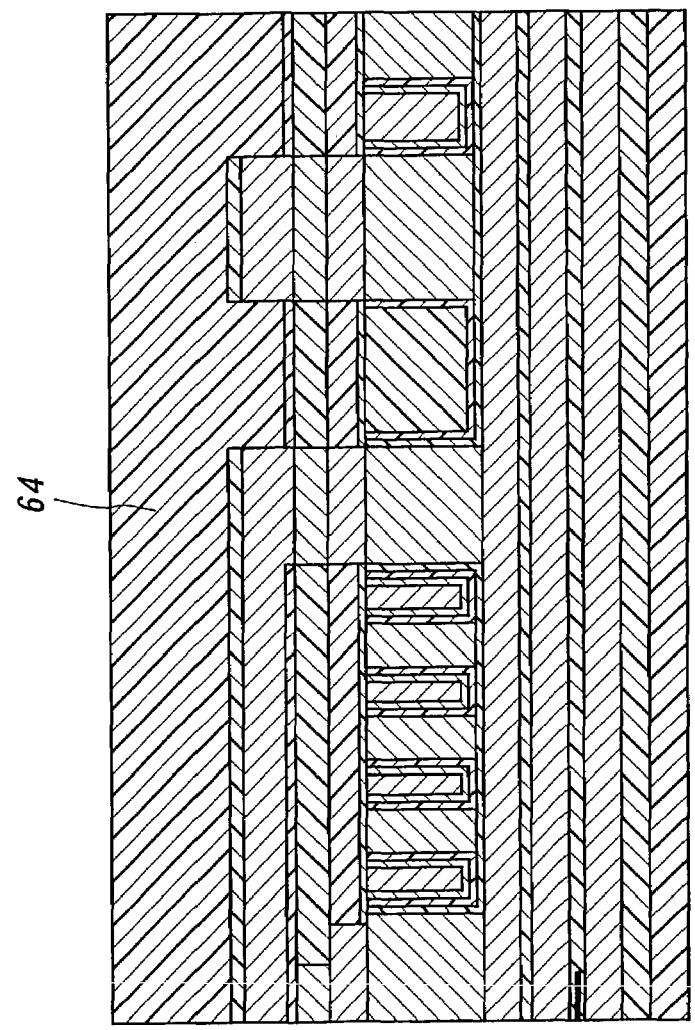

Next, an ion beam etching process using the top pole 120 as an etching mask is performed to remove an exposed portion of the write gap film 60, and further an underlying portion of the third bottom track pole 144 is removed to form the trim structure as illustrated in FIGS. 40A and 40B. During this etching process, contact portions for contact pads are also formed. After the etching process, the alumina insulating film 118 is slightly remained, but the alumina insulating film may be completely removed by the etching. Finally, an overcoat film 64 made of alumina is formed on a whole surface with a thickness of 20-40 µm as shown in FIGS. 41A and 41B.

In the present embodiment, the end faces of the magnetic material films 41, 112 and 114 constituting the bottom track pole are formed to be successively closer to the air bearing surface, and thus lengths L1, L2 and L3 of the magnetic material films 114, 112 and 41 measured from the air bearing surface become successively longer. In the present embodiment, L1=0.80 µm, L2=0.86 µm and L3=1.2 µm. This results in that a cross sectional area of the bottom track pole becomes gradually larger upon departing from the write gap film 60. Then, it has been confirmed that a saturation of a magnetic flux generated by a writing current does hardly occur. In a thin film magnetic head having a throat height larger than 0.5 µm such a problem does not occur, but in a miniaturized thin film magnetic head having a throat height not larger than 0.5 µm, particularly of quarter-micron order the above mentioned problem becomes manifest. In the present embodiment, such a problem can be effectively solved.

FIGS. 42A, 42B-53A, 53B are cross sectional and plan views showing successive steps of the method of manufacturing a third embodiment of the combination type thin film magnetic head according to the invention. In the present embodiment, portions similar to those of the previous embodiments are denoted by the same reference numerals used in the above explained embodiments. The structure of the GMR head element constituting the reading magnetoresistive type thin film magnetic head and the method of manufacturing the same are substantially identical with those of the first and second embodiments. That is to say, as illustrated in FIGS. 42A and 42B, an insulating film 32 made of alumina and a bottom shield film 33 for the magnetoresistive type thin film magnetic head are formed on a surface of a substrate 31 made of AlTiC. After forming a bottom shield gap film is formed by sputtering, a GMR film 35 and lead electrodes 36 for the GMR film are formed. Then, a top shield gap film is formed and a top magnetic shield film 38 is formed on the top shield gap film. Like as FIGS. 24A and 24B, the top shield gap film is denoted by a single layer film 34-37. After forming an isolation film 39 for isolating the reading GMR head element from a writing inductive type thin film magnetic head element, a magnetic material film 40 for constituting a bottom pole of the recording head element is formed with a thickness of 0.5-1.0 µm. The magnetic material film 40 may be formed by a plating film of CoNiFe.

Next, a magnetic material film 41 constituting a first bottom track pole is formed on the magnetic material film 40 in accordance with a given pattern while a photoresist mask is used. In the present embodiment, the magnetic material film 41 is formed by a plating film of FeCo having a thickness of 3.0-4.0 µm, but it may be formed by a plating film of CoNiFe. During the formation of the magnetic material film 41, a first bridge portion 41a constituting a back gap is formed. Then, an insulating film 43 made of alumina is formed by sputtering or CVD on a whole surface with a thickness of 0.1-0.2 µm.

Next, a Cu-plating is performed while a Cu seed film formed on the alumina insulating film 43 and a resist mask having a given pattern are used to form a first thin film coil half 45 made of Cu-P film with a thickness of 3.0-3.5 µm which is slightly larger than a final thickness of the thin film coil. After removing the resist mask, exposed portions of the seed film are removed by ion milling as depicted in FIGS. 43A and 43B. In these drawings, the Cu seed film is dispensed with.

Also in the present embodiment, a width of an end portion 45a of the innermost coil winding which will constitute a contact portion for wiring is made larger than a width of remaining coil windings. Furthermore, in an area of the thin film coil surrounded by the bottom pole and the top pole, innermost and outermost coil windings are formed by a second thin film coil half to be formed later, and a distance between successive coil windings of the first thin film coil half 45 is set such that a width of these coil windings is larger than that of the remaining coil windings.

Next, as shown in FIGS. 44A and 44B, an alumina insulating film 46 is formed by the above mentioned atomic-layer method on a whole surface with a thickness of 0.03-0.015 µm, then an area in which the second thin film coil half is to be formed is covered with a photoresist 151, and further an alumina insulating film 152 having a thickness of 3.0-5.0 µm is formed on a whole surface. Then, CMP is carried out to flatten the surface to expose the photoresist 151 as illustrated in FIGS. 45A and 45B. Then, the photoresist 151 is removed by wet etching as depicted in FIGS. 46A and 46B.

Figures 47A, 47B:
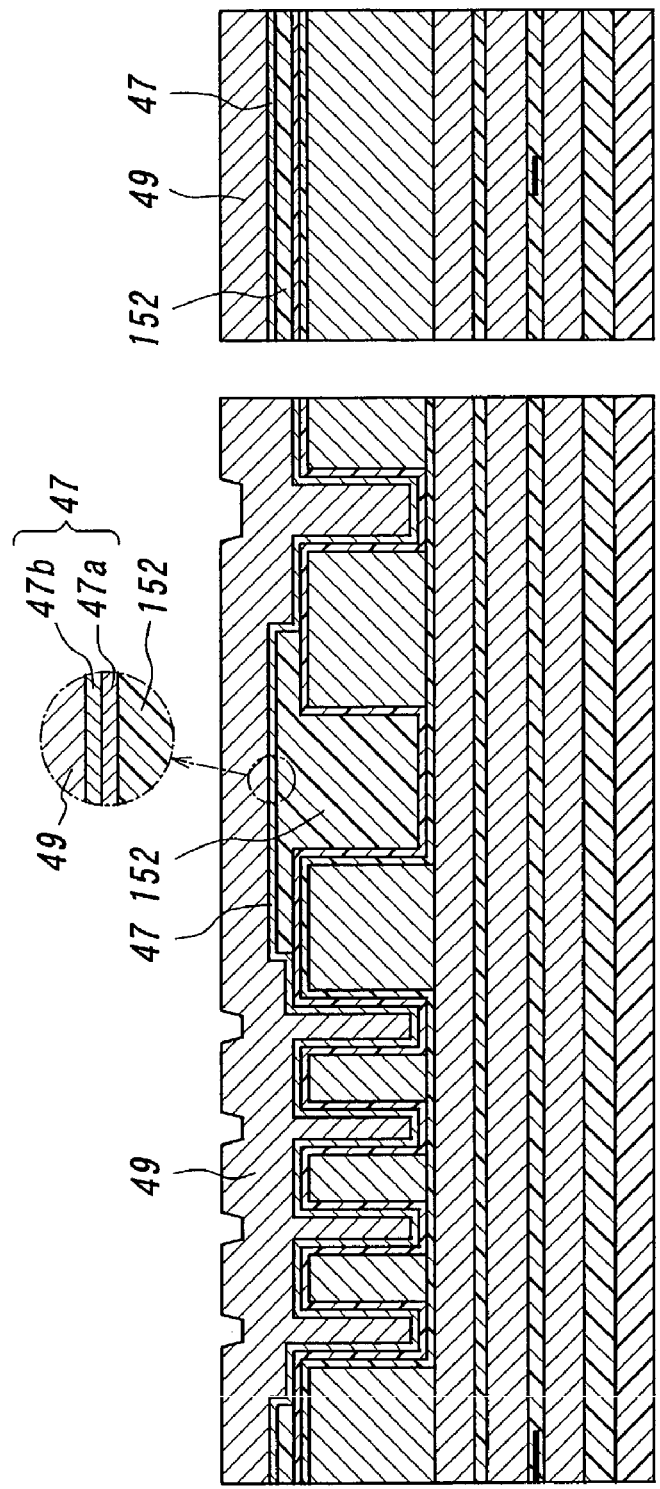
Figure 48A:
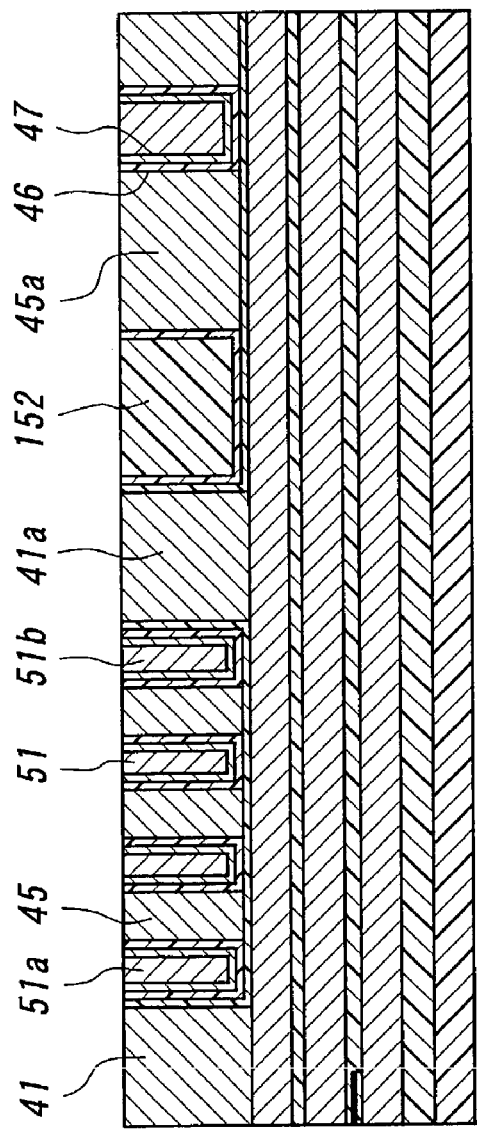
Figure 48B:
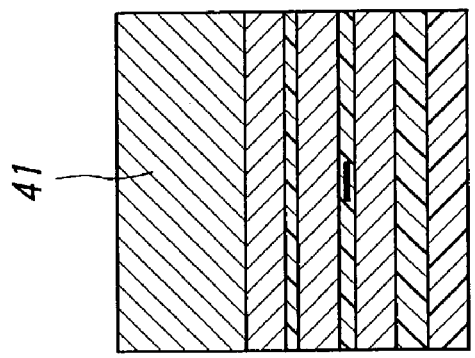

Next, as shown in FIGS. 47A and 47B, a Cu sputter film having a thickness of 500 Å and a Cu-CVD film 47b having a thickness of 500 Å are successively deposited to form a seed layer 47. A Cu-P film 49 is formed by an electrolytic plating process using the seed layer 47 as an electrode with a thickness of 3-5 µm. After that, CMP is performed to expose the first thin film coil half 45, the magnetic material film 41 constituting the bottom track pole, the bridge portion 41a constituting the back gap and the alumina insulating film 152. At the same time, a second thin film coil half 51 is formed in a self-aligned manner between successive coil windings of the first thin film coil half 45 via an alumina-CVD insulating film 46 as illustrated in FIGS. 48A and 48B.

Also in the present embodiment, the innermost and outermost coil winding of the thin film coil are formed by the second thin film coil half 51 and a width of the outermost coil winding 51a and innermost coil winding 51b is larger than a width of the remaining coil windings. Furthermore, an end portion of the innermost coil winding 51b of the second thin film coil half 51 constituting a wiring contact has a wider width. The end portion 45a of the innermost coil winding of the first thin film coil half 45 and the end portion of the innermost coil winding of the second thin film coil half 51 not shown in the drawing can be effectively isolated from the first bridge portion 41a constituting the back gap by means of the alumina insulating film 50 having a large width just like as the previous embodiments.

Next, as shown in FIGS. 49A and 49B, after forming an alumina insulating film 111 on the surface flattened by CMP with a thickness of 0.2-0.3 µm, openings are selectively formed by photolithography process in the alumina insulating film at portions corresponding to the pole portion, back gap portion and wiring portions for the thin film coil. After that, a magnetic material film 114 constituting the second bottom track pole is formed by plating of CoFeN with a thickness of 0.5-1.0 µm.

Figure 50B:
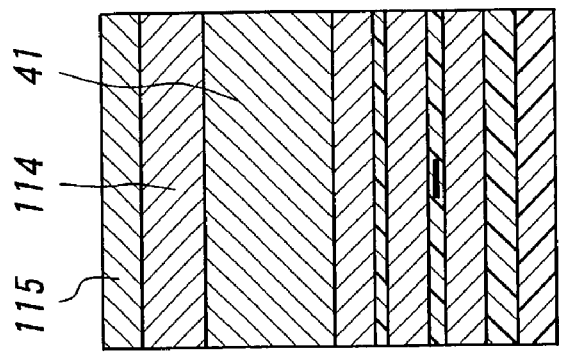
Figure 50A:
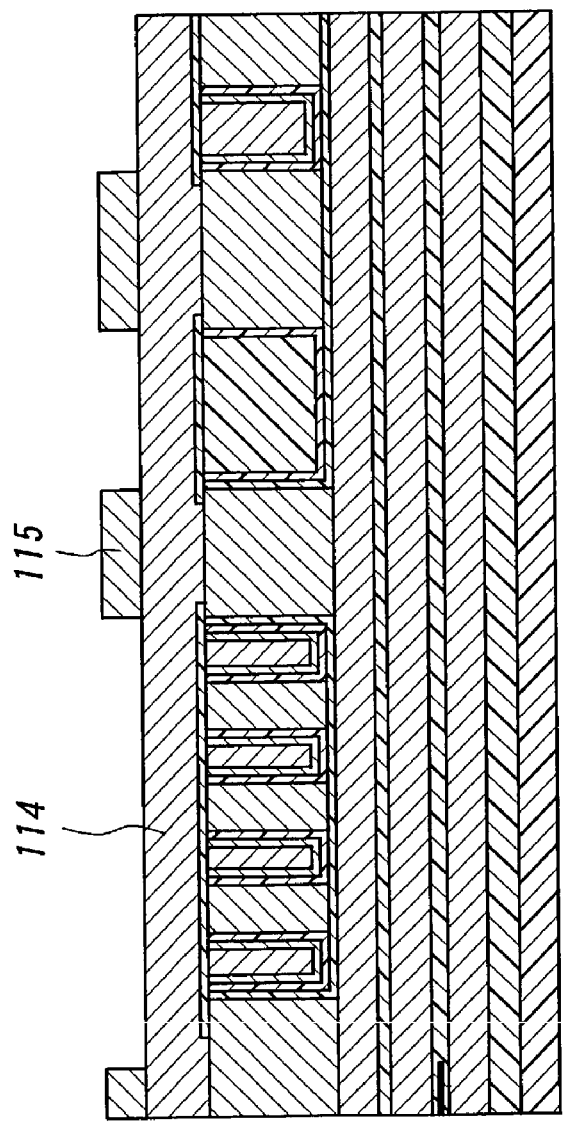

Next, as shown in FIGS. 50A and 50B, a magnetic material film 115 having a thickness of 1.0-2.0 µm is formed on the magnetic material film 114 by plating of CoNiFe in accordance with a given pattern. The magnetic material film 115 has a pattern corresponding to the second bottom track pole, second bridge portion and wirings for the thin film coil.

Then, while using the magnetic material film 115 as a mask, dry etching such as RIE or ion beam etching is performed to remove selectively the magnetic material film 114 and to form a second bottom track pole 114 connected to the first bottom track pole 41, a second bridge portion 114a connected to the first bridge portion 41a and a first conductive film 114b as shown in FIGS. 51A and 51B.

Then, after forming an alumina insulating film 116 on a whole surface with a thickness of 2-3 µm as illustrated in FIGS. 52A and 52B, the magnetic material film 115 serving as the etching mask is removed by CMP to expose the magnetic material film 114, second bridge portion 114a and second conductive film 114b into the flat surface. Then, a write gap film 60 made of alumina is formed on the surface flattened by CMP with a thickness of 0.06-0.08 µm, and openings are formed at the write gap film 60 situating on the back gap portion and the contact portion at the end of the innermost coil winding 45a of the first thin film coil half 45.

Figure 53B:
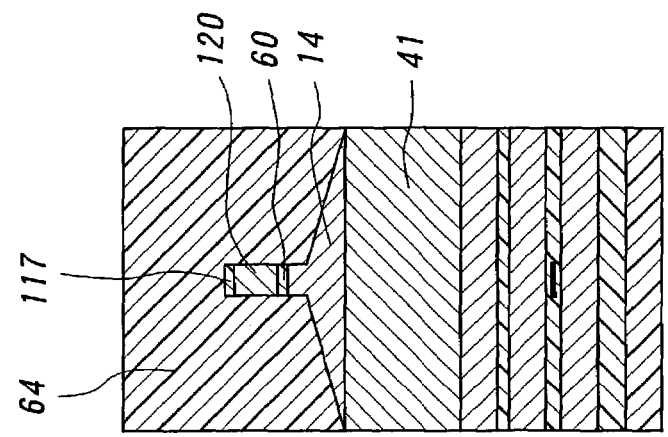
Figure 53A:
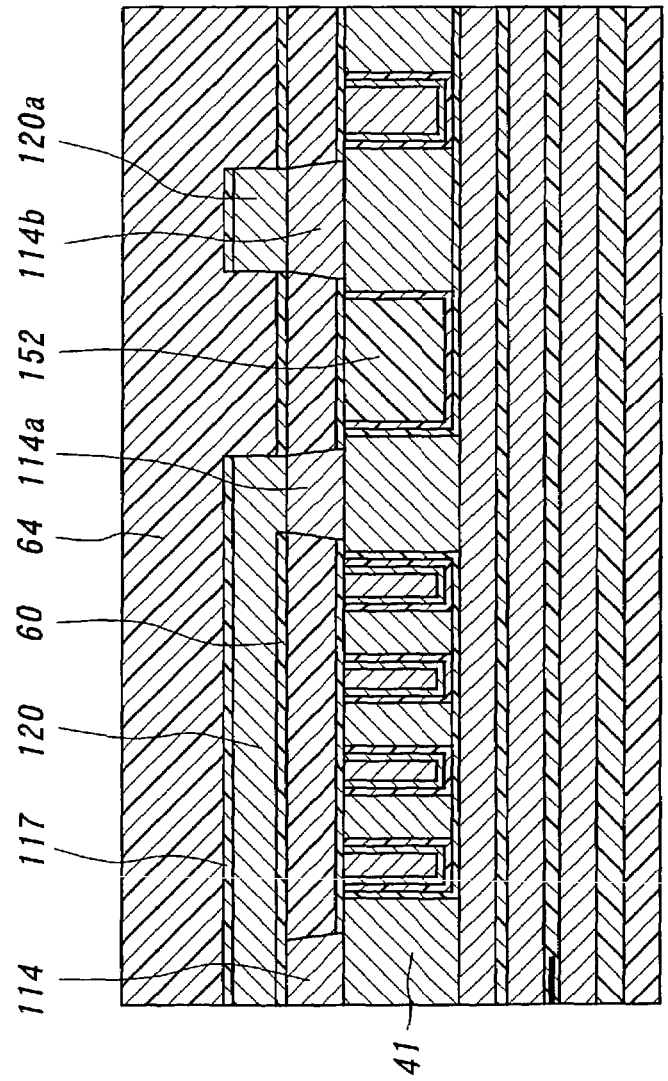

Then, as depicted in FIGS. 53A and 53B, a magnetic material film 120 constituting the top pole is formed on the write gap film 60 by sputtering of CoFeN with a thickness of 1.0-1.2 µm, and an alumina insulating film 117 is formed on the magnetic material film with a thickness of 0.5-1.0 µm. Furthermore, while the alumina insulating film 117 is used as a mask, the magnetic material film 120 is selectively removed by RIE using a chlorine series gas such as a mixture gas of $Cl_2$ or $BCl_2$ and $O_2$ or $CO_2$ at a high temperature of 200-250° C. to form a top pole 120. An end portion of the top pole 120 opposing to the air bearing surface constitutes a top track pole which is opposed to the bottom track pole via the write gap film 60, and the other end portion opposite to the air bearing surface is brought into contact with the third bridge portion 114a. During the formation of the top pole 120, a third conductive film 120a connected electrically to the second conductive film 114b is formed.

Next, an ion beam etching process using the top pole 120 as an etching mask is performed to remove an exposed portion of the write gap film 60, and further an underlying portion of the third bottom track pole 144 is removed to form the trim structure as illustrated in FIGS. 40A and 40B. Finally, an overcoat film 64 made of alumina is formed on a whole surface with a thickness of 20-40 µm.

FIGS. 54A and 54B are cross sectional views showing a fourth embodiment of the thin film magnetic head according to the present invention. In the present embodiment, portions similar to those shown in the first embodiment are denoted by the same reference numerals used in the first embodiment. A band-shaped magnetic material film 41 made of CoNiFe, a bridge portion 41a and a thin film coil 45, 51 are formed to constitute a flat coplanar surface. After forming an alumina insulating film 55 is formed with a thickness of 0.4-0.8 µm, a write gap film 60 made of a non-magnetic material is formed such that the write gap film covers the magnetic material film 41 and extends beyond a step formed between the magnetic material film and the insulating film 55.

Then, after forming a magnetic material film made of FeCo by sputtering with a thickness of 0.6-1.2 µm, a surface is flattened by CMP to expose the write gap film 60. During CMP, the magnetic material film constitutes a top track pole 121, a bridge portion 121a which is brought into contact with the bridge portion 41a, and a conductive film 121b which constitutes a contact portion 45b together with the end portion 45a of the innermost coil winding of the first thin film coil half 45. A magnetic material film 122 made of CoNiFe and having a thickness of 2-3 µm is formed on the flattened surface of the magnetic material film made of FeCo and write gap film 60 by plating to form a top track pole and a top pole which is brought into contact with the bridge portion 121a.

FIGS. 55A and 55B are cross sectional views depicting a fifth embodiment of the thin film magnetic head according to the present invention. The present embodiment is a modification of the fourth embodiment illustrated in FIGS. 54A and 54B. The present embodiment differs from the fourth embodiment only in the point that the magnetic material film constituting the bottom track pole is formed by a stack of two layers of a first magnetic material film 131 formed by plating of CoNiFe and a second magnetic material film 132 formed by sputtering of FeCo. In the present embodiment, the first magnetic material film 131 has a thickness of 2.0 µm and the second magnetic material film 132 has a thickness of 0.5 µm, but a thickness of the second magnetic material film 132 may be changed at will under a condition that a thickness of the second magnetic material film is smaller than that of the first magnetic material film. Furthermore, the first and second magnetic material films 131 and 132 may be made of any magnetic materials as long as a condition that the second magnetic material film has a higher saturation magnetic flux density than that of the first magnetic material film is satisfied.

The present invention is not limited to the embodiments explained above, but many modifications and alternations may be conceived with the scope of the invention. For instance, in the above first to fifth embodiments, In the above mentioned first to fifth embodiments, the thin film magnetic head is constructed as a combination type thin film magnetic head including a stack of the magnetoresistive type thin film magnetic head element and the inductive type thin film magnetic head element, but according to the invention, the thin film magnetic head may be constructed as the inductive type thin film magnetic head. In the above embodiments, the first thin film coil half is formed by electrolytic plating and the second thin film coil half is formed by Cu-CVD, but the second thin film coil half may be formed by electrolytic plating. However, since Cu-CVD has a superior step-coverage than the electrolytic plating, it is preferable to form the second thin film coil half by Cu-CVD. In the above embodiments, upon forming the second thin film coil half, the Cu-CVD film is deposited to have a large thickness and then unnecessary portions of Cu-CVD film is removed by CMP, but the Cu-CVD film may be removed by a dry etching or ion beam milling. Alternatively, the Cu-CVD film may be first etched roughly by CMP and then may be finely etched by a dry etching such as an ion beam milling and sputter etching. In the above mentioned embodiments, the innermost coil winding of the first thin film coil half is connected to the outermost coil winding of the second thin film coil half by means of the jumper wiring, but the innermost coil winding of the second thin film coil half may be connected to the outermost coil winding of the first thin film coil half by means of the jumper wiring.

In the above explained second embodiment, the bottom track pole is formed by the three magnetic material films 41, 112 and 114, but it may be formed by four or more than four magnetic material films. Also in this case, the magnetic material films have successively increasing length measured from the air bearing surface in accordance with an increase in a distance from the write gap film 60 so that the saturation of the magnetic flux does not occur. The manufacturing process of the thin film coil of the third embodiment may be applied to the other embodiments.

According to the invention, the throat height zero reference position can be defined accurately and this position could hardly shift during the manufacturing process. This is due to the fact that in the first aspect of the invention, the thin film coil is formed to have a flat coplanar surface together with the magnetic material film 41 constituting a part of the bottom track pole, and the insulating film 55 and magnetic material film 57 constituting the remaining portion of the bottom track pole are formed such that their boundary surface defines the throat height zero reference position; and in the second aspect of the invention, the thin film coil is formed to have a flat coplanar surface together with the magnetic material film 41 constituting a part of the bottom track pole, the insulating film 113 and magnetic material film 112 constituting a part of the bottom track pole are formed on the flat coplanar surface to have a flat coplanar surface such that their boundary surface situates between the throat height zero reference position and a boundary between the thin film coil and the magnetic material film 41, and the insulating film 116 and magnetic material film 114 constituting the remaining portion of the bottom track pole are formed on the flat coplanar surface such that their boundary surface defines the throat height zero reference position.

The bottom track pole formed by one or two or three flat magnetic material films and the top track pole formed by one or two or three flat magnetic material films are aligned with each other, and therefore the track pole having a very narrow width such as 0.1-0.2 µm can be formed precisely. As stated above, the throat height zero reference position is defined accurately by the edge of the insulating film formed on or above the thin film coil and this position is not shifted during the manufacturing process. Therefore, it is possible to realize the very short throat height of the sub-micron order precisely. In this manner, the miniaturized pole portion having a very narrow track width and a very short throat height can be obtained, and the surface recording density can be improved to a large extent. Furthermore, since the thin film coil can be closer to the air bearing surface, the efficiency of the thin film magnetic head can be improved.

Particularly, in the second aspect of the invention, lengths of a plurality of magnetic material films constituting the bottom track pole measured from the air bearing surface are successively longer in accordance with an increase in a distance from the write gap film. Then, undesired saturation of a magnetic flux generated by a writing current does hardly occur. This is particularly advantageous for the thin film magnetic head having a throat height not larger than 0.5 µm, particularly of quarter-micron order.

When the bottom track pole and top track pole are formed by a stack of magnetic material films, magnetic material films opposing to each other via the write gap film are preferably made of magnetic materials having a higher saturation magnetic flux density than the remaining magnetic material films. A magnetic flux generated by the thin film coil does not saturate and can flow effectively through the miniaturized pole portion. Therefore, a magnetic flux loss can be suppressed and a large magnetic flux which is required by a record medium having a high recording density can be generated effectively. In this manner, it is possible to provide the inductive type thin film magnetic head having a high performance.

If the track pole having a narrow width of not larger than 0.2 µm is formed solely by the plating film of CoNiFe, there are many problems in a mass production due to a difficulty in a composition control of three components. In the embodiments according to the invention, when the track pole is formed to have the two-layer structure, even if a thickness or a composition of the upper magnetic material film fluctuate slightly, the underlying magnetic material film can be formed accurately. In this manner, according to the present invention, it is possible to provide the thin film magnetic head comprising the track chip portion having a very narrow width of 0.1-0.2 µm, while the thin film magnetic head has superior properties and undesired leakage and saturation of a magnetic flux can be suppressed.

When the first and second thin film coil halves of the thin film coil are formed in a self-aligned manner in the embodiments of the invention, a distance between successive coil windings of the thin film coil halves can be shortened extremely. This results in that a magnetic path length can be shortened and the properties of the thin film magnetic head such as magnetic flux rising property, NLTS property and over-write property can be improved. That is to say, the very thin insulating film having a thickness of 0.03-0.25 µm and provided between successive coil windings of the thin film coil halves is made of an inorganic insulating material such as alumina, silicon oxide and silicon nitride which can be miniaturized very finely, and thus a distance between successive coil windings can be shortened to 0.03-0.25 µm. In this case, it is preferable that the second thin film coil half is formed by CVD having a superior step-coverage. In this manner, it is possible to generate a large magnetic flux by a single layer thin film coil, and therefore an apex angle can be reduced and a width of track can be decreased. Moreover, since a distance between successive coil windings of the first thin film coil half can be large, an etching process for removing the seed film can be performed well and debris of etched material could be hardly adhered to coil windings.

Furthermore, in the embodiment in which the jumper wiring for connecting electrically the first and second thin film coil halves to each other is made of a same magnetic material as that of the top pole during the formation of the top pole, the wiring process becomes very simple and a throughput can be improved.

The invention claimed is:

1. A thin film magnetic head comprising:
   a substrate;
   a first magnetic material film made of a magnetic material and extending inwardly from an air bearing surface to have a flat surface, said first magnetic material film constitutes a bottom pole;
   a second magnetic material film formed on said flat surface of the first magnetic material film opposite to the substrate, said second magnetic material film extending inwardly from the air bearing surface beyond a throat height zero reference position and constituting a part of a bottom track pole;
   a thin film coil formed on said flat surface of the first magnetic material film such that a surface of the thin film coil opposite to the first magnetic material film forms a coplanar flat surface together with a surface of said second magnetic material film, said thin film coil including a plurality of coil windings which are insulated and isolated from said first magnetic material film and are mutually insulated and isolated;
   an insulating film formed on said coplanar flat surface of the thin film coil and second magnetic material film to extend up to the throat height zero reference position such that the thin film coil and a part of the second magnetic material film are covered with said insulating film;
   a third magnetic material film formed on a remaining portion of said second magnetic material film which is not covered with said insulating film to constitute a part of the bottom track pole such that a surface of the third magnetic material film opposite to the second magnetic material film forms a coplanar flat surface together with a surface of said insulating film opposite to said thin film coil;

a write gap film made of a non-magnetic material and formed on said coplanar flat surface of said insulating film and third magnetic material film to have a flat surface; and a fourth magnetic material film formed on a surface of said write gap film opposite to the third magnetic material film and insulating film and constituting a top pole including a top track pole aligned with the bottom track pole formed by said second and third magnetic material films.

2. The thin film magnetic head according to claim 1, wherein the second and third magnetic material films constituting the bottom track pole and/or the fourth magnetic material film constituting the top track pole are made of a magnetic material selected from the group consisting of FeN, FeCo, CoNiFe, FeAlN, FeZrN, NiFe and CoFeN.

3. The thin film magnetic head according to claim 2, wherein the second and third magnetic material films constituting the bottom track pole and/or the fourth magnetic material film constituting the top track pole are formed by a plating film of CoNiFe, NiFe or FeCo.

4. The thin film magnetic head according to claim 2, wherein the second and third magnetic material films constituting the bottom track pole and/or the fourth magnetic material film constituting the top track pole are formed by a sputtering film of FeN, FeCo, CoNiFe, FeAlN, FeZrN or CoFeN.

5. The thin film magnetic head according to claim 1, wherein said thin film coil comprises:

a first thin film coil half having coil windings mutually separated by a given distance;

a second thin film coil half having coil windings which are formed between successive coil windings of the first thin film coil half in a self-aligned manner;

an inter-layer insulating film formed in spaces between the successive coil windings of the first and second thin film coil halves;

a first jumper wiring connecting electrically an innermost coil winding of one of the first and second thin film coil halves to an outermost coil winding of the other of the first and second thin film coil halves via openings formed in said insulating film; and a second jumper wiring having one end connected to an innermost coil winding of the other of the first and second thin film coil halves through an opening formed in said insulating film.

6. The thin film magnetic head according to claim 5, wherein said first thin film coil half includes coil windings formed by electrolytic plating of copper and said second thin film coil half includes coil windings formed by CVD.

7. The thin film magnetic head according to claim 5, wherein said first thin film coil half includes coil windings formed by electrolytic plating of copper, and said second thin film coil half includes coil windings formed by electrolytic plating of copper using a seed layer formed by at least one of Cu-CVD and Cu-sputtering.

8. The thin film magnetic head according to claim 5, wherein end portions of the coil windings to which said first and second jumper wirings are connected have contact portions having a wide width.

9. The thin film magnetic head according to claim 5, wherein said outermost coil winding and innermost coil winding of the thin film coil are formed by the second thin film coil half, and a width of the outermost and innermost coil windings is larger than the remaining coil windings.

10. The thin film magnetic head according to claim 5, wherein said first and second jumper wirings are made of a same material as that of the third and fourth magnetic material films.

11. The thin film magnetic head according to claim 5, wherein a thickness of said inter-layer insulating film arranged between successive coil windings of the first and second thin film coil halves is 0.03-0.15 μm.

12. The thin film magnetic head according to claim 11, wherein said inter-layer insulating film arranged between successive coil windings of the first and second thin film coil halves is made of an inorganic insulating material selected from the group consisting of alumina, silicon oxide and silicon nitride.

13. The thin film magnetic head according to claim 12, wherein said inter-layer insulating film arranged between successive coil windings of the first and second thin film coil halves is made of alumina-CVD.

14. The thin film magnetic head according to claim 5, wherein an insulating film having a larger thickness than said inter-layer insulating film is provided between the end portion of the innermost coil winding of the second thin film coil and a back gap portion.

15. A thin film magnetic head comprising:

a substrate;

a first magnetic material film made of a magnetic material and extending inwardly from an air bearing surface to have a flat surface and constitutes a bottom pole;

a second magnetic material film formed on said flat surface of the first magnetic material film opposite to the substrate, said second magnetic material film extending inwardly from the air bearing surface beyond a throat height zero reference position and constituting a part of a bottom track pole;

a thin film coil formed on said flat surface of the first magnetic material film such that a surface of the thin film coil opposite to the first magnetic material film forms a coplanar flat surface together with a surface of said second magnetic material film, said thin film coil including a plurality of coil windings which are insulated and isolated from said first magnetic material film and are mutually insulated and isolated;

a first insulating film formed on said coplanar flat surface of the thin film coil and second magnetic material film to extend inwardly beyond the throat height zero reference position such that the thin film coil and a part of the second magnetic material film are covered with said insulating film;

a third magnetic material film formed on a remaining portion of said second magnetic material film which is not covered with said first insulating film to constitute a part of the bottom track pole such that a surface of the third magnetic material film opposite to the second magnetic material film forms a coplanar flat surface together with a surface of said first insulating film opposite to said thin film coil;

a second insulating film formed on said coplanar flat surface of the first insulating film and third magnetic material film to extend up to the throat height zero reference position such that the first insulating film and a part of the third magnetic material film are covered with said second insulating film;

a fourth magnetic material film formed on a remaining portion of said third magnetic material film which is not covered with said second insulating film to constitute a part of the bottom track pole such that a surface of the fourth magnetic material film opposite to the third magnetic material film forms a coplanar flat surface together with a surface of said second insulating film;
a write gap film made of a non-magnetic material and formed on said coplanar flat surface of said second insulating film and fourth magnetic material film to have a flat surface; and
a fifth magnetic material film formed on a flat surface of said write gap film opposite to the fourth magnetic material film and second insulating film to constitute a top pole including a top track pole aligned with the bottom track pole formed by said second, third and fourth magnetic material films.

16. The thin film magnetic head according to claim 15, wherein the second, third and fourth magnetic material films constituting the bottom track pole and/or the fifth magnetic material film constituting the top track pole are made of a magnetic material selected from the group consisting of FeN, FeCo, CoNiFe, FeAlN, FeZrN, NiFe and CoFeN.

17. The thin film magnetic head according to claim 16, wherein the second, third and fourth magnetic material films constituting the bottom track pole and/or the fifth magnetic material film constituting the top track pole are formed by a plating film of CoNiFe, NiFe or FeCo.

18. The thin film magnetic head according to claim 16, wherein the second, third and fourth magnetic material films constituting the bottom track pole and/or the fifth magnetic material film constituting the top track pole are formed by a sputtering film of FeN, FeCo, CoNiFe, FeAlN, FeZrN or CoFeN.

19. The thin film magnetic head according to claim 15, wherein said thin film coil comprises:
a first thin film coil half having coil windings mutually separated by a given distance;
a second thin film coil half having coil windings which are formed between successive coil windings of the first thin film coil half in a self-aligned manner;
an inter-layer insulating film formed in spaces between the successive coil windings of the first and second thin film coil halves;
a first jumper wiring connecting electrically an innermost coil winding of one of the first and second thin film coil halves to an outermost coil winding of the other of the first and second thin film coil halves via openings formed in the first and second insulating films; and
a second jumper wiring having one end connected to an innermost coil winding of the other of the first and second thin film coil halves through an opening formed in said first and second insulating film.

20. The thin film magnetic head according to claim 19, wherein said first thin film coil half includes coil windings formed by electrolytic plating of copper and said second thin film coil half includes coil windings formed by CVD.

21. The thin film magnetic head according to claim 19, wherein said first thin film coil half includes coil windings formed by electrolytic plating of copper, and said second thin film coil half includes coil windings formed by electrolytic plating of copper using a seed layer formed by at least one of Cu-CVD and Cu-sputtering.

22. The thin film magnetic head according to claim 19, wherein end portions of the coil windings to which said first and second jumper wirings are connected have contact portions having a wide width.

23. The thin film magnetic head according to claim 19, wherein said outermost coil winding and innermost coil winding of the thin film coil are formed by the second thin film coil half, and a width of the outermost and innermost coil windings is larger than the remaining coil windings.

24. The thin film magnetic head according to claim 19, wherein said first and second jumper wirings are made of a same material as that of the third and fourth magnetic material films.

25. The thin film magnetic head according to claim 19, wherein a thickness of said inter-layer insulating film arranged between successive coil windings of the first and second thin film coil halves is 0.03-0.15 μm.

26. The thin film magnetic head according to claim 25, wherein said inter-layer insulating film arranged between successive coil windings of the first and second thin film coil halves is made of an inorganic insulating material selected from the group consisting of alumina, silicon oxide and silicon nitride.

27. The thin film magnetic head according to claim 26, wherein said inter-layer insulating film arranged between successive coil windings of the first and second thin film coil halves is made of alumina-CVD.

28. The thin film magnetic head according to claim 19, wherein an insulating film having a larger thickness than said inter-layer insulating film is provided between the end portion of the innermost coil winding of the second thin film coil and a back gap portion.

29. A thin film magnetic head comprising:
a substrate;
a first magnetic material film made of a magnetic material and extending inwardly from an air bearing surface to have a flat surface and constitutes a bottom pole;
a second magnetic material film formed on said flat surface of the first magnetic material film opposite to the substrate, said second magnetic material film extending inwardly from the air bearing surface beyond a throat height zero reference position and constituting a part of a bottom track pole;
a thin film coil formed on said flat surface of the first magnetic material film such that a surface of the thin film coil opposite to the first magnetic material film forms a coplanar flat surface together with a surface of said second magnetic material film, said thin film coil including a plurality of coil windings which are insulated and isolated from said first magnetic material film and are mutually insulated and isolated;
an insulating film formed on said coplanar flat surface of the thin film coil and second magnetic material film to extend up to the throat height zero reference position such that the thin film coil and a part of the second magnetic material film are covered with said insulating film;
a write gap film made of a non-magnetic material and formed on a part of said second magnetic material film which is not covered with said insulating film and extending over the surface of the insulating film beyond a step between said second magnetic material film and said insulating film;
a third magnetic material film formed on said write gap film such that said third magnetic material film is opposed to said second magnetic material film such that a surface of the third magnetic material film opposite to said write gap film forms a coplanar flat surface together with a surface of a part of said write gap film formed on said insulating film, said third magnetic material film constituting a part of the bottom track pole which is aligned with the bottom track pole formed by said second magnetic material film; and a fourth magnetic material film formed on said flat surface of said write gap film and third magnetic material film and including a portion which constitutes the top track pole aligned with the bottom track pole formed by said second magnetic material films.

30. The thin film magnetic head according to claim 29, wherein the second, third and fourth magnetic material films constituting the bottom track pole and/or the fifth magnetic material film constituting the top track pole are made of a magnetic material selected from the group consisting of FeN, FeCo, CoNiFe, FeAlN, FeZrN, NiFe and CoFeN.

31. The thin film magnetic head according to claim 29, wherein said thin film coil comprises:
a first thin film coil half having coil windings mutually separated by a given distance;
a second thin film coil half having coil windings which are formed between successive coil windings of the first thin film coil half in a self-aligned manner;
an inter-layer insulating film formed in spaces between the successive coil windings of the first and second thin film coil halves;
a first jumper wiring connecting electrically an innermost coil winding of one of the first and second thin film coil halves to an outermost coil winding of the other of the first and second thin film coil halves via openings formed in the insulating film; and
a second jumper wiring having one end connected to an innermost coil winding of the other of the first and second thin film coil halves through an opening formed in said insulating film.

32. The thin film magnetic head according to claim 31, wherein said outermost coil winding and innermost coil winding of the thin film coil are formed by the second thin film coil half, and a width of the outermost and innermost coil windings is larger than the remaining coil windings.

33. The thin film magnetic head according to claim 31, wherein an insulating film having a larger thickness than said inter-layer insulating film is provided between the end portion of the innermost coil winding of the second thin film coil and a back gap portion.

34. The thin film magnetic head according to claim 1, wherein said second magnetic material film constituting at least a part of the bottom track pole is formed by a stack of a plurality of magnetic material films.

35. The thin film magnetic head according to claim 1, wherein said fourth or fifth magnetic material film constituting the top track pole is formed by a stack of a plurality of magnetic material films.

36. A method of manufacturing a thin film magnetic head comprising the steps of:
forming a first magnetic material film constituting a bottom pole to have a flat surface and to be supported by a substrate;
forming, on said flat surface of the first magnetic material film, a second magnetic material film constituting a part of a bottom track pole and a thin film coil to have a coplanar flat surface;
forming, on said coplanar flat surface of the second magnetic material film and thin film coil, an insulating film which covers said thin film coil and a part of the second magnetic material film and extends up to a throat height zero reference position;
forming, on a whole surface, a magnetic material film having a thickness larger than that of said insulating film;
polishing said magnetic material film to form a third magnetic material film constituting a part of the bottom track pole, said third magnetic material film covering a portion of said flat surface of the second magnetic material film which is not covered with said insulating film and forming a coplanar flat surface together with said insulating film;
forming, on said coplanar flat surface of said third magnetic material film and insulating film, a non-magnetic material film constituting a write gap film to have a flat surface;
forming, on said flat surface of said non-magnetic material film, a fourth magnetic material film constituting a top track pole and a top pole to have a flat surface; and
etching selectively said fourth magnetic material film, non-magnetic material film and third magnetic material film to form the mutually aligned top track pole, write gap film and bottom track pole.

37. A method of manufacturing a thin film magnetic head comprising the steps of:
forming a first magnetic material film constituting a bottom pole to have a flat surface and to be supported by a substrate;
forming, on said flat surface of the first magnetic material film, a second magnetic material film constituting a part of a bottom track pole and a thin film coil to have a coplanar flat surface;
forming, on said coplanar flat surface of the second magnetic material film and thin film coil, a third magnetic material film which covers a part of the second magnetic material film and extends up to a throat height zero reference position, said third magnetic material film constituting a part of the bottom track pole;
forming, on a whole surface, an insulating material film having a thickness larger than that of said third magnetic material film;
polishing said insulating material film to form an insulating film covering said thin film coil and a portion of said flat surface of the second magnetic material film which is not covered with said third magnetic material film to have a coplanar flat surface;
forming, on said coplanar flat surface of said third magnetic material film and insulating film, a non-magnetic material film constituting a write gap film to have a flat surface;
forming, on said flat surface of said non-magnetic material film, a fourth magnetic material film constituting a top track pole and a top pole to have a flat surface; and
etching selectively said fourth magnetic material film, non-magnetic material film and third magnetic material film to form the mutually aligned top track pole, write gap film and bottom track pole.

38. The method according to claim 37, wherein said step of forming the third magnetic material film on the flat surface of the second magnetic material film and thin film coil includes the steps of:
forming a magnetic material film such that the flat surface of the second magnetic material film and thin film coil is wholly covered with the magnetic material film;
forming, on said magnetic material film, a plating film of a magnetic material to extend from the air bearing surface to the throat height zero reference position; and
dry-etching said magnetic material film while using said plating film to form the third magnetic material film to cover a part of the second magnetic material film, to extend up to the throat height zero reference position and to constitute a part of the bottom track pole.

39. The method according to any one of claims 36-38, wherein said etching is performed by reactive ion etching, after etching said third magnetic material film to form the bottom track pole, the reactive ion etching is continued such that the surface of the second magnetic material film is partially removed over a part of a thickness of the second magnetic material film to form a trim structure.

40. The method according to claim 39, wherein the magnetic material films constituting the top pole and top track pole are made of FeN, FeCo, CoNiFe, FeAlN, FeZrN or CoFeN, the magnetic material films constituting the bottom track pole are made of FeN, FeCo, CoNiFe, FeAlN, FeZrN, NiFe or CoFeN, and the reactive ion etching RIE for forming the bottom track pole and top track pole is carried out at an etching temperature of 50-300° C. under an atmosphere of a mixed gas of $Cl_2$, a boron series gas such as $BCl_2$ and at least one $O_2$, Ar and $N_2$.

41. The method according to claim 40, wherein said reactive ion etching is performed at an etching temperature of 200-300° C.

42. The method according to any one of claims 36-38, wherein said step of forming the thin film coil comprises the steps of:
  forming a first inter-layer insulating film to cover the first and second magnetic material films;
  forming a plurality of coil windings of the first thin film coil half on said first inter-layer insulating;
  forming a second inter-layer insulating film such that an exposed surface of said first inter-layer insulating film and a whole surface including said first thin film coil half;
  forming a first conductive film by CVD and/or sputtering on a surface including recesses formed between successive coil windings of the first thin film coil half;
  forming selectively a second conductive film by an electrolytic plating process using said first conductive film as an electrode, while a mask is formed on a portion at which a second thin film coil half is not to be formed;
  after removing said mask, removing selectively said first conductive film by an etching process using said second conductive film as a mask;
  forming, on a whole surface, an insulating film having a thickness larger than a sum of a thickness of the second magnetic material film and a thickness of the second inter-layer insulating film; and
  polishing said insulating film, first and second conductive films and second inter-layer insulating film to expose the surface of the coil windings of the first thin film coil half, to form coil windings of the second thin film coil half embedded, via said second inter-layer insulating film, in the recesses formed between successive coil windings of the first thin film coil half and to form a flat coplanar surface together with the second magnetic material film.

43. The method according to claim 42, wherein said first thin film coil half is formed such that a recess is formed between the end portion of the innermost coil winding of the first thin film coil half and a back gap, said recess is filled with said insulating film, and a surface of the insulating film filling the recess forms a coplanar flat surface together with the thin film coil and second magnetic material film.

44. The method according to claim 42, wherein the innermost and outermost coil windings of the thin film coil are formed by the second thin film coil half, and the innermost and outermost coil windings is formed to have a larger width than the remaining coil windings of the thin film coil.

45. The method according to claim 42, wherein a first jumper wiring connecting electrically the innermost coil winding of one of the first and second thin film coil halves to the outermost coil winding of the other of the first and second thin film coil halves and a second jumper wiring having one end connected to the innermost coil winding of the other of the first and second thin film coil halves via an opening formed in the insulating film are formed with same magnetic materials as the third and fourth magnetic material films simultaneously with the formation of the third and fourth magnetic material films.

46. The method according to claim 42, wherein said step of forming the second inter-layer insulating film made of alumina to cover the exposed surface of the first inter-layer insulating film and whole surface including the thin film coil includes an atomic layer process, in which $Al(CH_3)_3$ or $AlCl_3$ and $H_2O$, $N_2$, $N_2O$ or $H_2O_2$ are alternately projected intermittently at a temperature of 100-300° C. under a reduced pressure state of 1-2 Torr.

47. The method according to claim 42, wherein said step of selectively removing the first conductive film using the second conductive film as the etching mask after removing the mask is performed by a wet etching using an etching liquid consisting of diluted sulfuric acid, diluted hydrochloric acid or diluted nitric acid.

48. The method according to claim 36, wherein said step of forming the thin film coil comprises the steps of:
  forming a first inter-layer insulating film to cover the first and second magnetic material films;
  forming a plurality of coil windings of the first thin film coil half on said first inter-layer insulating;
  forming a second inter-layer insulating film such that a whole surface including said first thin film coil half is covered with the second inter-layer insulating film;
  forming a first conductive film by CVD and/or sputtering on a surface including recesses formed between successive coil windings of the first thin film coil half;
  forming selectively a second conductive film by an electrolytic plating process using said first conductive film as an electrode, while a mask is formed on a portion at which a second thin film coil half is not to be formed;
  after removing said mask, removing selectively said first conductive film by an etching process using said second conductive film as a mask;
  forming, on a whole surface, an insulating film having a thickness larger than a sum of thicknesses of the second magnetic material film and the first and second inter-layer insulating films; and
  polishing said insulating film, first and second conductive films and second inter-layer insulating film to expose the surface of the coil windings of the first thin film coil half, to form coil windings of the second thin film coil half embedded, via said second inter-layer insulating film, in the recesses formed between successive coil windings of the first thin film coil half and to form a flat coplanar surface together with the second magnetic material film.

49. The method according to claim 48, wherein said first thin film coil half is formed such that a recess is formed between the end portion of the innermost coil winding of the first thin film coil half and a back gap, said recess is filled with said insulating film, and a surface of the insulating film filling the recess forms a coplanar flat surface together with the thin film coil and second magnetic material film.

50. The method according to claim 48, wherein the innermost and outermost coil windings of the thin film coil are formed by the second thin film coil half, and the innermost and outermost coil windings is formed to have a larger width than the remaining coil windings of the thin film coil.

51. The method according to claim 48, wherein a first jumper wiring connecting electrically the innermost coil winding of one of the first and second thin film coil halves to the outermost coil winding of the other of the first and second thin film coil halves and a second jumper wiring having one end connected to the innermost coil winding of the other of the first and second thin film coil halves via an opening formed in the insulating film are formed with same magnetic materials as the third and fourth magnetic material films simultaneously with the formation of the third and fourth magnetic material films.

52. A method of manufacturing a thin film magnetic head comprising the steps of:
    forming a first magnetic material film constituting a bottom pole to have a flat surface and to be supported by a substrate;
    forming, on said flat surface of the first magnetic material film, a second magnetic material film constituting a part of a bottom track pole and a thin film coil to have a coplanar flat surface;
    forming, on said coplanar flat surface of the second magnetic material film and thin film coil, a third magnetic material film which covers a part of the second magnetic material film and extends up to a throat height zero reference position, said third magnetic material film constituting a part of the bottom track pole;
    forming, on a whole surface, an insulating material film having a thickness larger than that of said third magnetic material film;
    polishing said insulating material film to form a first insulating film covering said thin film coil and a portion of said flat surface of the second magnetic material film which is not covered with said third magnetic material film to have a coplanar flat surface;
    forming, on said coplanar flat surface of the third magnetic material film and first insulating film, a fourth magnetic material film which covers a part of the third magnetic material film and extends up to the throat height zero reference position, said fourth magnetic material film constituting a part of the bottom track pole;
    forming, on a whole surface, an insulating material film having a thickness larger than that of said fourth magnetic material film;
    polishing said insulating material film to form a second insulating film covering said first insulating film and a portion of said flat surface of the third magnetic material film which is not covered with said fourth magnetic material film to have a coplanar flat surface;
    forming, on said coplanar flat surface of said fourth magnetic material film and second insulating film, a non-magnetic material film constituting a write gap film to have a flat surface;
    forming, on said flat surface of said non-magnetic material film, a fifth magnetic material film constituting a top track pole and a top pole to have a flat surface; and
    etching selectively said fifth magnetic material film, non-magnetic material film and fourth magnetic material film to form the mutually aligned top track pole, write gap film and bottom track pole.

53. The method according to claim 52, wherein said step of forming the fourth magnetic material film on the flat surface of the third magnetic material film and first insulating film includes the steps of:
    forming a magnetic material film such that the flat surface of the third magnetic material film and first insulating film is wholly covered with the magnetic material film;
    forming, on said magnetic material film, a plating film of a magnetic material to extend from the air bearing surface to the throat height zero reference position; and
    dry-etching said magnetic material film while using said plating film to form the fourth magnetic material film to cover a part of the third magnetic material film, to extend up to the throat height zero reference position and to constitute a part of the bottom track pole.

54. A method of manufacturing a thin film magnetic head comprising the steps of:
    forming a first magnetic material film constituting a bottom pole to have a flat surface and to be supported by a substrate;
    forming, on said flat surface of the first magnetic material film, a second magnetic material film constituting a part of a bottom track pole and a thin film coil to have a coplanar flat surface;
    forming, on said coplanar flat surface of the second magnetic material film and thin film coil, a first insulating film which covers the thin film coil and a part of the flat surface of the second magnetic material film and extends up to a throat height zero reference position;
    forming, on a whole surface, a magnetic material film having a thickness larger than that of said first insulating film;
    polishing said magnetic material film to form a third magnetic material film covering a portion of said flat surface of the second magnetic material film which is not covered with said first insulating film and extending inwardly up to the throat height zero reference position to have a coplanar flat surface together with the first insulating film;
    forming, on said coplanar flat surface of said third magnetic material film and first insulating film, a second insulating film covering said first insulating film and a part of said flat surface of the third magnetic material film and extending up to the throat height zero reference position;
    forming on a whole surface a magnetic material film having a thickness larger than that of the second insulating film;
    polishing said magnetic material film to form a fourth magnetic material film covering a portion of said flat surface of the third magnetic material film which is not covered with the second insulating film to have a coplanar flat surface together with the second insulating film;
    forming, on said coplanar flat surface of said fourth magnetic material film and second insulating film, a non-magnetic material film constituting a write gap film to have a flat surface;
    forming, on said flat surface of the non-magnetic material film, a fifth magnetic material film constituting a top track pole and a top pole; and
    etching selectively said fifth magnetic material film, non-magnetic material film and fourth magnetic material film to form the mutually aligned top track pole, write gap film and bottom track pole.

55. The method according to claim 52, wherein said etching is performed by reactive ion etching, and after etching said fourth magnetic material film to form the bottom track pole, the reactive ion etching is continued to form a trim structure.

56. The method according to claim 55, wherein the magnetic material films constituting the top pole and top track pole are made of FeN, FeCo, CoNiFe, FeAlN, FeZrN or CoFeN, the magnetic material films constituting the bottom track pole are made of FeN, FeCo, CoNiFe, FeAlN, FeZrN, NiFe or CoFeN, and the reactive ion etching RIE for forming the bottom track pole and top track pole is carried out at an etching temperature of 50-300° C. under an atmosphere of a mixed gas of $Cl_2$, a boron series gas such as $BCl_2$ and at least one $O_2$, Ar and $N_2$.

57. The method according to claim 56, wherein said reactive ion etching is performed at an etching temperature 200-300° C.

58. The method according to claim 54, wherein said step of forming the thin film coil comprises the steps of:
forming a first inter-layer insulating film to cover the first and second magnetic material films;
forming a plurality of coil windings of the first thin film coil half on said first inter-layer insulating;
forming a second inter-layer insulating film such that a whole surface including said first thin film coil half is covered with the second inter-layer insulating film;
forming a first conductive film by CVD and/or sputtering on a surface including recesses formed between successive coil windings of the first thin film coil half;
forming selectively a second conductive film by an electrolytic plating process using said first conductive film as an electrode, while a mask is formed on a portion at which a second thin film coil half is not to be formed;
after removing said mask, removing selectively said first conductive film by an etching process using said second conductive film as a mask;
forming, on a whole surface, an insulating film having a thickness larger than a sum of thicknesses of the second magnetic material film and the first and second inter-layer insulating films; and
polishing said insulating film, first and second conductive films and second inter-layer insulating film to expose the surface of the coil windings of the first thin film coil half, to form coil windings of the second thin film coil half embedded, via said second inter-layer insulating film, in the recesses formed between successive coil windings of the first thin film coil half and to form a flat coplanar surface together with the second magnetic material film.

59. The method according to claim 58, wherein said first thin film coil half is formed such that a recess is formed between the end portion of the innermost coil winding of the first thin film coil half and a back gap, said recess is filled with said insulating film, and a surface of the insulating film filling the recess forms a coplanar flat surface together with the thin film coil and second magnetic material film.

60. The method according to claim 58, wherein the innermost and outermost coil windings of the thin film coil are formed by the second thin film coil half, and the innermost and outermost coil windings is formed to have a larger width than the remaining coil windings of the thin film coil.

61. The method according to claim 58, wherein a first jumper wiring connecting electrically the innermost coil winding of one of the first and second thin film coil halves to the outermost coil winding of the other of the first and second thin film coil halves and a second jumper wiring having one end connected to the innermost coil winding of the other of the first and second thin film coil halves via an opening formed in said insulating film are formed with same magnetic materials as the third, fourth and fifth magnetic material films simultaneously with the formation of the third, fourth and fifth magnetic material films.

62. The method according to claim 58, wherein said step of forming the second inter-layer insulating film made of alumina to cover the exposed surface of the first inter-layer insulating film and whole surface including the thin film coil includes an atomic layer process, in which $Al(CH_3)_3$ or $AlCl_3$ and $H_2O$, $N_2$, $N_2O$ or $H_2O_2$ are alternately projected intermittently at a temperature of 100-300° C. under a reduced pressure state of 1-2 Torr.

63. The method according to claim 58, wherein said step of selectively removing the first conductive film using the second conductive film as the etching mask after removing the mask is performed by a wet etching using an etching liquid consisting of diluted sulfuric acid, diluted hydrochloric acid or diluted nitric acid.

64. The method according to claim 54, wherein said step of forming the thin film coil comprises the steps of:
forming a first inter-layer insulating film to cover the first and second magnetic material films;
forming a plurality of coil windings of the first thin film coil half on said first inter-layer insulating;
forming a second inter-layer insulating film such that a whole surface including said first thin film coil half is covered with the second inter-layer insulating film;
forming, on a whole surface, an insulating film having a thickness larger than a sum of thicknesses of the second magnetic material film and the first and second inter-layer insulating films after selectively providing a mask on an area in which a second thin film coil half is to be formed;
etching said insulating film by CMP to expose said mask;
removing said exposed mask to form recesses between successive coil windings of the first thin film coil half, said second inter-layer insulating film being exposed through said recesses;
forming a first conductive film by CVD and/or sputtering on a surface including the recesses formed between successive coil windings of the first thin film coil half;
forming selectively a second conductive film by an electrolytic plating process using said first conductive film as an electrode such that said recesses are filled with said second conductive film;
after removing said mask, removing selectively said first conductive film by an etching process using said second conductive film as a mask; and
polishing said second conductive film to expose the surface of the coil windings of the first thin film coil half, to form coil windings of the second thin film coil half embedded, via said second inter-layer insulating film, in the recesses formed between successive coil windings of the first thin film coil half and to form a flat coplanar surface together with the second magnetic material film.

65. The method according to claim 64, wherein said first thin film coil half is formed such that a recess is formed between the end portion of the innermost coil winding of the first thin film coil half and a back gap, said recess is filled with said insulating film, and a surface of the insulating film filling the recess forms a coplanar flat surface together with the thin film coil and second magnetic material film.

66. The method according to claim 64, wherein the innermost and outermost coil windings of the thin film coil are formed by the second thin film coil half, and the innermost and outermost coil windings is formed to have a larger width than the remaining coil windings of the thin film coil.

67. The method according to claim 64, wherein a first jumper wiring connecting electrically the innermost coil winding of one of the first and second thin film coil halves to the outermost coil winding of the other of the first and second thin film coil halves a second jumper wiring having one end connected to the innermost coil winding of the other of the first and second thin film coil halves via an opening formed in said insulating film are formed simultaneously with said third, fourth and fifth magnetic material films by same magnetic materials as the third, fourth and fifth magnetic material films.

68. A method of manufacturing a thin film magnetic head comprising the steps of:
   forming a first magnetic material film constituting a bottom pole to have a flat surface and to be supported by a substrate;
   forming, on said flat surface of the first magnetic material film, a second magnetic material film constituting a bottom track pole;
   forming, on said first magnetic material film, a thin film coil to be isolated from the first magnetic material film and to have a coplanar flat surface together with the second magnetic material film;
   forming, on said coplanar flat surface of the second magnetic material film and thin film coil, an insulating film covering a part of the flat surface of the second magnetic material film and extending up to a throat height zero reference position;
   forming a non-magnetic material film constituting a write gap film to cover a portion of the second magnetic material film which is not covered with said insulating film and to extend beyond a step between a first portion of the second magnetic material film and said insulating film;
   forming, on a whole surface, a magnetic material film having a thickness larger than a sum of a thickness of said second magnetic material film and a thickness of said insulating film;
   polishing said magnetic material film to form a third magnetic material film to have a coplanar flat surface together with the insulating film, said third magnetic material film constituting a top track pole which is opposed, via said non-magnetic material film, to a portion of the second magnetic material film which is not covered with said insulating film;
   forming, on said coplanar flat surface of said third magnetic material film and non-magnetic material film, a fourth magnetic material film constituting a top track pole and a top pole to have a flat surface; and
   etching selectively said fourth magnetic material film, third magnetic material film, non-magnetic material film and second magnetic material film to form the mutually aligned top track pole, write gap film and bottom track pole.

69. The method according to claim 68, wherein said etching is performed by reactive ion etching, after etching said third magnetic material film to form the bottom track pole, the reactive ion etching is continued such that the surface of the second magnetic material film is partially removed over a part of a thickness of the second magnetic material film to form a trim structure.

70. The method according to claim 69, wherein the magnetic material films constituting the top pole and top track pole are made of FeN, FeCo, CoNiFe, FeAlN, FeZrN or CoFeN, the magnetic material films constituting the bottom track pole are made of FeN, FeCo, CoNiFe, FeAlN, FeZrN, NiFe or CoFeN, and the reactive ion etching RIE for forming the bottom track pole and top track pole is carried out at an etching temperature of 50-300° C. under an atmosphere of a mixed gas of $Cl_2$, a boron series gas such as $BCl_2$ and at least one $O_2$, Ar and $N_2$.

71. The method according to claim 70, wherein said reactive ion etching is performed at an etching temperature of 200-300° C.

72. The method according to claim 68, wherein said step of forming the thin film coil comprises the steps of:
   forming a first inter-layer insulating film to cover the first and second magnetic material films;
   forming a plurality of coil windings of the first thin film coil half on said first inter-layer insulating;
   forming a second inter-layer insulating film such that a whole surface including said first thin film coil half is covered with the second inter-layer insulating film;
   forming a first conductive film by CVD and/or sputtering on a surface including recesses formed between successive coil windings of the first thin film coil half;
   forming selectively a second conductive film by an electrolytic plating process using said first conductive film as an electrode, while a mask is formed on a portion at which a second thin film coil half is not to be formed;
   after removing said mask, removing selectively said first conductive film by an etching process using said second conductive film as a mask;
   forming, on a whole surface, an insulating film having a thickness larger than a sum of thicknesses of the second magnetic material film and the first and second inter-layer insulating films; and
   polishing said insulating film, first and second conductive films and second inter-layer insulating film to expose the surface of the coil windings of the first thin film coil half, to form coil windings of the second thin film coil half embedded, via said second inter-layer insulating film, in the recesses formed between successive coil windings of the first thin film coil half and to form a flat coplanar surface together with the second magnetic material film.

73. The method according to claim 72, wherein said step of forming the second inter-layer insulating film made of alumina to cover the exposed surface of the first inter-layer insulating film and whole surface including the thin film coil includes an atomic layer process, in which $Al(CH_3)_3$ or $AlCl_3$ and $H_2O$, $N_2$, $N_2O$ or $H_2O_2$ are alternately projected intermittently at a temperature of 100-300° C. under a reduced pressure state of 1-2 Torr.

74. The method according to claim 72, wherein said step of selectively removing the first conductive film using the second conductive film as the etching mask after removing the mask is performed by a wet etching using an etching liquid consisting of diluted sulfuric acid, diluted hydrochloric acid or diluted nitric acid.

75. The method according to claim 68, wherein said step of forming the thin film coil comprises the steps of:
   forming a first inter-layer insulating film to cover the first and second magnetic material films;
   forming a plurality of coil windings of the first thin film coil half on said first inter-layer insulating;
   forming a second inter-layer insulating film such that a whole surface including said first thin film coil half is covered with the second inter-layer insulating film;
   forming, on a whole surface, an insulating film having a thickness larger than a sum of thicknesses of the second magnetic material film and the first and second inter-layer insulating films after selectively providing a mask on an area in which a second thin film coil half is to be formed;

etching said insulating film by CMP to expose said mask;

removing said exposed mask to form recesses between successive coil windings of the first thin film coil half, said second inter-layer insulating film being exposed through said recesses;

forming a first conductive film by CVD and/or sputtering on a surface including the recesses formed between successive coil windings of the first thin film coil half;

forming selectively a second conductive film by an electrolytic plating process using said first conductive film as an electrode such that said recesses are filled with said second conductive film;

after removing said mask, removing selectively said first conductive film by an etching process using said second conductive film as a mask; and polishing said second conductive film to expose the surface of the coil windings of the first thin film coil half, to form coil windings of the second thin film coil half embedded, via said second inter-layer insulating film, in the recesses formed between successive coil windings of the first thin film coil half and to form a flat coplanar surface together with the second magnetic material film.

76. The method according to claim 74, wherein said first thin film coil half is formed such that a recess is formed between the end portion of the innermost coil winding of the first thin film coil half and a back gap, said recess is filled with said insulating film, and a surface of the insulating film filling the recess forms a coplanar flat surface together with the thin film coil and second magnetic material film.

77. The method according to claim 74, wherein the innermost and outermost coil windings of the thin film coil are formed by the second thin film coil half, and the innermost and outermost coil windings is formed to have a larger width than the remaining coil windings of the thin film coil.

78. The method according to claim 74, wherein a first jumper wiring connecting electrically the innermost coil winding of one of the first and second thin film coil halves to the outermost coil winding of the other of the first and second thin film coil halves and a second jumper wiring having one end connected to the innermost coil winding of the other of the first and second thin film coil halves via an opening formed in said insulating film are formed with same magnetic materials as the third, fourth and fifth magnetic material films simultaneously with the formation of the third and fourth magnetic material films.

* * * * *